United States Patent
Noro

(10) Patent No.: US 9,424,085 B2
(45) Date of Patent: Aug. 23, 2016

(54) RECOGNIZING A PROCESS GROUP THAT IS RELATED TO AN APPLICATION

(71) Applicant: FUJITSU LIMITED, Kawasaki-shi, Kanagawa (JP)

(72) Inventor: Masaaki Noro, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 318 days.

(21) Appl. No.: 14/024,105

(22) Filed: Sep. 11, 2013

(65) Prior Publication Data

US 2014/0013331 A1 Jan. 9, 2014

Related U.S. Application Data

(63) Continuation of application No. PCT/JP2011/056666, filed on Mar. 19, 2011.

(51) Int. Cl.
*G06F 9/46* (2006.01)
*G06F 9/50* (2006.01)
*G06F 9/48* (2006.01)

(52) U.S. Cl.
CPC .............. *G06F 9/50* (2013.01); *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 6,374,298 B2 * | 4/2002 | Tanno | 709/227 |
| 2003/0046324 A1 | 3/2003 | Suzuki et al. | |
| 2004/0023646 A1 | 2/2004 | Inami et al. | |
| 2004/0261076 A1 * | 12/2004 | Kondo | G06F 9/5011 718/100 |
| 2006/0277600 A1 * | 12/2006 | Goodwill | G06F 21/80 726/9 |

FOREIGN PATENT DOCUMENTS

| | | |
|---|---|---|
| CN | 1480855 A | 3/2004 |
| JP | 3-57026 | 3/1991 |
| JP | 8-77025 | 3/1996 |
| JP | 9-251390 | 9/1997 |
| JP | 2002-244869 | 8/2002 |
| JP | 2003-15892 | 1/2003 |
| JP | 2003-67201 | 3/2003 |
| JP | 2004-78936 | 3/2004 |
| JP | 2004-310615 | 11/2004 |
| JP | 2009-48358 | 3/2009 |

OTHER PUBLICATIONS

PCT Preliminary Report on Patentability mailed Oct. 3, 2013 in corresponding International Application No. PCT/JP2011/056666.

(Continued)

*Primary Examiner* — Wissam Rashid
(74) *Attorney, Agent, or Firm* — Staas & Halsey LLP

(57) ABSTRACT

A terminal device includes first storage, second storage, and a processor. The first storage is configured to store used resource information which indicates a set of one or more resources to be used by an application installed in the terminal device. The second storage is configured to store association information which associates each particular resource for which access is provided by a particular process, with the particular process. The processor is configured to recognize a process group which is related to the application, and includes a set of one or more particular processes each of which is associated by the association information with a resource included in the set of one or more resources indicated by the used resource information.

15 Claims, 31 Drawing Sheets

(56) References Cited

OTHER PUBLICATIONS

Office Action mailed Mar. 31, 2015 in corresponding Japanese Patent Application No. 2013-505671.

International Search Report mailed May 31, 2011 in corresponding International Application No. PCT/JP2011/056666.

Chinese Office Action dated Feb. 3, 2016 in corresponding Chinese Patent Application No. 201180069208.3.

* cited by examiner

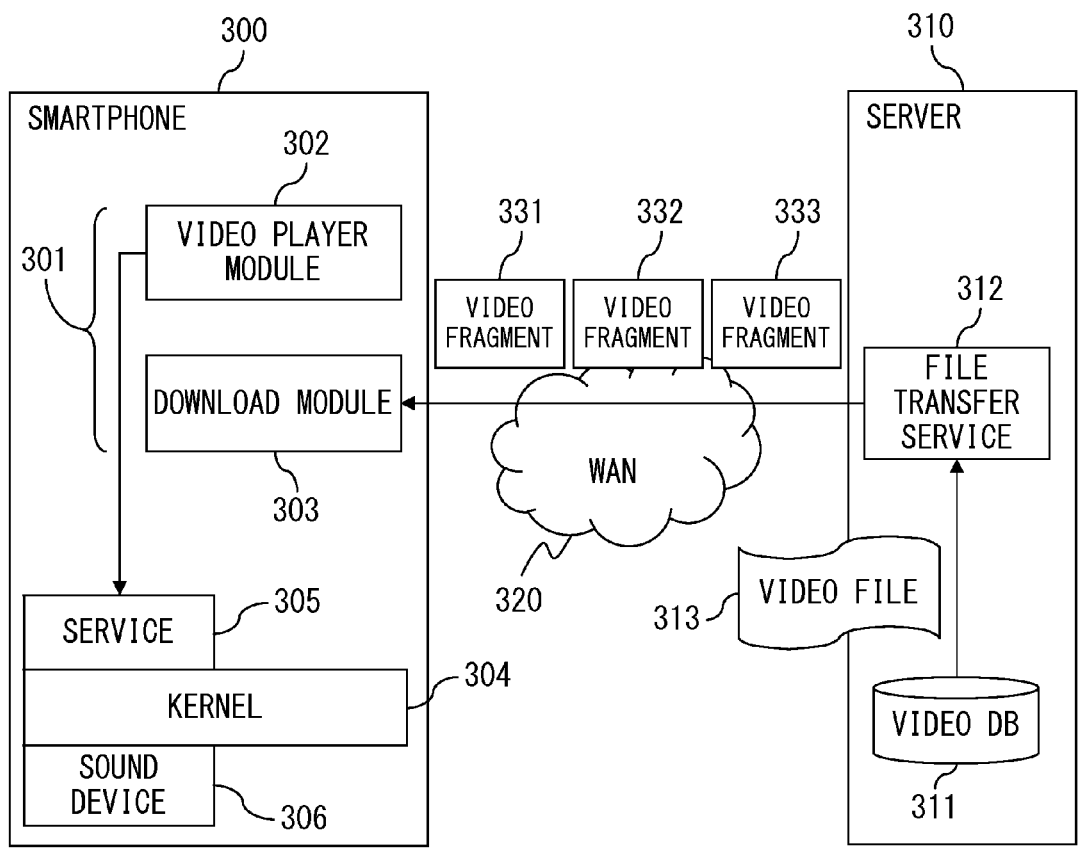
F I G. 3

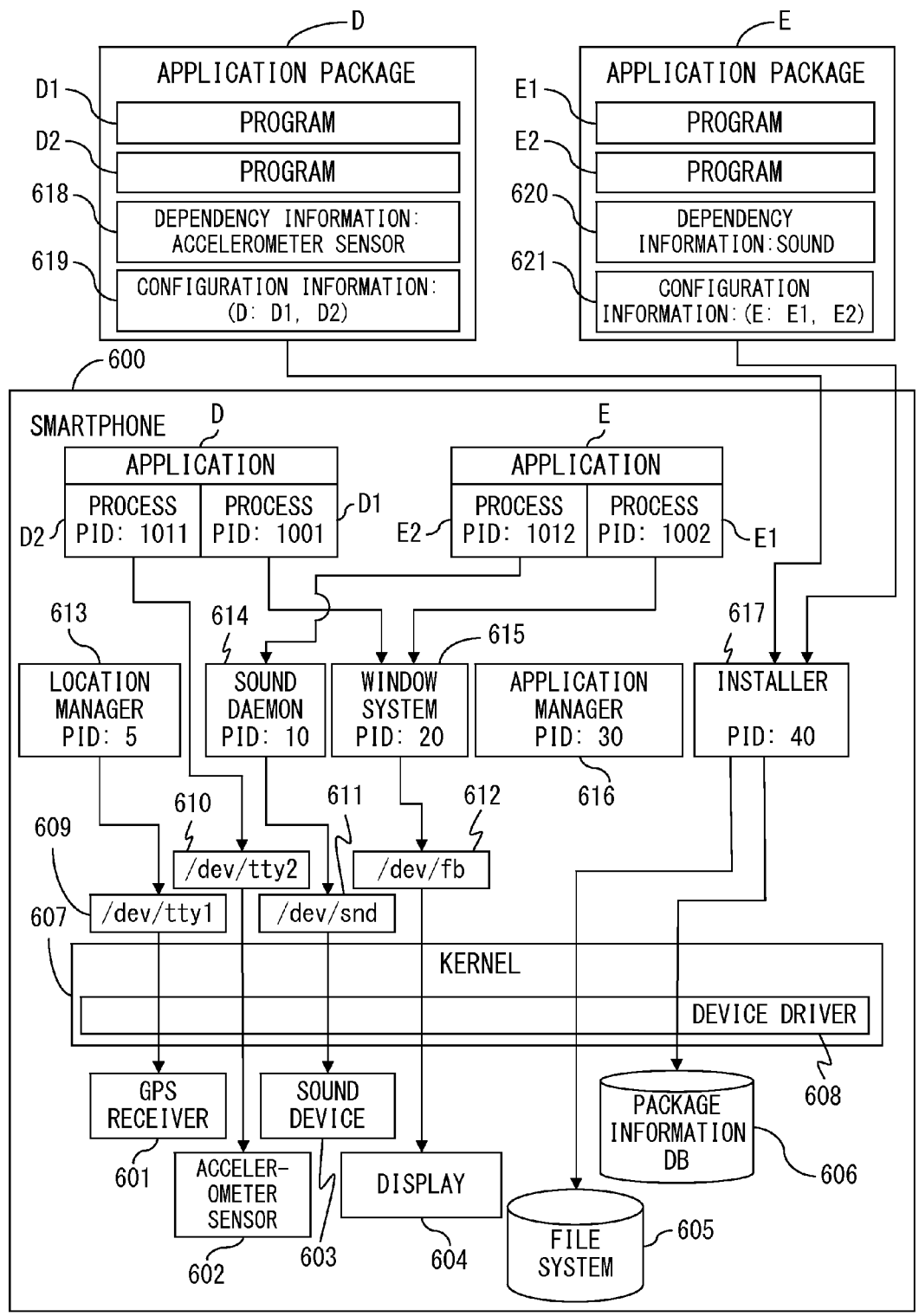
F I G. 6

FIG. 7A

504a
RESOURCE/FILE CORRESPONDENCE TABLE

| EXTERNAL RESOURCE NAME | RESOURCE FILE NAME | FLAG |
|---|---|---|
| GPS | /dev/tty1 | 0 |
| ACCELEROMETER SENSOR | /dev/tty2 | 0 |
| SOUND | /dev/snd | 1 |

505a
RESOURCE DEPENDENCY TABLE

| RESOURCE FILE NAME | PID |
|---|---|
| /dev/tty1 | 5 |
| /dev/tty2 | 1011 |
| /dev/snd | 10 |

506a
PACKAGE INFORMATION DB

| APPLICATION NAME | PROGRAM NAME LIST | USED EXTERNAL RESOURCE NAME LIST |
|---|---|---|
| D | D1, D2 | ACCELEROMETER SENSOR |
| E | E1, E2 | SOUND |

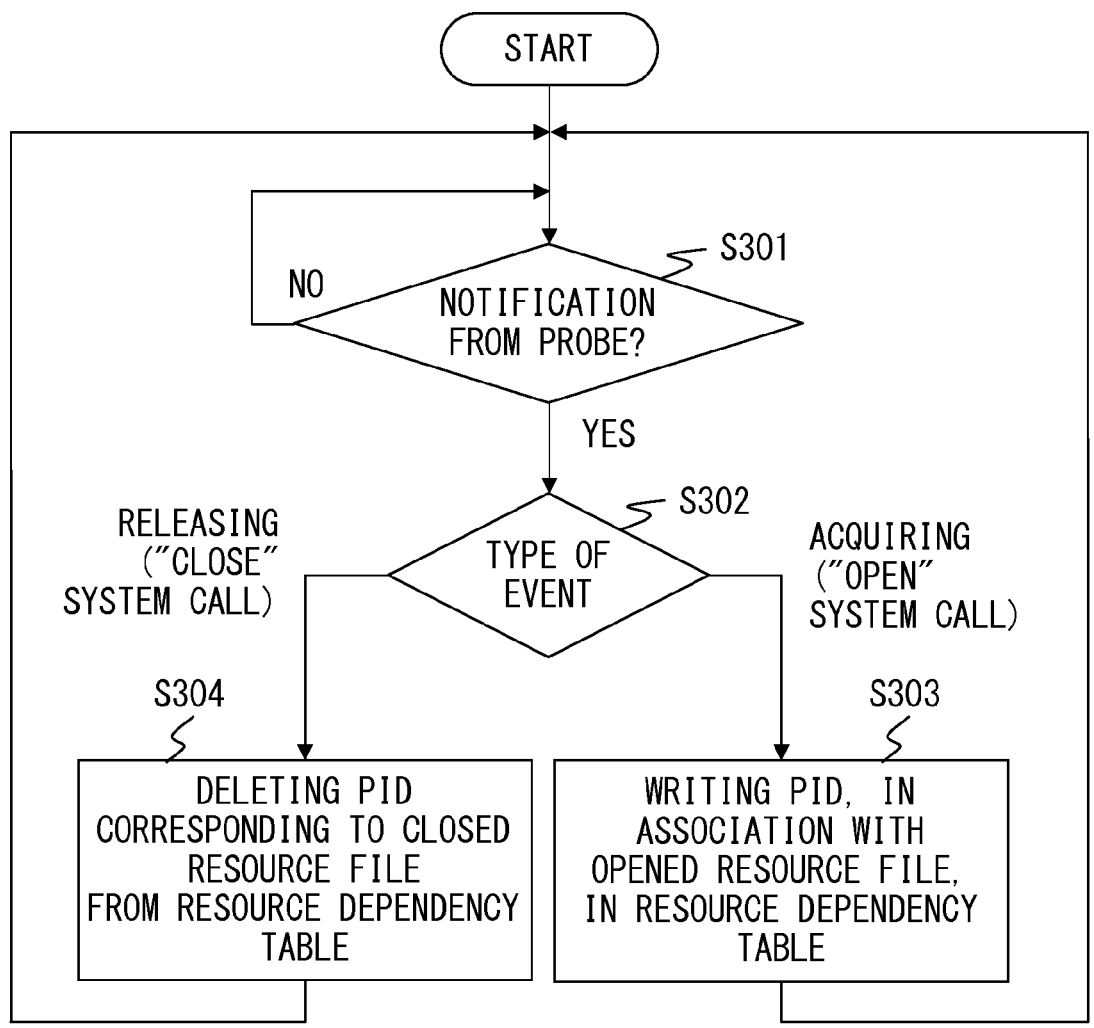
F I G. 10

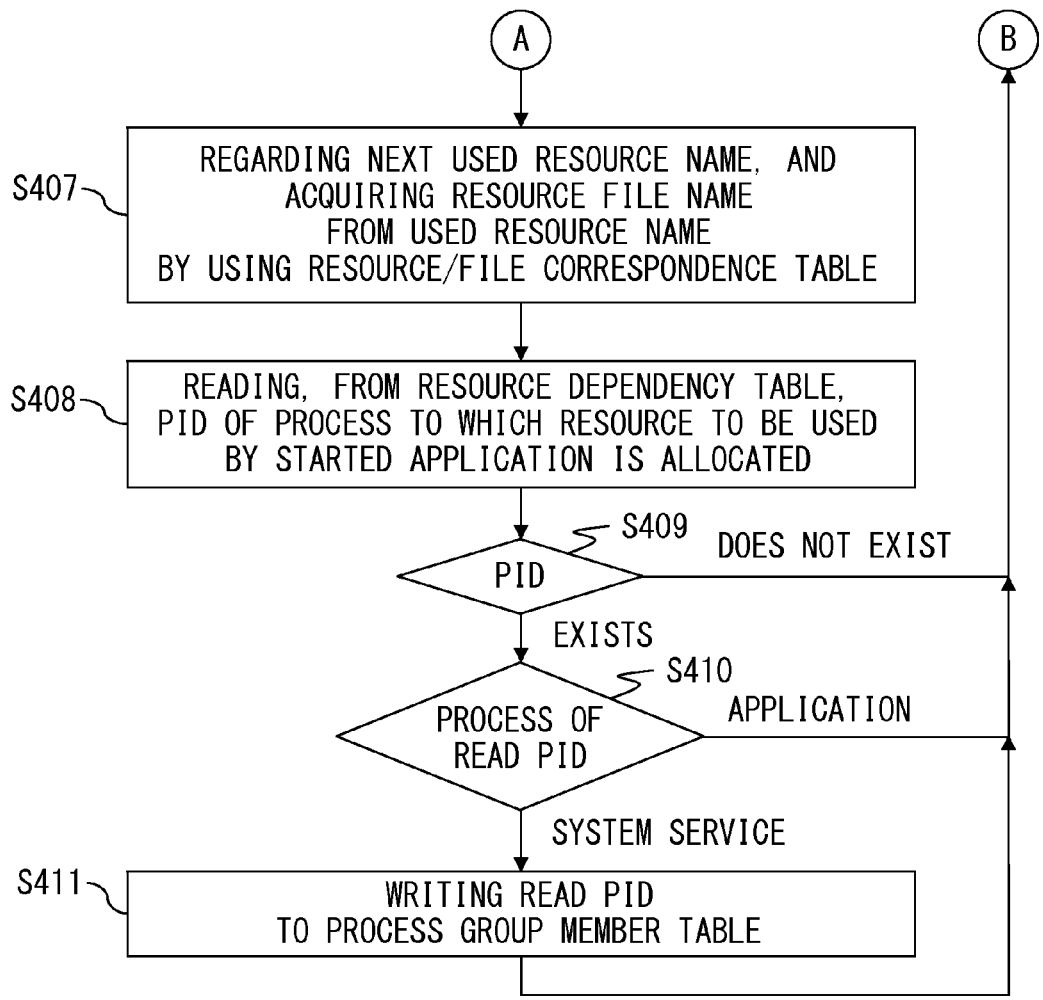
F I G. 11B

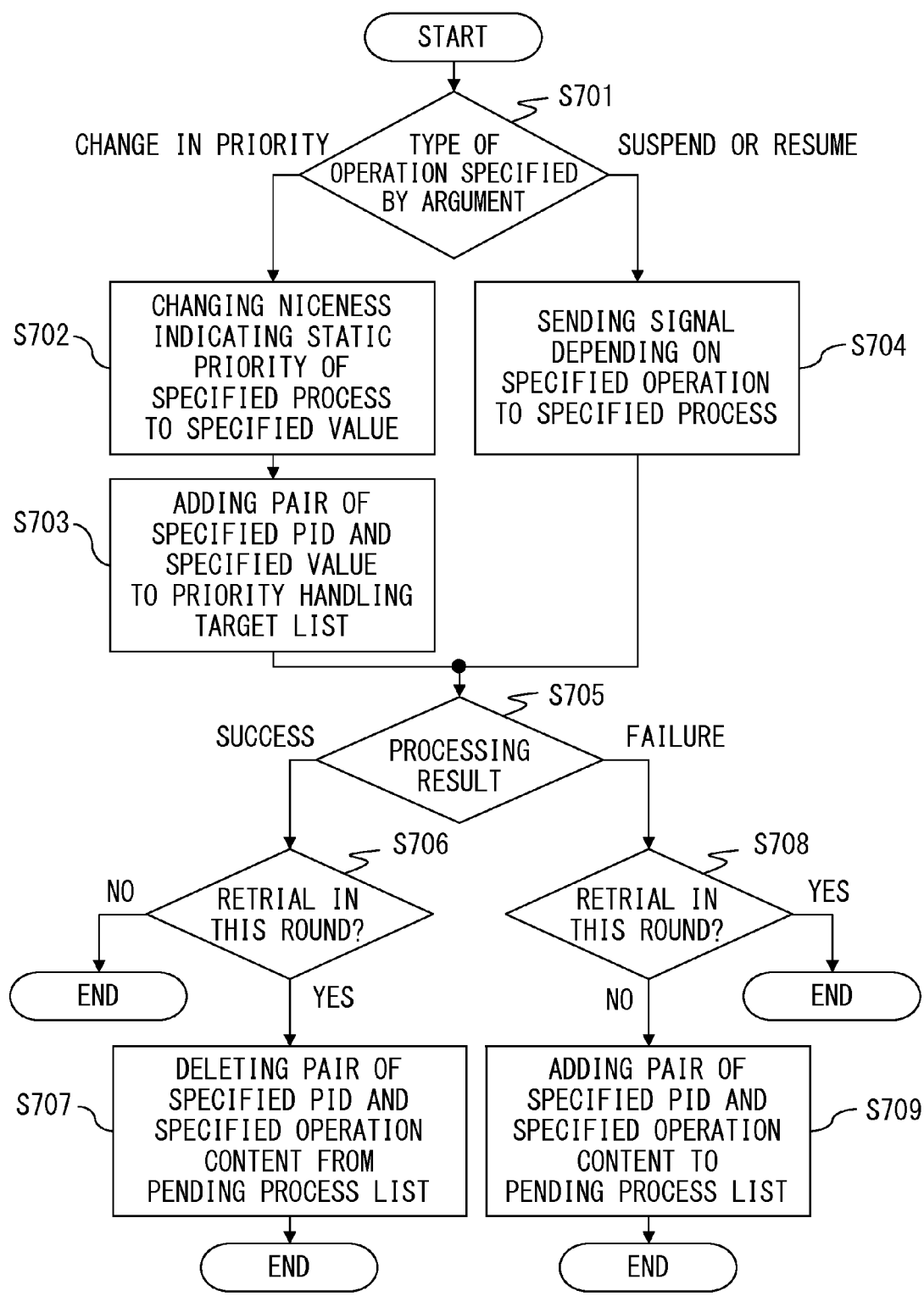
F I G. 15

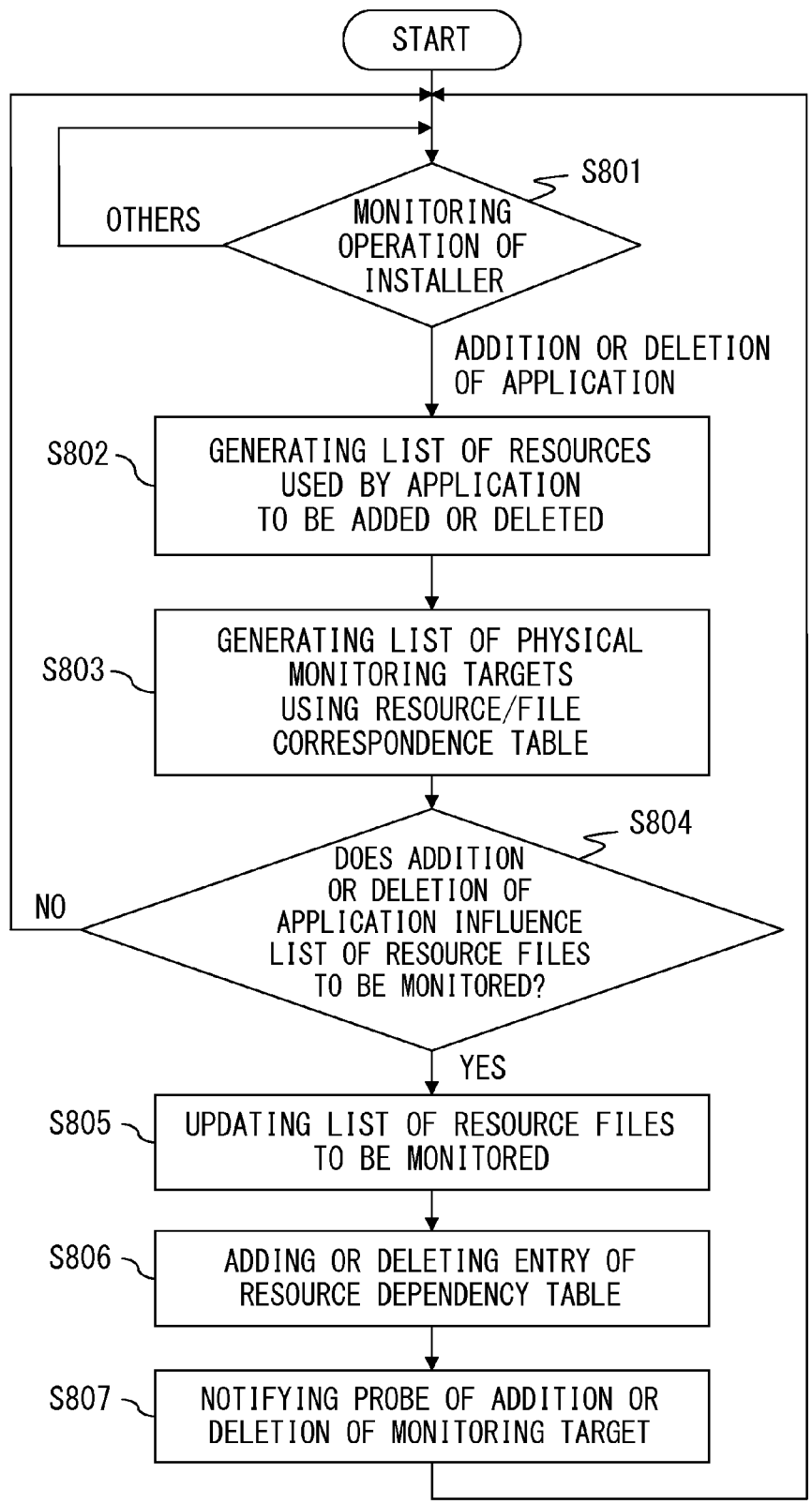
F I G. 1 7

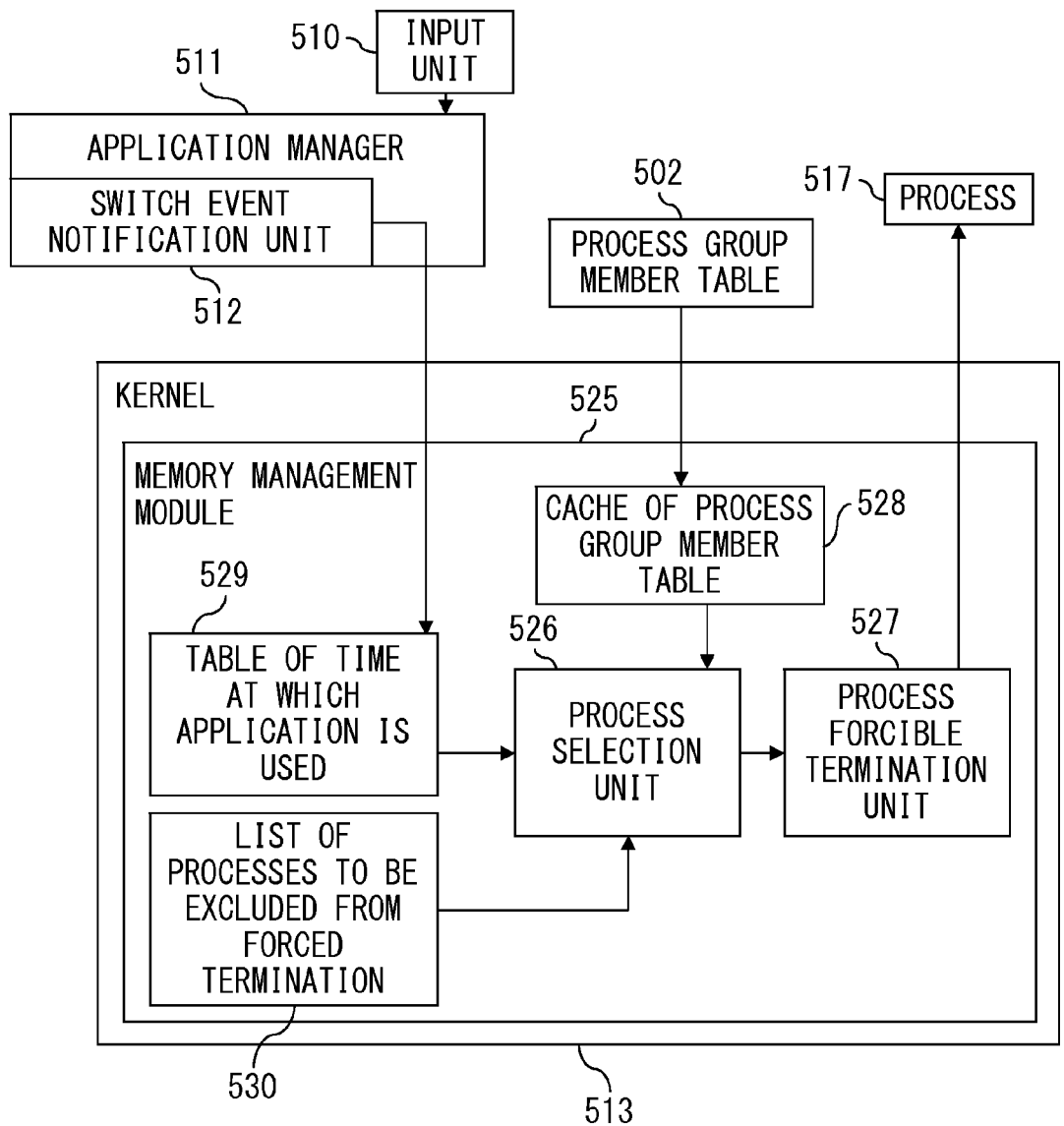
F I G. 2 8

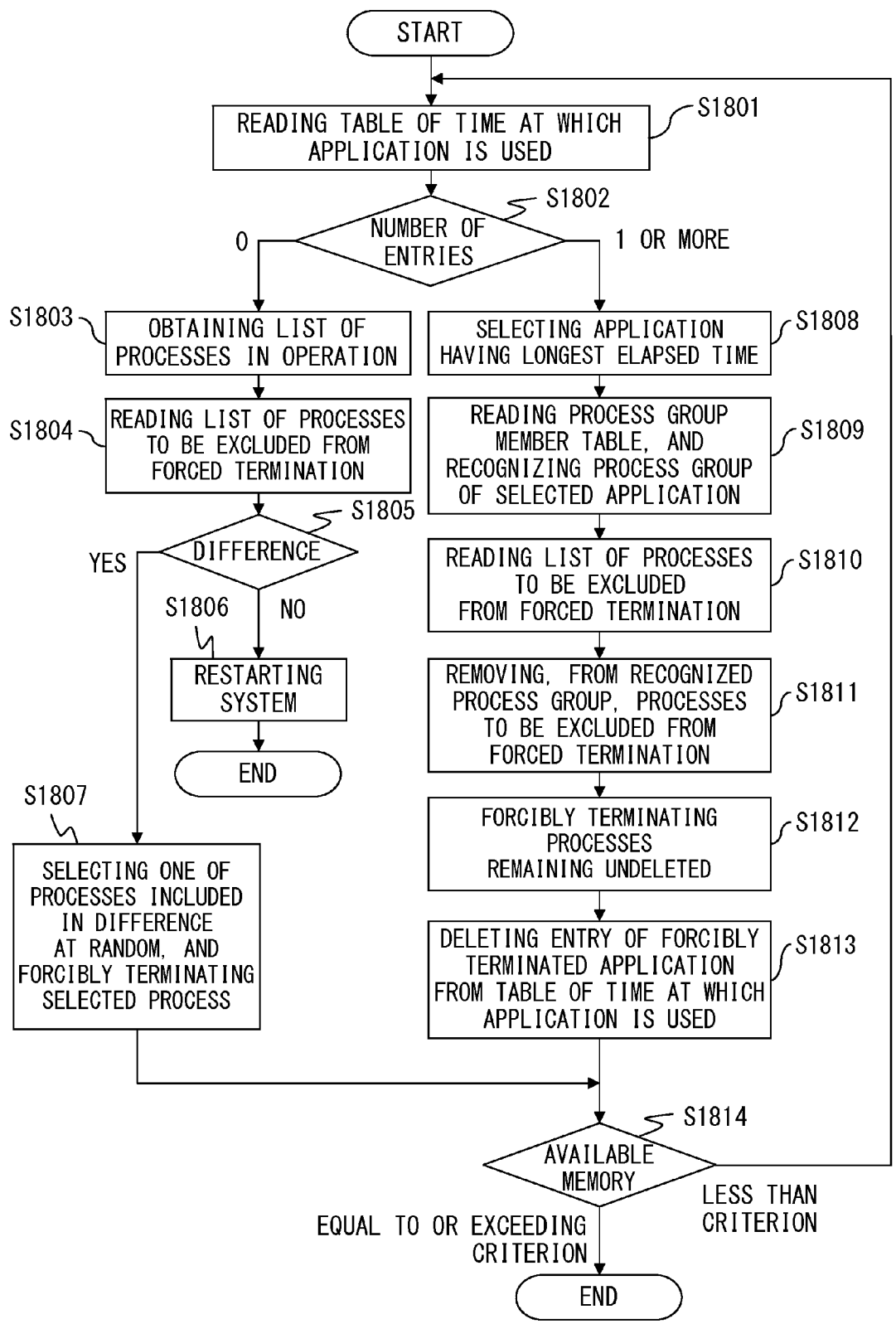
F I G. 29

RECOGNIZING A PROCESS GROUP THAT IS RELATED TO AN APPLICATION

CROSS-REFERENCE TO RELATED APPLICATION

This application is a continuation application of International Application PCT/JP2011/056666 filed on Mar. 19, 2011 and designated the U.S., the entire contents of which are incorporated herein by reference.

FIELD

The embodiments discussed herein are related to the management of the process in a terminal device.

BACKGROUND

A number of information processing devices not only performs a single process, but also performs a plurality of processes. Accordingly, there are various techniques studied relating to the management of a process such as resource distribution, process scheduling, etc. among processes.

For example, the following controller is proposed for one information processing device to realize both the guarantee of real time control processing and throughput of network communication processing.

A controller manages a plurality of tasks after dividing the tasks into two groups, that is, a communication task group for communication with a network communication system and a control task group for monitor control of a monitoring control target. Furthermore, the controller switches the execution order for a plurality of tasks in group units, and processes information obtained from a monitoring control target or a network communication system based on the switched task group.

Furthermore proposed is the following technique to easily, automatically, and maximally derive the responsiveness of an application to be processed based on time shared scheduling even in an environment in which the number of executed applications frequently increases or decreases.

In this technique, an application dependence analysis unit executes as a node the processing from the start to the pause in the process of the operation in time shared scheduling, analyzes the dependence among nodes, and generates dependence analysis information indicating the execution order and the dependence of nodes. Furthermore, a control change judgment unit transfers the process which configures an application from time shared scheduling to group scheduling according to dependence analysis information. Then, a group scheduling execution unit performs group scheduling in process units for the transferred process according to the dependence analysis information.

Furthermore, the following technique is proposed to prevent a reversal phenomenon in task priority with an increasing overhead suppressed as much as possible.

During the exclusive use of shared resources by a first task having a low priority through a resource management device, a request to use the same shared resources may be issued from a second task having a high priority. In this case, the task management device temporarily changes the priority of the first task into the priority of the second task while the use of the shared resources is completed.

The reversal phenomenon of task priorities is suppressed by the temporary change of priorities. That is, suppressed is the reversal phenomenon that "an interrupt from a third task having an intermediate priority during the use of the shared resources by the first task delays the processing of the first task, and consequently the third task is processed before the second task which has a higher priority than the third task."

Furthermore proposed is the following information terminal device to realize a comfortable operation environment by solving the problem of a small capacity of memory when plural pieces of application software are started.

The information terminal device sets resident or temporary attribute information for plural pieces of application software loaded into the information terminal device, and manages the attribute information using a table with the attribute information associated with the application software which is currently being operated. In addition, at the start of an application, the information terminal device refers to the table and judges the attribute information set in the currently operated application software.

Then, the information terminal device leaves the application software whose resident attribute information is set in the execution memory as is, forcibly terminates the application software whose temporary attribute information is set, and releases the software from the execution memory, thereby avoiding the problems that "the memory capacity becomes insufficient by using a number of pieces of application software, the executing operation becomes slow, and software may run away."

The following documents are well known.
Japanese Laid-open Patent Publication No. 2003-67201
Japanese Laid-open Patent Publication No. 2009-48358
Japanese Laid-open Patent Publication No. 8-77025
Japanese Laid-open Patent Publication No. 2003-15892

SUMMARY

According to an aspect of the embodiments, a terminal device includes first storage, second storage, and a processor.

The first storage is configured to store used resource information which indicates a set of one or more resources to be used by an application installed in the terminal device.

The second storage is configured to store association information which associates each particular resource for which access is provided by a particular process, with the particular process.

The processor is configured to recognize a process group which is related to the application, and includes a set of one or more particular processes each of which is associated by the association information with a resource included in the set of one or more resources indicated by the used resource information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view of an example of an appropriate process group;

FIG. 6 is an explanatory view of concrete examples of application packages, resources, and processes;

FIGS. 7A and 7B illustrate an explanatory view of concrete examples of various types of data;

FIG. 10 is a flowchart of the processing performed by a dependency management unit according to the second embodiment;

FIGS. 11A and 11B illustrate a flowchart of the processing performed by a process group judgment unit according to the second embodiment;

FIG. 15 is a flowchart of a subroutine executed by the process control module instead of the subroutine illustrated in FIG. 14 according to a modification of the second embodiment;

FIG. 17 is a flowchart of the processing performed by an application information analysis unit according to a modification of the second embodiment;

FIG. 28 is a block diagram illustrating the details of a memory management module according to a modification of the second embodiment; and FIG. 29 is a flowchart of the processing performed by the memory management module according to a modification of the second embodiment.

DESCRIPTION OF EMBODIMENTS

Figure 1:
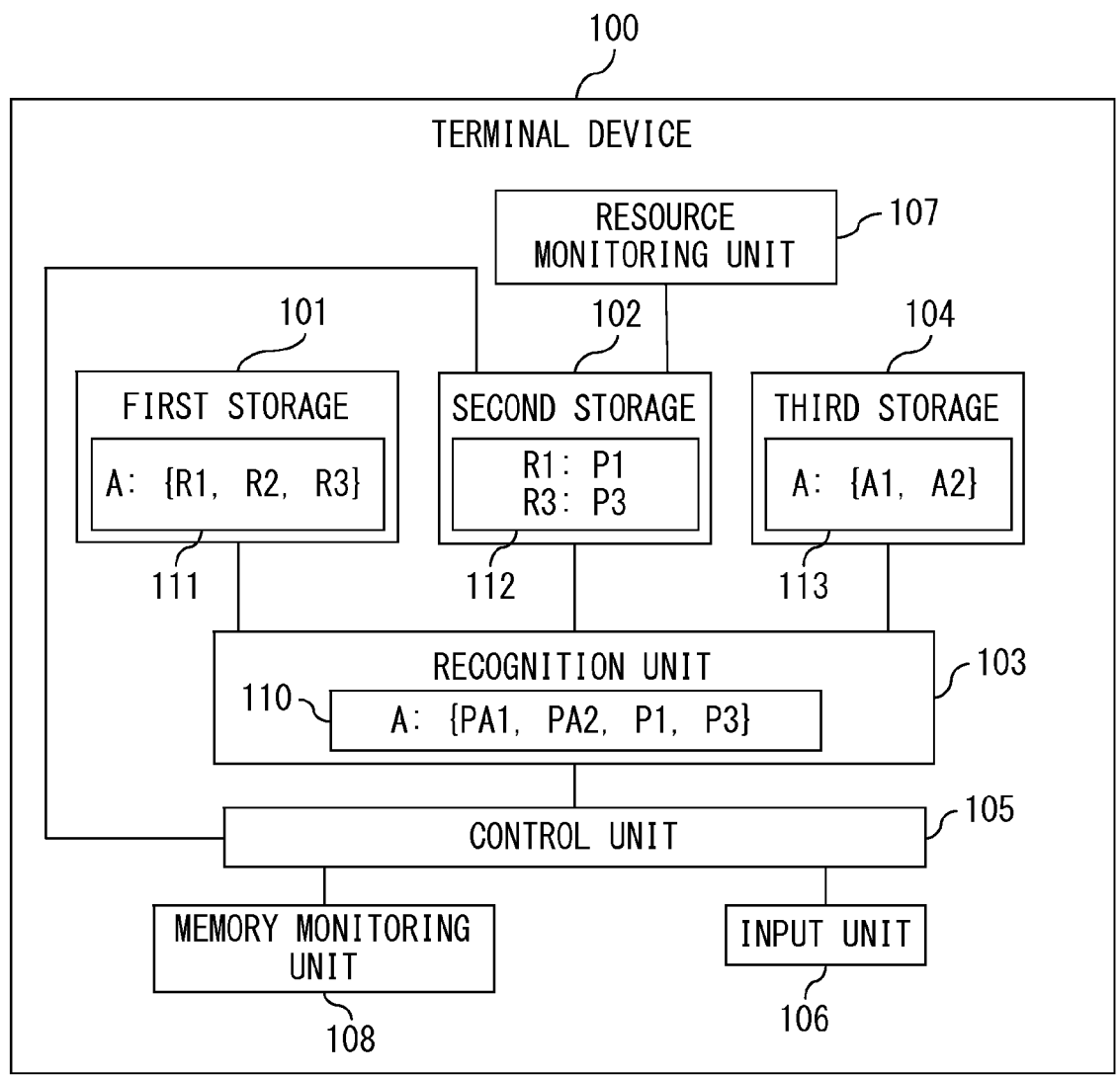
FIG. 1 is a block diagram of a terminal device according to a first embodiment.

In various fields, devices of various types of hardware configurations are used in different uses. Therefore, a process management method which is appropriate for a particular device is not always appropriate for other devices.

For example, the installation of an application by a user is limited in a certain type of terminal device. Then, in a certain type of process management method, the precondition that "only limited particular applications may be executed" may be used in order to achieve high performance of a terminal device, and the tuning may be performed depending on the limited particular applications.

On the other hand, a terminal device to which a user is allowed to install an arbitrary application has become widespread. For a terminal device to which a user is allowed to install an arbitrary application, the above-mentioned precondition does not hold true. Therefore, the certain type of process management method described above is not appropriate.

In an aspect of the embodiments, it is an objective to realize process grouping which is appropriate for process management in a terminal device to which an arbitrary application may be installed.

As described later in more detail, the terminal device according to the first embodiment includes first storage, second storage, and a recognition unit. The recognition unit may be realized by a processor.

The first storage is configured to store used resource information which indicates a set of one or more resources to be used by an application installed in the terminal device. The second storage is configured to store association information. The association information associates each particular resource to which access is provided by a particular process, with the particular process. The recognition unit is configured to recognize a process group related to the application. More specifically, the process group includes a set of one or more particular processes. Each of the one or more particular processes included in the process group is associated by the association information with a resource included in the set of one or more resources indicated by the used resource information.

The access to a certain resource to be used by a certain application installed in the terminal device may be provided by a certain one of the above-mentioned particular processes (hereafter referred to as a "certain particular process" for convenience). In this case, according to the terminal device, the process group recognized by the recognition unit includes the certain particular process. That is, as an element of the process group related to the certain application, the certain particular process is recognized. Even if a plurality of arbitrary applications may be installed, the recognition unit of the terminal device is similarly able to recognize the process group for each application.

The process group recognized as described above is preferable as a unit of management in various types of process management (for example, priority control between processes, determination of a process to be suspended, determination of a process to be forcibly terminated, etc.). If the management of a process is appropriately performed using an appropriate process group recognized as described above, then the time and effort spent by an application developer is reduced.

The time and effort spent by the application developer is expected to be reduced because the application developer is not requested to incorporate, in advance into an application, a special mechanism for avoiding trouble in executing other applications. That is, the recognition of a process group by the terminal device has the potentialities as "the fundamental technique for reducing the time and effort spent by the application developer, thereby enhancing the freedom in development and design of an application."

As described above, the terminal device is able to realize process grouping which is appropriate for the process management for a terminal device to which an arbitrary application may be installed.

The embodiments are described below in more detail with reference to the attached drawings. First, the first embodiment is described with reference to FIG. 1. Next, the second embodiment and some modifications of the second embodiment are described with reference to FIGS. 2 through 29.

FIG. 1 is a block diagram of the terminal device according to the first embodiment. A terminal device 100 in FIG. 1 includes first storage 101, second storage 102, and a recognition unit 103. It is preferable that the terminal device 100 further includes third storage 104 and a control unit 105. The terminal device 100 may further include an input unit 106, a resource monitoring unit 107, and a memory monitoring unit 108.

The first storage 101, the second storage 102, and the third storage 104 may be three different storage areas within a single physical memory module, or may be physically different memory modules. In addition, the recognition unit 103, the control unit 105, the resource monitoring unit 107, and the memory monitoring unit 108 may be realized by a processor such as a CPU (central processing unit) which is provided in the terminal device 100 but is not illustrated in FIG. 1. The input unit 106 may be, for example, an input key or a touchscreen.

The first storage 101 stores used resource information 111 indicating a set of resources to be used by an application installed in the terminal device 100. FIG. 1 exemplifies the used resource information 111 for a case in which an application A uses resources R1, R2, and R3.

A plurality of arbitrary applications may be installed into the terminal device 100. Although FIG. 1 exemplifies only the used resource information 111 for the application A, the first storage 101 may similarly store the used resource information 111 for each of the plurality of installed applications.

Furthermore, a "resource" may be concretely any of, for example, (1a) through (1c).

(1a) A physical device (for example, a sound device, a sensor, etc.) built in or connected to the terminal device 100

(1b) A database stored in the terminal device 100

(1c) A certain file (for example, a common configuration file accessible from a plurality of applications) stored in the terminal device 100.

In addition, there is a resource (hereafter also referred to as a "particular resource") not accessed from a process of a user application in the resources available to the terminal device 100. The access to the particular resource is provided by a process of a certain program. Hereafter, the certain program is also referred to as a "particular program" and a process of the particular program is also referred to as a "particular process". The user application accesses the particular resource through the particular process.

For example, the particular resource may be a sound device such as a sound chip, a sound card, etc. The particular process may be a daemon process which exclusively occupies the particular resource to perform the processing for generating sound from the sound device.

When an application requests the daemon process to generate sound and the daemon process operates as requested, the sound device generates sound and the generated sound is then output from a speaker. The daemon which occupies the particular resource to provide access to the particular resource may also be called a "service". That is, the particular process provides an API (application programming interface) for access to the particular resource.

The second storage 102 of the terminal device 100 stores association information 112. For each of one or more particular resources, the association information 112 associates the particular resource, for which access is provided by a particular process, with this particular process. FIG. 1 exemplifies the association information 112 for a case in which the resources R1 and R3 are particular resources in the resources available from the terminal device 100.

In the example in FIG. 1, the particular process corresponding to the resource R1 is a process P1, and the particular process corresponding to the resource R3 is a process P3. In the example in FIG. 1, the resource R2 is not a particular resource. Therefore, the application A accesses the resource R2 not through a particular process but by invoking a system call such as "open", "read", "write", "close", etc.

The recognition unit 103 recognizes a process group related to the application installed in the terminal device 100, by using the used resource information 111 and the association information 112. The process group related to the application includes at least a set of particular processes associated by the association information 112 with any resource included in the set of the resources indicated by the used resource information 111.

For example, for the application A, the set of resources indicated by the used resource information 111 is {R1, R2, R3} in the example in FIG. 1. Then, the set of the particular processes associated by the association information 112 with any of the resources included in the set {R1, R2, R3} is {P1, P3} in the example in FIG. 1. Therefore, the process group which is related to the application A and is recognized by the recognition unit 103 includes at least the set of particular processes {P1, P3}.

The process group recognized as described above is preferable as a unit of management in various types of process management (for example, priority control between processes, determination of a process to be suspended, determination of a process to be forcibly terminated, that is, a process to be aborted, etc.).

For example, when executing the application A in the foreground, the terminal device 100 may increase the priority of a process of the application A in order to upgrade the performance experienced by a user who uses the application A. By so doing, the terminal device 100 increases the CPU time assigned to the process of the application A. For example, the longer the CPU time assigned to the process of the application A is, the shorter the response time taken from an input operation performed by a user until a response is returned, and the shorter the response time is, the higher the performance experienced by the user becomes.

However, there is the possibility that an advantageous effect such as reduction in the response time is not acquired when only the priority of the process of the application A is increased. This is because the application A uses the resource R1 through the process P1, and uses the resource R3 through the process P3.

If the priority of the process P1 is low, the CPU time assigned to the process P1 is not long. As a result, it may take a long time to access the resource R1 from the application A through the process P1. The same holds true with the process P3.

Therefore, to obtain an advantageous effect such as reduction in the response time, it is preferable to increase the priority of the entire process group including the processes P1 and P3. Then, as described above, the recognition unit 103 recognizes that the process group related to the application A includes the processes P1 and P3.

Obviously, the process group recognized by the recognition unit 103 is also appropriate as a unit of management for process management other than priority control such as suspension, forcible termination, etc.

In addition, it is desirable that the recognition unit 103 further recognizes a process generated by the execution of the application A as an element of the process group related to the application A. Concretely, the recognition unit 103 may recognize a process generated by the execution of the application A by referring to configuration information 113 stored in the third storage 104.

The configuration information 113 includes program identification information for identifying each of one or more programs included in a package of an application. The program identification information is, for example, a name of a program. The configuration information 113 exemplified in FIG. 1 indicates that the package of the application A includes two programs having the names of "A1" and "A2".

Concretely, these two programs are executed when the application A is executed. Therefore, the recognition unit 103 refers to the configuration information 113, and identifies the processes corresponding to these two programs having the names "A1" and "A2", thereby recognizing the processes generated by the execution of the application A.

For example, the recognition unit 103 may use the "ps" command to obtain a list of processes being executed. A list of processes includes a name of a process and a process identifier (PID). As the name of a process, the name of a program is used. Therefore, the recognition unit 103 is able to obtain the PID of each of the two processes generated by the execution of the two programs having the names of "A1" and "A2", from among the list of processes.

As exemplified above, the recognition unit 103 is able to recognize two processes generated by the execution of the application A by referring to the configuration information 113. Then, the recognition unit 103 also recognizes the two recognized processes as elements of the process group related to the application A.

FIG. 1 also exemplifies a recognition result 114 recognized by the recognition unit 103 as described above. That is, according to the recognition result 114, the process group related to the application A includes the following four processes (2a) through (2d).

(2a) a process PA1 generated by executing the program having the name "A1", which is indicated by the configuration information 113

(2b) a process PA2 generated by executing the program having the name "A2", which is indicated by the configuration information 113

(2c) a process P1 that is a particular process corresponding to the resource R1, which is indicated by the used resource information 111

(2d) a process P3 that is a particular process corresponding to the resource R3, which is indicated by the used resource information 111

When any process of the processes (2a) through (2d) above may generate a descendant process, it is preferable that the recognition unit 103 also recognizes the generated descendant process as an element of the process group related to the application A.

Furthermore, as illustrated in FIG. 1, it is preferable that the terminal device 100 further includes the control unit 105, which performs process management using the process group recognized by the recognition unit 103. Concretely, the control unit 105 differentially controls the process(es) included in the process group recognized by the recognition unit 103 and the process(es) not included in the process group.

The terminal device 100 may further include the input unit 106, which receives an input of an instruction to execute an application in the foreground. Concrete examples of an instruction to execute an application in the foreground are listed in items (3a) through (3c) below.

(3a) an instruction to newly start an application, and execute the started application in the foreground (3b) an instruction to resume a suspended application, and execute the resumed application in the foreground (3c) an instruction to bring an application running in the background to the foreground so that the application will be running in the foreground When the input unit 106 receives an input of the instruction, the control unit 105 may differentially control the process(es) included in the process group recognized by the recognition unit 103 and the process(es) not included in the process group. Obviously, the control unit 105 may perform such control also when an event other than the event that the input unit 106 receives an input occurs.

For example, the control unit 105 may perform control at any timing of the following (4a) through (4d). The timing (4d) may be detected in response to an event other than the event that the input unit 106 receives an input (for example, the timing (4d) may be detected in response to a periodical interrupt from a timer).

(4a) when an application is started (4b) when an application is resumed from the suspended state (4c) when an application is changed from the running state in the background to the running state in the foreground (4d) when an application is running in the foreground The above-mentioned differential control performed by the control unit 105 on the process(es) included in the process group recognized by the recognition unit 103 and the process (es) not included in the process group may concretely be, for example, the following control.

The control unit 105 may set the priority of the process included in the process group recognized by the recognition unit 103 higher than the priority of the process not included in the process group.

As another example, the control unit 105 may continue the execution of the process included in the process group recognized by the recognition unit 103, and may suspend the process not included in the process group.

Furthermore, the control unit 105 may perform the following control when a process (hereafter referred to as an "allocated process") to which any resource included in the set of resources indicated by the used resource information 111 is currently allocated is not included in the process group recognized by the recognition unit 103. That is, the control unit 105 may resume an allocated process if the allocated process is suspended, and may continue the execution of the allocated process if the allocated process is running. The control unit 105 may further suspend the allocated process when the allocated process releases the resource which has been allocated to the allocated process.

For example, according to the example in FIG. 1, the resource R2 used by the application A is not a particular resource. Therefore, there is the possibility that the resource R2 is accessed by another application (defined as an "application B" for convenience of explanation below) during the execution of the application A. However, a process of the application B (that is, a process generated by the execution of a program included in the package of the application B) does not belong to the process group which is related to the application A and which is recognized by the recognition unit 103.

Therefore, if the control unit 105 suspends all processes which do not belong to the process group recognized by the recognition unit 103, there is the possibility that the process of the application B keeps the resource R2 allocated thereto and the resource R2 is not released consequently. Therefore, when there is an allocated process (for example, the process of the application B which is currently accessing the resource R2 by opening the resource R2), the control unit 105 controls the allocated process so as not to be suspended, as mentioned above.

When the allocated process releases the resource eventually, the released resource becomes accessible. That is, exception handling performed by the control unit 105 as described above with respect to the allocated process makes it possible to remove the side effect which may be caused by the suspending control based on the process group recognized by the recognition unit 103.

Concretely, the control unit 105 may identify an allocated process as follows for example.

In the example in FIG. 1, the association information 112 associates a particular resource with a particular process. However, the association information 112 may further include information which associates a resource other than a particular resource with a process other than a particular process.

For example, one or more processes may be generated by executing the application B, and one of the one or more generated processes is expressed as a "process PB1" for convenience of explanation. In the example in FIG. 1, since the resource R2 is not a particular resource, the resource R2 may be allocated to the process PB1 (i.e., the process PB1 may keep the resource R2 allocated thereto).

When the resource R2 is currently allocated to the process PB1, the association information 112 may include the information which associates the resource R2 with the process PB1. Furthermore, the information which associates the resource R2 with the process PB1 is deleted from the association information 112 when the process PB1 releases the resource R2.

The above-mentioned extended association information 112 may be obtained as a result of, for example, monitoring by the resource monitoring unit 107.

For example, the resource monitoring unit 107 may monitor an opening operation and a closing operation on at least a resource which is not associated with a particular process by the association information 112 and which is included in the set of resources indicated by the used resource information 111. Then, the control unit 105 is enabled to identify an allocated process according to a monitoring result from the resource monitoring unit 107.

The opening operation is, in other words, an acquiring operation for acquiring a resource. Concretely, the opening operation may be an "open" system call. The closing operation is, in other words, a releasing operation for releasing the resource allocated by the opening operation. Concretely, the closing operation may be a "close" system call.

Therefore, in the period from when a certain process opens a certain resource until the certain process closes the certain resource, the certain resource is allocated to the certain process (i.e., during this period, the certain process keeps the certain resource allocated thereto). Accordingly, the control unit 105 is able to identify an allocated process from the monitoring result of the resource monitoring unit 107.

For example, in the example in FIG. 1, since the resource R2 is not associated with any particular process, the resource monitoring unit 107 monitors the opening and closing operations on at least the resource R2. In the embodiment as described above in which the association information 112 is extended to further include the information which associates a resource other than a particular resource with a process other than a particular process, the resource monitoring unit 107 may operate as described in (5a) and (5b) as follows.

(5a) When the process PB1 opens the resource R2, the resource monitoring unit 107 adds the information which associates the resource R2 with the process PB1 to the association information 112.

(5b) When the process PB1 closes the resource R2, the resource monitoring unit 107 deletes the information which associates the resource R2 with the process PB1 from the association information 112. That is, the resource monitoring unit 107 dissolves the association between the resource R2 and the process PB1.

As described above, the extended association information 112 reflects the monitoring result of the resource monitoring unit 107. Therefore, the control unit 105 may identify the allocated process by referring to the extended association information 112.

The association between the particular resource and the particular process may be statically recorded in advance in the association information 112 or may be dynamically performed by the resource monitoring unit 107. The resource monitoring unit 107 may concretely operate as follows.

The resource monitoring unit 107 monitors the opening and closing operations on at least one of plural resources available to the terminal device 100. The resource monitoring unit 107 not only monitors the opening and closing operations on a resource(s) other than the particular resource, but also may monitor the opening and closing operations on the particular resource.

Then, when the resource monitoring unit 107 detects an opening operation, the resource monitoring unit 107 associates the resource opened by the detected opening operation with the process which has invoked the detected opening operation. Concretely, the resource monitoring unit 107 may associate the resource with the process by adding the information which associates the resource with the process to the extended association information 112.

Furthermore, when the resource monitoring unit 107 detects a closing operation, the resource monitoring unit 107 dissolves the association between the resource closed by the detected closing operation and the process which has invoked the detected closing operation. Concretely, the resource monitoring unit 107 may dissolve the association by deleting the information which associates the resource with the process from the extended association information 112.

As described above, a particular resource may be included in the resources to be monitored by the resource monitoring unit 107. When a certain particular resource is a monitoring target, at least a part (that is, a part corresponding to the certain particular resource) of the association information 112 is the information dynamically generated when the resource monitoring unit 107 detects an opening operation on the certain particular resource invoked from a certain particular process. That is, the part corresponding to the certain particular resource in the association information 112 is the information which has been generated by the resource monitoring unit 107 by associating the certain particular resource with the certain particular process, and stored in the second storage 102.

As described above, the association information 112 may be extended to also indicate the association between a resource other than a particular resource and a process other than a particular process. Furthermore, the part indicating the association between the particular resource and the particular process in the association information 112 may be statically created in advance, or may be generated when the particular process actually opens the particular resource.

The control unit 105 may continue the execution of a process included in the process group recognized by the recognition unit 103, and may forcibly terminate at least one process that is not included in the process group.

The forcible termination of a process enables increase in the available capacity of the memory provided in the terminal device 100. For example, in the example in FIG. 1, when the available capacity of the memory becomes short during the execution of the application A in the foreground, the control unit 105 may forcibly terminate at least one of the processes not included in the process group recognized by the recognition unit 103.

Then, the capacity of the memory available to the application A, which is running in the foreground, increases. As a result, it is expected that the performance experienced by a user who is using the application A is enhanced.

In order to realize the forcible termination appropriately depending on the situation, the terminal device 100 may include the memory monitoring unit 108. The memory monitoring unit 108 monitors whether or not the capacity of the memory available to the application is equal to or exceeds a criterion. This criterion may be, for example, a certain criterion defined by combining one or more of the following (6a) through (6d), or may be any other appropriate criterion.

(6a) a fixedly determined threshold (6b) an amount of memory requested by a process to be allocated to the process (6c) an amount obtained by multiplying the amount of (6b) by a certain number α1 (α1>1)

(6d) an amount obtained by adding a certain number α2 (α2>0) to the amount of (6b)

When the memory monitoring unit 108 detects that the available capacity of the memory is smaller than the criterion, the control unit 105 may forcibly terminate at least one of the processes not included in the process group recognized by the recognition unit 103. For example, when the above-mentioned forcibly terminating processing is performed during the execution of the application A in the foreground, a process irrelevant to the application A is forcibly terminated. Therefore, it is expected that a user who is using the application A will be prevented from clearly feeling that responsiveness is poor.

As described above, the recognition of the process group by the recognition unit 103 and the control by the control unit 105 based on the recognized process group realize advanced process management. How appropriate the process management is obviously affects the performance experienced by a user, especially when the hardware of the terminal device 100 is poor. Therefore, the control by the control unit 105 based on the process group recognized by the recognition unit 103 is specifically preferable when the terminal device 100 has poor hardware only.

The terminal device 100 may be, for example, a mobile telephone, a smartphone, a tablet terminal, a PDA (personal digital assistant), a laptop personal computer (PC), or a desktop PC. In many cases, a mobile telephone, a smartphone, a tablet terminal, and a PDA are inferior to a PC in CPU performance and in memory capacity due to various restrictions in terms of power consumption, an amount of heat generation, a production cost, etc. Therefore, it is preferable for a terminal device having relatively poor hardware such as a mobile telephone, a smartphone, a tablet terminal, a PDA, etc. to implement control which reduces, as less as possible, the probability that a user perceives that the hardware is poor.

Then, according to the present embodiment, appropriate process management is performed by the control of the control unit 105. Therefore, the terminal device 100 produces advantageous effects such as the following effects (7a) and (7b), and a user is thereby prevented from clearly perceiving that the hardware is poor. That is, even if the hardware of the terminal device 100 is poor, the user may experience relatively good performance.

(7a) The response time of an application running in the foreground is short.

(7b) The application running in the foreground does not easily become short of memory capacity.

Furthermore, according to the present embodiment, the performance experienced by a user is improved by the control performed by the control unit 105. Therefore, it is not necessary for a developer of an individual application to make some kind of efforts such as tuning the individual application while taking mutual influence between applications into account so as to prevent the performance to be experienced by a user from becoming worse. That is, according to the present embodiment, the freedom in design for an application developer is improved.

Furthermore, when the control unit 105 performs suspending control, the present embodiment also has an effect of reducing power consumption.

In FIG. 1, for convenience of explanation, processes, resources, etc. are expressed by alphanumeric characters. However, the types of information used in expressing processes, resources, etc. may be modified depending on the embodiments.

For example, a certain type of OS (operating system) uses a "special file" (also referred to as a "device file") to provide an interface for access to a device. Therefore, when a resource is a physical device, the file name of a special file corresponding to the physical device may be used as resource identification information for identifying the resource.

Furthermore, if the resource is a database, the file name of the database file is available as resource identification information. If the resource is a certain file, the file name of the certain file is available as resource identification information. To be more concrete, the "file name" in the explanation above may be a full path file name such as "/dev/tty1" including the path from the root directory.

Obviously, the information (referred to as "logical resource identification information" for convenience of explanation) for logically identifying a resource independent of a file name may be used. For example, if a unique character string or a unique number indicating each resource is determined in advance, the character string or the number may be used as logical resource identification information. For example, a reserved character string "sound" may be used as logical resource identification information about a sound device.

Furthermore, for example, as a resource/file correspondence table 504a in FIG. 7A described later, the information which associates, for each resource, the file name of the resource with the logical resource identification information of the resource may be further used.

In addition, a process may be expressed by a process name or a PID. Even if a process is expressed by a process name, it is feasible to identify the PID from the process name by using, for example, the "ps" command. The process group finally recognized by the recognition unit 103 may be concretely expressed by a set of PIDs.

In addition, an application and a program included in the package of the application may be also expressed by their names.

Furthermore, the concrete formats of the used resource information 111, the association information 112, the configuration information 113, and the recognition result 114 may be variable depending on the embodiments. The formats exemplified in FIG. 1 merely provide examples for aiding the reader in understanding the embodiment.

For example, the package of an application may include the configuration information 113, and the configuration information 113 may be extracted from the package and may be stored in the third storage 104. In addition, the package of an application may further include first resource identification information for identifying each resource to be used by the application.

Concretely, the first resource identification information may be the above-mentioned logical resource identification information (for example, a unique character string etc. predefined for each resource). The used resource information 111 may indicate a set of resources to be used by an application, by specifically using the first resource identification information extracted from the package of the application.

For example, the package of an application may include the information in a format like a package information DB 506a illustrated in FIG. 7A as described later. In this case, the first resource identification information may be a character string such as a "sound" etc. as illustrated as each element of the "used external resource name list" in FIG. 7A.

As another example, the used resource information 111 may indicate a set of resources to be used by an application, by using second resource identification information which is defined, in association with the first resource identification information, to identify each resource available to the terminal device 100. Concretely, the second resource identification information may be a file name of a resource. The association between the first and second resource identification information may be defined by, for example, the information such as the resource/file correspondence table 504a illustrated in FIG. 7A as described later.

A concrete format of the association information 112 may also be variable depending on the embodiments. The association information 112 may be provided in any format so far as a particular resource is able to be associated with a particular process. The association information 112 may be information physically divided into a plurality of files.

For example, the association information 112 may be the information including the following pieces of information (8a) through (8c). That is, the information which associates a particular resource with a particular process by the association among the following pieces of information (8a) through (8c) may be used as the association information 112.

(8a) One or both of first distinction information for distinguishing a particular resource from a resource other than the particular resource (i.e., from any resource that is not any of particular resources), and second distinction information for distinguishing a particular process from a process other than the particular process (i.e., from any process that is not any of particular processes)

(8b) One or both of a file name indicating a particular resource, and logical resource identification information for logically identifying the particular resource independent of the file name (8c) One or both of a process identifier (for example, a PID) which is unique to a particular process and is dynamically assigned to the particular process when the particular process is generated by executing a particular program, and program identification information for identifying the particular program The first distinction information in (8a) above may be, for example, a flag to be set to 0 or 1 for each of a plurality of resources available to the terminal device 100. The flag in the resource/file correspondence table 504a in FIG. 7A as described later is a concrete example of the first distinction information.

As another example, the first distinction information may be a list (or data in other formats) including, as its element, the information for identifying a particular resource (for example, a file name of the particular resource, a uniquely assigned character string, a uniquely assigned number, etc.). That is, a resource whose identification information is included in the list is a particular resource, and a resource whose identification information is not included in the list is a resource other than any of particular resources. Therefore, according to the list, particular resources and other resources are distinguishable from each other.

For example, although only one entry is exemplified in a resource/process name correspondence table 520a in FIG. 7B as described later, the number of entries may be two or more. The column of an "external resource name" of the resource/process name correspondence table 520a is also a concrete example of the first distinction information.

Since a particular process is concretely a process generated by executing a particular program, the name of the particular process is the name of the particular program. For example, if a sound device is a particular resource, and the daemon program which occupies the sound device is named a "sound daemon", the process name of the particular process is also a "sound daemon".

Therefore, the second distinction information in (8a) above may be, for example, a list (or data in other formats) of the names of particular processes. That is, a process whose process name is included in the list is a particular process, and a process whose process name is not included in the list is a process other than any of particular processes. Therefore, according to the list, particular processes and other processes are distinguishable from each other.

For example, the number of entries of the resource/process name correspondence table 520a in FIG. 7B as described later may be two or more. The column of a "process name" of the resource/process name correspondence table 520a is also a concrete example of the second distinction information.

Furthermore, a concrete example of the above-mentioned information (8b) is, for example, the third entry (that is, an entry whose flag has the value of 0, which indicates that this entry corresponds to a particular resource) in the resource/file correspondence table 504a in FIG. 7A as described later. Another concrete example of the information (8b) above is a "resource file name" in the third entry of a resource dependency table 505a in FIG. 7A. Yet another concrete example of the information (8b) above is the column "external resource name" of the resource/process name correspondence table 520a in FIG. 7B.

The program identification information in the above-mentioned (8c) is concretely a name of a particular program. For example, when the name of a particular program is a "sound daemon", a concrete example of the above-mentioned information (8c) is a process name "sound daemon", which is identical to the program name, in a list 507a of processes in FIG. 7B as described later. The PID of 10 corresponding to the "sound daemon" in the list 507a of processes in FIG. 7B is also a concrete example of the information (8c).

Figure 7B:
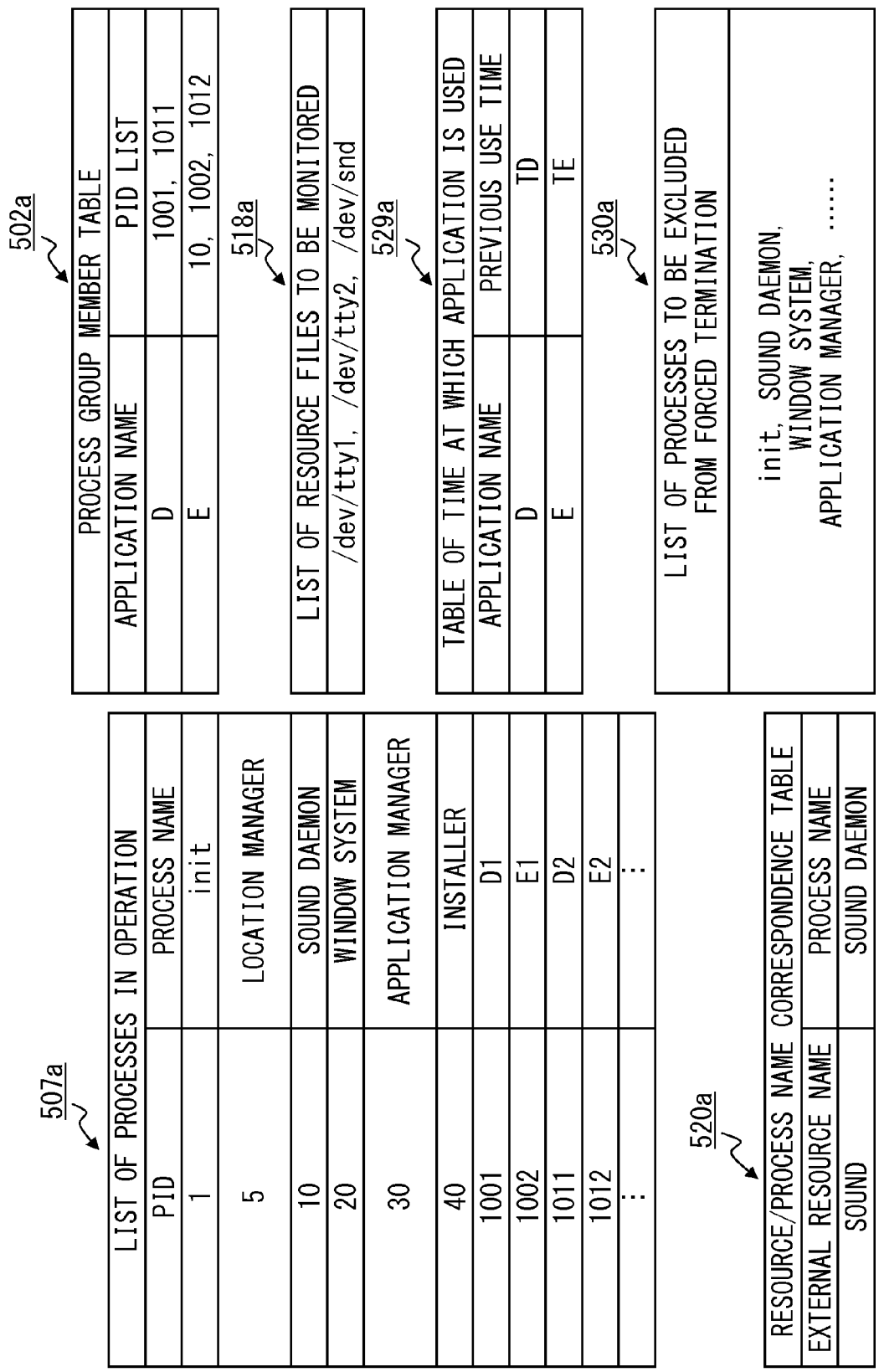

As described above, the association information 112 including the pieces of information (8a) through (8c) may be, for example, the information distributed to some tables exemplified in FIGS. 7A and 7B. In addition, the association information 112 may be generated based on the monitoring of an acquiring operation and a releasing operation on a particular resource. The monitoring may be performed by, for example, the resource monitoring unit 107.

For example, at least one entry of the resource dependency table 505a in FIG. 7A as described later may be used for the association between the pieces of information (8b) and (8c) above in the association information 112. The resource dependency table 505a is dynamically rewritten based on the monitoring as described later in detail.

Otherwise, since the relationship between a particular resource and a particular process is determined in advance, the association information 112 may be defined in advance without monitoring. When the association information 112 is defined in advance, the recognition unit 103 is able to recognize a process group in which each process is indicated by its PID, by recognizing the correspondence between the name of a particular process and its PID, for example, by using the "ps" command etc.

For example, the resource/process name correspondence table 520a in FIG. 7B as described later is an example of the association information 112 which associates a particular resource with a particular process beforehand. Then, the recognition unit 103 is able to obtain the list 507a of processes in FIG. 7B by using the "ps" command, and is able to recognize the correspondence between the name of the particular process and its PID from the list 507a of processes.

In the first embodiment described above, the process group recognized by the recognition unit 103 may be formally defined as follows.

First, for any application x, let defined(x) be a set of processes defined by equation (1) below, and let used(x) be a set of resources defined by equation (2) below. A set of processes may be hereafter referred to as a "process set", and a set of resources may be hereafter referred to as a "resource set".

$$\text{defined}(x) = \{p | \text{a process } p \text{ is generated by execution of a program defined to be included in a package of the application } x\} \quad (1)$$

$$\text{used}(x) = \{r | \text{it is defined that the application } x \text{ uses a resource } r\} \quad (2)$$

The recognition unit 103 is able to recognize the process set defined(x) in equation (1) according to the configuration information 113 and the "ps" command. Furthermore, the recognition unit 103 is able to recognize the resource set used(x) in equation (2) according to the used resource information 111.

Furthermore, for any resource set R, let service(R) be a set of processes defined by equation (3). Equation (3) indicates a set of particular processes.

$$\text{service}(R) = \{p | (r \in R)^\frown (\text{access to the resource } r \text{ is provided by a process } p)\} \quad (3)$$

For any application x, the process group "group(x)" recognized by the recognition unit 103 for the application x is represented by equation (4) below, which relies upon equations (1) through (3) above.

$$\text{group}(x) = \text{defined}(x) \cup \text{service}(\text{used}(x)) \quad (4)$$

The recognition unit 103 recognizes "service(used(x))" in equation (4) according to the used resource information 111 and the association information 112. Furthermore, when the values in the example in FIG. 1 are substituted into equations (1) through (4), equations (5) through (8) are concretely obtained.

$$\text{defined}(A) = \{PA1, PA2\} \quad (5)$$

$$\text{used}(A) = \{R1, R2, R3\} \quad (6)$$

$$\text{service}(\{R1, R2, R3\}) = \{P1, P3\} \quad (7)$$

$$\text{group}(A) = \{PA1, PA2, P1, P3\} \quad (8)$$

To be more preferable, the recognition unit 103 may recognize the process group "group(x)" of equation (9) about the application x because any process which belongs to the process group defined by equation (4) may generate one or more descendant processes.

$$\text{group}(x) = \text{defined}(x) \cup \text{service}(\text{used}(x)) \cup \text{descendant}(\text{defined}(x) \cup \text{service}(\text{used}(x))) \quad (9)$$

For any process set P, let descendant(P) be a set of processes expressed by equation (10) below.

$$\text{descendant}(P) = \{q | (p \in P)^\frown (\text{a process } q \text{ is a descendant process of a process } p)\} \quad (10)$$

Next, the second embodiment and some modifications of the second embodiment are described below with reference to FIGS. 2 through 29. The second embodiment and its modifications are not only applicable to a PC, but also especially suitable to a terminal device which has poor hardware as compared with a PC. Examples of such a terminal device include a mobile telephone, a smartphone, a tablet terminal, a PDA, etc. For convenience of explanation below, an example of a case in which the second embodiment is applied to a smartphone is described.

Figure 2:
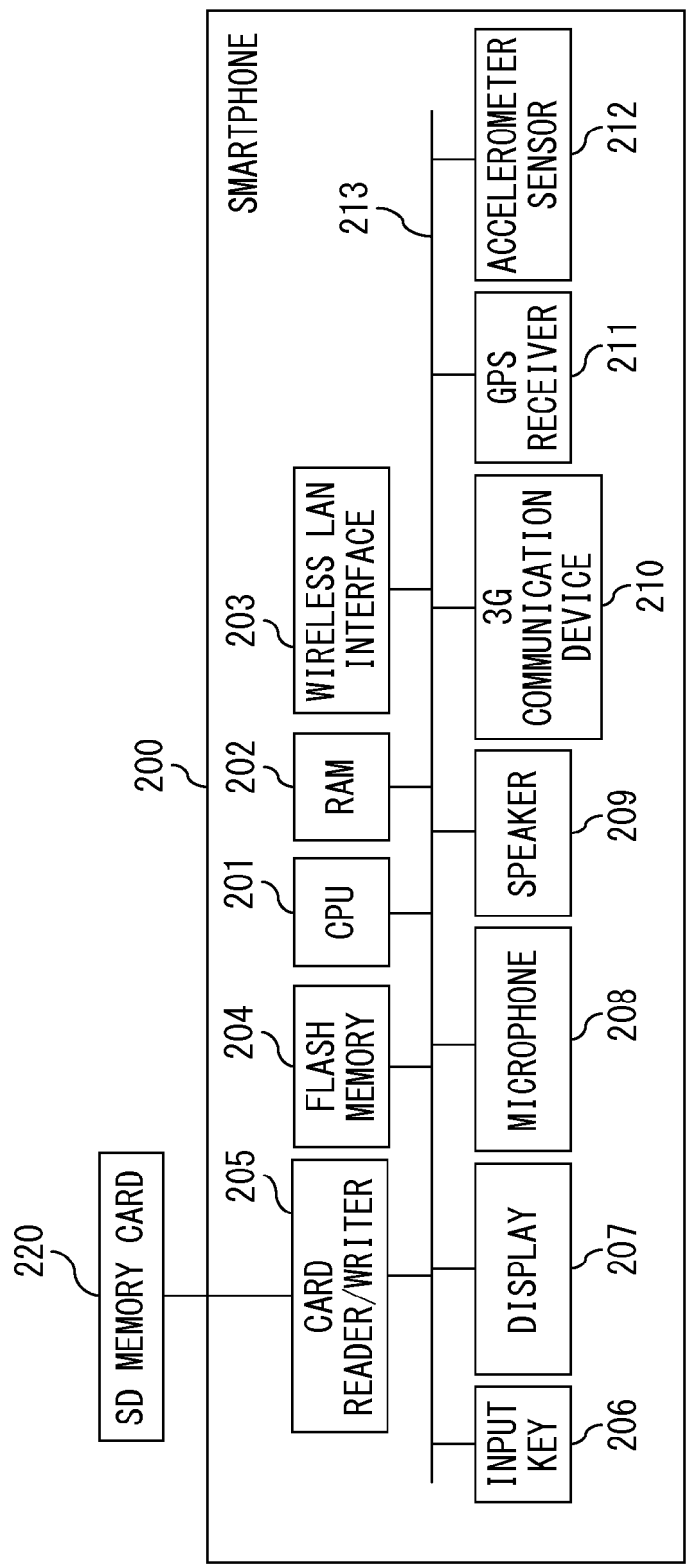
FIG. 2 illustrates a hardware configuration of a smartphone.

FIG. 2 illustrates a hardware configuration of a smartphone. A smartphone 200 in FIG. 2 includes a CPU 201, RAM (random access memory) 202, a wireless LAN (local area network) interface 203, and flash memory 204. The smartphone 200 further includes a card reader/writer 205 of an SD (secure digital) memory card 220.

The smartphone 200 further includes an input key 206, a display 207, a microphone 208, a speaker 209, a 3G (third generation) communication device 210, a GPS (global positioning system) receiver 211, and an accelerometer sensor (i.e., acceleration sensor) 212. Each unit of the smartphone 200 is connected to each other through a bus 213.

The CPU 201 loads various programs into the RAM 202 and executes the programs. The CPU 201 also uses the RAM 202 as a work area.

The CPU 201 may have a sound output function. That is, a sound device used by the smartphone 200 may be the CPU 201 concretely. Obviously, the smartphone 200 may include an on-board sound chip which is separate from the CPU 201 as a sound device. Otherwise, a sound card as a sound device may be attached to the smartphone 200.

The wireless LAN interface 203 is a communication interface in accordance with the standard of, for example, the IEEE (Institute of Electrical and Electronics Engineers) 802.11 series, and includes an antenna, a modulator, a demodulator, etc. The smartphone 200 may be connected to an IP (Internet protocol) network through the wireless LAN interface 203.

Furthermore, the flash memory 204 stores various programs and other data. The flash memory 204 may be replaced with a different type of non-volatile storage device (for example, a hard disk device).

In addition, the SD memory card 220 is an example of a computer readable storage medium. Then, the card reader/writer 205 is an example of a drive device of a storage medium.

The input key 206 is an example of an input device for receiving an input from a user. The display 207 may be a touch screen. The touch screen is an input device and an output device. Furthermore, the microphone 208 is also an example of an input device. The speaker 209 is an example of an output device.

The 3 G communication device 210 also includes an antenna, a modulator, a demodulator, etc. The smartphone 200 may be connected to a 3 G communication network through the 3 G communication device 210. The 3 G communication device 210 provides a telephone function and a data communication function.

The GPS receiver 211 receives a positioning signal from a GPS satellite, calculates and outputs the position of the smartphone 200. The accelerometer sensor 212 detects and outputs the acceleration applied to the smartphone 200. The output of the accelerometer sensor 212 is used in, for example, switching the display direction of the display 207. The smartphone 200 may further include another sensor not illustrated in the attached drawings, or a camera not illustrated in the attached drawings.

Various terminal devices such as a mobile telephone, a smartphone, a tablet terminal, a PDA, a PC, etc. are types of computers. As with a smartphone in FIG. 2, a terminal device such as a mobile telephone, a tablet terminal, a PDA, a PC, etc. includes a CPU, RAM, a storage device, and an input/output device, and preferably includes any communication interface and a drive device of a storage medium. An example of a communication interface is a cable LAN interface, a wireless LAN interface, a 3 G communication device, etc.

Furthermore, depending on the type of terminal device, the flash memory 204 may be replaced with a hard disk device. Then, the card reader/writer 205 of the SD memory card 220 may be replaced with a drive device of another type of storage medium. An example of an available storage medium is an optical disk such as a magnetic disk, a magneto optical disk, a CD (compact disc), a DVD (digital versatile disk), etc., semiconductor memory such as a USB (universal serial bus) memory, etc.

The RAM 202, the flash memory 204, a hard disk device, etc. are types of storage media. Then, the exemplified types of storage media are tangible media, and are not transitory media such as a signal carrier wave.

Furthermore, a program executed by the CPU 201 may be installed in advance in the flash memory 204 or a hard disk device. Otherwise, a program may be stored in the SD memory card 220 or another storage medium and provided, read by the card reader/writer 205 or an appropriate drive device, and installed in a terminal device. Otherwise, a program may be downloaded from a network to a terminal device through a communication interface such as the wireless LAN interface 203, the 3 G communication device 210, etc.

Described next in detail is the second embodiment applied to the smartphone 200 having the hardware configuration illustrated in FIG. 2.

For aid to understanding the merits of the second embodiment, the characteristics of a smartphone are described while comparing the smartphone with a conventional mobile telephone and a general-purpose personal computer.

In an OS incorporated into a conventional mobile telephone, a single window system is adopted. Furthermore, the OS incorporated into a conventional mobile telephone is a single task OS. Therefore, in the conventional mobile telephone, the application having the currently active window occupies the CPU, and there is no application which is concurrently executed in the background. Therefore, it is not requested to arbitrate between the background application and the foreground application. In the conventional mobile telephone, a user does not install an arbitrary application.

On the other hand, a user may install an arbitrary application in a general-purpose PC. Since the installed application is not necessarily package-managed, the meta-information relating to each application is not always available. An example of meta-information relating to an application is, for example, the name of an executable program included in an application package, the name of a resource used by an application, etc.

In the OS for a general-purpose PC (also referred to as a "desk-top OS"), a multi-window system is adopted. The OS for a general-purpose PC is a multitask OS. Therefore, there often occurs a case in which another application is running in the background in addition to the application having the currently active window.

That is, in a general-purpose PC, there often occurs a case in which "a plurality of arbitrary applications to which meta-information is not necessarily available are concurrently executed." However, when a plurality of arbitrary applications are concurrently executed in the foreground and the background, it is hard to automatically judge the priority between the applications. Therefore, in a general-purpose PC, it is hard to perform control of "assigning a longer CPU time to an application having a higher priority by arbitrating the background application and the foreground application based on their priorities."

However, as compared with a terminal device such as a mobile telephone, a smartphone, etc., the general-purpose PC has ample hardware. For example, as compared with a smartphone, a general-purpose PC is loaded with a CPU of a higher clock frequency and memory of a larger capacity.

Therefore, even if arbitration between applications based on their priorities is not conducted, a general-purpose PC is able to concurrently execute a plurality of applications without causing a user to feel a fairly large degradation in performance. That is, a general-purpose PC is rarely urged to arbitrate between a background application and a foreground application based on their priorities.

On the other hand, it is preferable that a smartphone arbitrates between a background application and a foreground application based on their priorities for the following reason.

The latest OS for a smartphone is a multitask OS. Therefore, a plurality of applications may be concurrently executed. On the other hand, a smartphone has poor hardware only in many cases as compared with a general-purpose PC. Therefore, when a plurality of applications are concurrently executed in a smartphone as in a general-purpose PC, a user may feel inconvenience, for example, due to a prolonged response time.

Then, to reduce the inconvenience felt by a user (that is, to improve the performance experienced by the user), it is effective for a smartphone to arbitrate between applications. Then, according to the second embodiment, a process group useful for process control in arbitrating between applications is obtained by using the features of the OS for a smartphone. Concretely, according to the second embodiment, the following features (9a) and (9b) are used.

(9a) The OS for a smartphone adopts a single window system. Therefore, it is possible to uniquely identify the application in the foreground currently and interactively used by a user.

(9b) The OS for a smartphone includes a package management module for management of packages of applications installed in the smartphone. Therefore, even if arbitrary applications may be installed, the package information as meta-information is available for any application. The package information includes, to be more concrete, the information for identifying one or more binary programs included in an application package, and the information for identifying one or more resources to be directly or indirectly accessed by an application.

The features of (9a) above are used in judging an application of a high priority. Then, the features of (9b) are used in recognition of process group relating to an application.

Then, the outline of the policy relating to "which process is appropriate to be recognized as a member of a process group" is described below using as an example a video player application for replay of a video that is streamed and distributed (i.e., delivered). FIG. 3 is an explanatory view of an example of an appropriate process group.

In the example in FIG. 3, a smartphone 300 is connected to a server 310 through a WAN (wide area network) 320. The smartphone 300 may also be connected to the server 310 through any network such as the Internet, a LAN, a 3 G communication network, etc. instead of the WAN 320.

A video player application 301 is installed in the smartphone 300. The video player application 301 includes a video player module 302 and a download module 303. FIG. 3 also illustrates a kernel 304 of the OS of the smartphone 300, a standard service 305 provided by the OS, and a sound device 306. Concretely, the sound device 306 may be, for example, a CPU having a sound function, an on-board sound chip independent of the CPU, or an external sound card.

The server 310 includes a video DB (database) 311. A file transfer service 312 operates on the server 310. The file transfer service 312 reads a video file 313 from the video DB 311 at a request from the smartphone 300, and packetizes the video file 313. In the example in FIG. 3, three packetized video fragments 331 through 333 are exemplified. Then, the file transfer service 312 transmits the video fragments 331 through 333 to the smartphone 300 through the WAN 320.

For example, when the smartphone 300 starts the video player application 301 at an instruction from a user, the video player module 302 operates in the foreground, and the download module 303 operates in the background. Concretely, the download module 303 downloads the video fragments 331 through 333 from the server 310 and stores them in the memory. Then, the video player module 302 plays back (i.e., replays) the video fragments 331 through 333 which have been downloaded and stored in the memory.

The video may be played back through the service 305. The sound device 306 which may be used by various applications is occupied by the service 305 (that is, a type of daemon provided by the OS), and is accessed only through the service 305. A common application accesses the sound device 306 through the service 305 by outputting to the service 305 an access request to the sound device 306. Therefore, the video player module 302 requests the service 305 to draw the images of the video fragments 331 through 333 downloaded by the download module 303 on the display, and output the sound of the video fragments 331 through 333.

As described above, for the smartphone 300, it is preferable to improve the performance experienced by a user by performing the arbitration between the applications based on the priorities. Therefore, when the video player application 301 is executed in the foreground (that is, when the window in which the video player module 302 displays an image is active), it is preferable to raise the priority of the process group relating to the video player application 301.

The main task of the video player application 301 is the playback performed by the video player module 302. However, only increasing the priority of the video player module 302 is insufficient because the downloading is not smoothly performed when the priority of the download module 303 is low. As a result of failing in smooth downloading, the playback of the video is not smoothly performed (for example, the playback may be stopped at a certain frame image). Furthermore, only increasing the priorities of the video player module 302 and the download module 303 is still insufficient because a problem such as discontinuance of sound may occur, as a result of failing to timely output the sound in synchronization with the corresponding image, when the priority of the service 305 is low.

Therefore, it is appropriate that the process group relating to the video player application 301 includes not only the process of the following (10a), but also the processes of (10b) and (10c).

(10a) A process of the video player module 302, which operates in the foreground, that is, a process of the main task of the video player application 301.

(10b) A process of the download module 303, which operates in the background, that is, a process of the background task, which is other than the main task and is enclosed in the package of the video player application 301.

(10c) A process of the service 305, which is invoked by the video player module 302 to use the resource called the sound device 306, that is, a process which occupies the resource to be used by the video player application 301 and thereby provides an interface for access to the resource.

As described below in detail, according to the second embodiment, the process group including (10a) through (10c) is recognized by the smartphone 300 as a process group relating to the video player application 301. Therefore, the smartphone 300 may perform appropriate process control such as "collectively raising the priorities of the processes (10a) through (10c) which belong to the recognized process group" to improve the performance experienced by a user.

Figure 4:
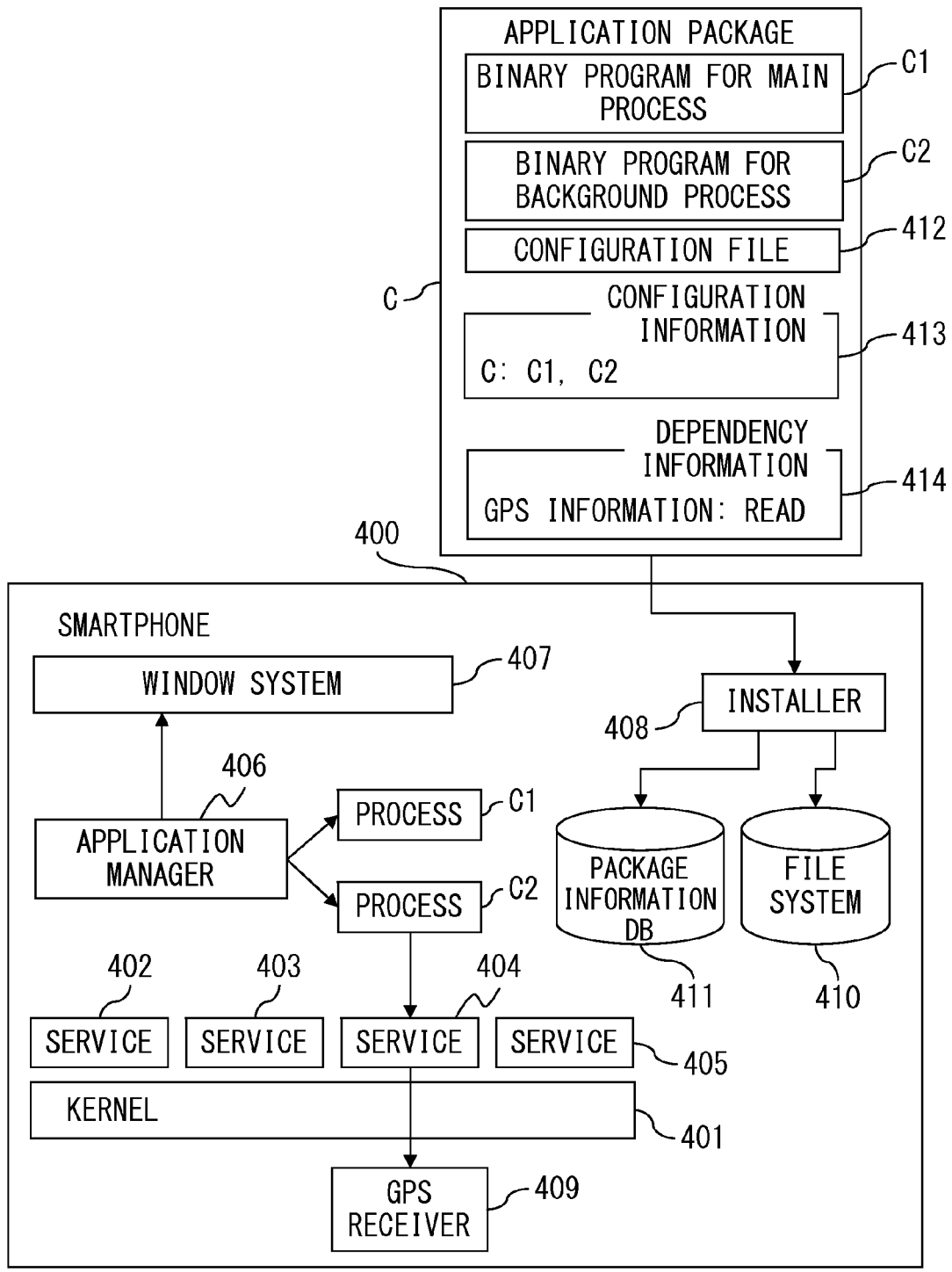
FIG. 4 is an explanatory view of the management of an application package in a smartphone.

Described next in detail is the management of an application package in the smartphone described in (9b) above. FIG. 4 is an explanatory view of the management of an application package in a smartphone.

FIG. 4 exemplifies a smartphone 400 and an application package C installed in the smartphone 400.

For convenience of explanation below, assume that the reference signs which start with alphabetical characters and are assigned to an application, an application package, a program, and a process are also the names of them. For example, the name of the application package C in FIG. 4 is "C". Furthermore, for simpler explanation, assume that the name of an application package is the same as the name of an application.

FIG. 4 exemplifies a kernel 401 of the OS of the smartphone 400. As attached to the OS, some standard services 402 through 405, an application manager 406, a window system 407, and an installer 408 are installed in advance in the smartphone 400.

The hardware configuration of the smartphone 400 may be similar to, for example, that illustrated in FIG. 2. In FIG. 4, a GPS receiver 409 is exemplified as one of some physical devices of the smartphone 400.

Each of the services 402 through 405 may be a daemon. The services 402 through 405 provide a standard service for an application. For example, in the example illustrated in FIG. 4, the service 404 provides access to the GPS receiver 409 for the application.

The application manager 406 manages the start, termination, suspension, resume, etc. of an application. In addition, the application manager 406 notifies the window system 407 of a change of the state of an application. Then, the window system 407 draws a window of an appropriate application depending on the change of the state on the display of the smartphone 400.

The installer 408 controls the installation of an application package. Concretely, installer 408 stores in an appropriate directory of a file system 410 various data such as a binary program etc. included in a target application package to be installed. The installer 408 stores the package information as meta-information about an application package to be installed in a package information DB 411.

For example, the application package C illustrated in FIG. 4 is a package of the application C, and concretely includes the following (11a) through (11e).

(11a) A binary program C1 for the main process executed in the foreground (11b) A binary program C2 for a background process (11c) A configuration file 412 for defining various setting values relating to an application C (11d) Configuration information 413 indicating the configuration of the application C, namely, information indicating that "the application C includes the program C1 and the program C2"

(11e) Dependency information 414 that "the application C reads the GPS information", namely, information indicating the resource on which the application C depends When the application package C including (11a) through (11e) above is installed in the smartphone 400 by the installer 408, the programs C1 and C2, and a configuration file 412 are stored in an appropriate directory in the file system 410. The package information includes the configuration information 413 and the dependency information 414. Therefore, the installer 408 associates the configuration information 413 and the dependency information 414 with the application C and stores them in the package information DB 411.

When the application C is installed in the smartphone 400 and the application C is started, the programs C1 and C2 are executed. That is, by executing the program C1 named "C1", the process C1 identically named "C1" is generated. Likewise, by executing the program C2 named "C2", the process C2 identically named "C2" is generated.

In the example in FIG. 4, the processing of reading the GPS information acquired by the GPS receiver 409 is invoked from the process C2. However, in the example in FIG. 4, the process C2 does not directly access the GPS receiver 409 to read the GPS information, but the service 404 occupies the GPS receiver 409 and the access to the GPS receiver 409 is performed through the service 404.

Therefore, as understood from the example in FIG. 3, an appropriate process group relating to the application C in the example in FIG. 4 includes not only the process C1 to be executed in the foreground, but also the process C2 to be executed in the background, and the process of the service 404. It is possible to identify the processes C1 and C2 from the names "C1" and "C2" indicated by the configuration information 413 stored in the package information DB 411. However, the process of the service 404 is unable to be directly identified from the dependency information 414 stored in the package information DB 411.

One of the reasons is that the dependency information 414 uses the information for logical identification of a resource. Another reason is that the dependency information 414 does not include the information as to whether or not a process of an application (for example, the process C2) accesses a resource through another process (for example, a process of the service 404). These two reasons are described in more detail as follows.

The dependency information 414 is included in the application package C for security originally. To prevent an application from accessing a resource while a user is not aware of it, the dependency information 414 is used, for example, as follows.

First, an input device (for example, the input key 206 in FIG. 2 or a touchscreen) not illustrated in FIG. 4 receives, from a user, an input of an instruction for installing the application package C. Then, the installer 408 refers to the dependency information 414. As a result, the installer 408 recognizes that the application C reads the GPS information.

Based on the recognized result, the installer 408 displays a message inquiring of a user "whether or not the user allows the installation of the application C, which the user are going to install and which reads the GPS information."

Therefore, when a user does not want to install the application which reads the GPS information, the user may reject the installation. Furthermore, a user who will accept the installation of an application which reads the GPS information may give an instruction to continue the installation. As a result, the risk on security that "the application C reads the GPS information while the user is not aware of it" is avoided.

As described above, the dependency information 414 is access control information for security. Therefore, the dependency information 414 concretely indicates the resource used by the application and the operation performed by the application on the resource (for example, "read", "write", etc.). In the example in FIG. 4, the dependency information 414 includes only the information about one resource, but the dependency information about the application which accesses a plurality of resources specifies an operation on each of the plurality of resources.

Therefore, by referring to the package information stored in the package information DB 411, the smartphone 400 is able to recognize which resource each installed application is allowed to access. However, the information used to identify a resource in the dependency information 414 is information for logically identifying a resource, and is different from the information for physically identifying a resource in the smartphone 400.

For example, the GPS receiver 409 may be abstracted to be a device file having a particular file name in a particular path in the smartphone 400. However, in the dependency information 414, the physical identification information (for example, the full path file name of the device file of the GPS receiver 409) depending on the implementation in the smartphone 400 is not used. Instead, in the dependency information 414, the logical identification information independent of the implementation in the smartphone 400 (for example, a reserved character string such as "GPS information" etc.) is used.

Furthermore, as the example in FIG. 4, the resource indicated by the dependency information 414 (that is, the GPS receiver 409) is accessed not directly from the process C2 of the application C, but may be accessed through the service 404. However, the dependency information 414 only indicates the possibility of the type of access (for example, "read", "write", etc.) conducted by the application C on a resource.

That is, the dependency information 414 does not include the information as to whether or not access is conducted through another process (for example, the process of the service 404) because the above-mentioned security may be attained without the information.

Since the dependency information 414 has the above-mentioned features, it is difficult that the smartphone 400 recognizes directly from the dependency information 414 that "the process of the service 404 belongs to the process group relating to the application C." Then, according to the second embodiment, various other types of information is used to overcome the difficulty. The second embodiment is described further in detail below with reference to FIGS. 5 through 14.

Figure 5:
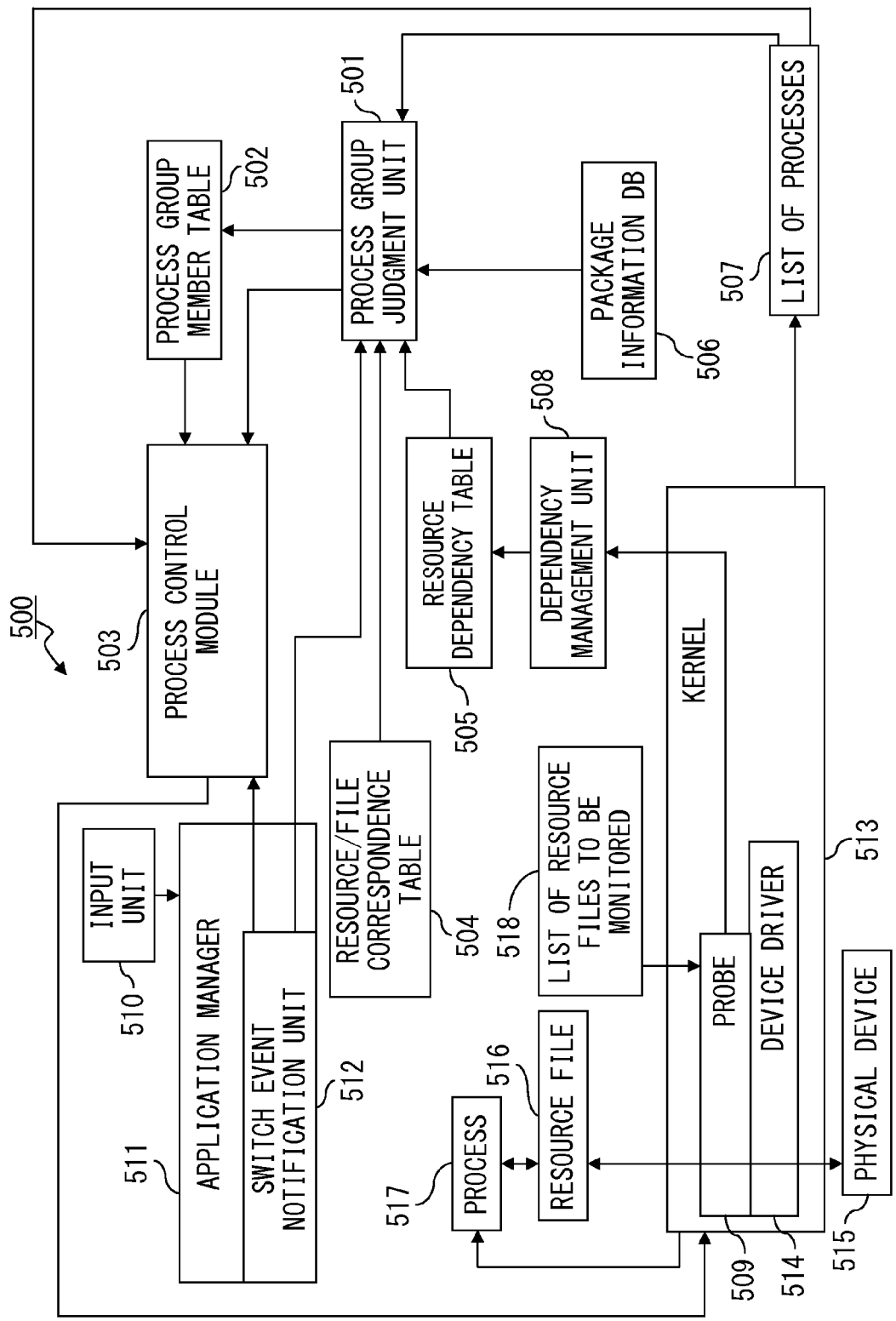
FIG. 5 is a block diagram of a smartphone according to a second embodiment.

FIG. 5 is a block diagram of a smartphone according to the second embodiment. The details of various data illustrated in FIG. 5 are described later with reference to FIGS. 7A and 7B, and the details of the operation of each processing unit illustrated in FIG. 5 are described later with reference to FIGS. 8 through 14.

A smartphone 500 illustrated in FIG. 5 includes a process group judgment unit 501 which judges a process group relating to an application. The process group judged by the process group judgment unit 501 is recorded in a process group member table 502. The smartphone 500 includes a process control module 503 which refers to the process group member table 502 and performs appropriate process control.

The process group judgment unit 501 is able to judge (in other words, able to decide) a process group that is appropriate as a unit of management used in process management, by referring to a resource/file correspondence table 504, the resource dependency table 505, the package information DB 506, and the list 507 of processes.

Data is set in advance in the resource/file correspondence table 504 as described later in detail. Furthermore, the package information DB 506 is similar to the package information DB 411 illustrated in FIG. 4, and is rewritten each time an application package is installed and uninstalled. The resource dependency table 505 and the list 507 of processes are changed depending on the operation of the smartphone 500.

Concretely, the smartphone 500 further includes a dependency management unit 508 and a probe 509. The probe 509 monitors the acquisition and release of a resource by a process, and notifies the dependency management unit 508 of a monitoring result. In response to the notification from the probe 509, the dependency management unit 508 dynamically rewrites the resource dependency table 505. Furthermore, since the list 507 of processes is a list of the processes being operated in the smartphone 500, the contents obviously depend on the acquiring timing.

The smartphone 500 also includes an input unit 510 which receives an input from a user. The input unit 510 is, for example, the input key 206 in FIG. 2, a touch screen, or a combination of them.

Like the application manager 406 in FIG. 4, the smartphone 500 also includes an application manager 511 which manages the start, termination, resumption, etc. of an application. In more detail, the application manager 511 includes a switch event notification unit 512 which notifies another module of an occurrence of a switch event when an application is switched as illustrated in FIG. 5.

Furthermore, FIG. 5 illustrates a kernel 513 of the OS of the smartphone 500, and a device driver 514 in the kernel 513. In the second embodiment, the probe 509 is also implemented in the kernel 513.

The smartphone 500 also includes some physical devices 515. The physical device 515 is a concrete example of a resource. For convenience of explanation below, FIG. 5 illustrates only one block of the physical device 515.

To realize an interface to the physical device 515, the OS of the smartphone 500 adopts the technique of abstracting the physical device 515 to be a resource file 516 (that is, a file called a "special file" or a "device file"). For convenience of explanation below, FIG. 5 illustrates only one block of the resource file 516, but a plurality of physical devices 515 may be provided with respective resource files 516.

FIG. 5 also illustrates a process 517 performed by the smartphone 500. For convenience of explanation below, FIG. 5 illustrates only one block of the process 517, the smartphone 500 performs a plurality of processes 517. The process 517 may be a process of a user application, or a process of a service pertinent to the OS.

In the second embodiment, the access from the process 517 to the physical device 515 is concretely realized by a system call to the resource file 516. Therefore, the probe 509 monitors the start and release of a resource (that is, the physical device 515) by monitoring the system call to the resource file 516. The smartphone 500 stores in advance a list of the resource file 516 to be monitored by the probe 509 as the list 518 of resource files to be monitored.

Then, concrete examples of application packages, resources, and processes are described below with reference to FIG. 6.

A smartphone 600 in FIG. 6 includes components similar to those of the smartphone 500 in FIG. 5, but a part of the components illustrated in FIG. 5 are omitted in FIG. 6, and a part of them are more concretely illustrated.

That is, the smartphone 600 includes, as a concrete example of the physical device 515 in FIG. 5, a GPS receiver 601, an accelerometer sensor 602, a sound device 603, and a display 604. For convenience of explanation below, it is assumed that the sound device 603 is a particular resource access to which is occupied by a particular process, and other three physical devices are not particular resources.

The smartphone 600 includes a file system 605 and a package information DB 606. Although a file system is omitted in FIG. 5, the file system 605 in FIG. 6 is similar to the file system 410 in FIG. 4. Furthermore, the package information DB 606 corresponds to the package information DB 411 in FIG. 4 and the package information DB 506 in FIG. 5.

The smartphone 600 also includes a kernel 607 of the OS and a device driver 608. The kernel 607 corresponds to the kernel 401 in FIG. 4 and the kernel 513 in FIG. 5, and the device driver 608 corresponds to the device driver 514 in FIG. 5.

The smartphone 600 includes resource files 609 through 612 as concrete examples of the resource file 516 in FIG. 5. For convenience of explanation below, a full path file name is written in each of the blocks of the resource files 609 through 612 in FIG. 6. For simple explanation below, the full path file name is referred to simply as a "file name".

Concretely, the file name of the resource file 609 corresponding to the GPS receiver 601 is "/dev/tty1". The file name of the resource file 610 corresponding to the accelerometer sensor 602 is "/dev/tty2". The file name of the resource file 611 corresponding to the sound device 603 is "/dev/snd". The file name of the resource file 612 corresponding to the display 604 is "/dev/fb".

FIG. 6 exemplifies as concrete examples of the process 517 in FIG. 5 the processes of some standard programs provided by the OS, and the processes of the applications installed at an instruction of a user. Concretely, FIG. 6 exemplifies each process of a location manager 613, a sound daemon 614, a window system 615, an application manager 616, and an installer 617. Furthermore, FIG. 6 exemplifies processes D1, D2, E1, and E2 generated by the execution of applications D and E installed in the smartphone 600 by the installer 617.

The location manager 613 obtains the information about the position of the smartphone 600 by referring to the resource file 609 corresponding to the GPS receiver 601. Then, the location manager 613 provides position information for any application. In the example in FIG. 6, the PID of the process of the location manager 613 is 5. The process of an application other than the location manager 613 may access the resource file 609.

The sound daemon 614 exclusively occupies the access to the resource file 611 corresponding to the sound device 603. The processes of other programs request the process of the sound daemon 614 to access the sound device 603, and the sound daemon 614 operates the resource file 611 at the request. That is, in the example in FIG. 6, the sound device 603 is a particular resource, and the process of the sound daemon 614 is a particular process. In the example in FIG. 6, the PID of the process of the sound device 603 is 10.

The window system 615 is similar to the window system 407 in FIG. 4. The window system 615 controls drawing in the window by operating the resource file 612 corresponding to the display 604. In the example in FIG. 6, the PID of the process of the window system 615 is 20.

The application manager 616 corresponds to the application manager 406 in FIG. 4 and the application manager 511 in FIG. 5, and manages the start, termination, suspension, resumption, etc. of an application. Although omitted in FIG. 6, the application manager 616 includes the switch event notification unit 512 as in FIG. 5. In the example in FIG. 6, the PID of the process of the application manager 616 is 30.

The installer 617 corresponds to the installer 408 in FIG. 4. An application package is installed in the smartphone 600 through the installer 617. The binary program and the configuration file included in an application package are stored in the file system 605, and the package information included in the application package is stored in the package information DB 606. In the example in FIG. 6, the PID of the process of the installer 617 is 40.

FIG. 6 exemplifies two application packages D and E. Then, FIG. 6 illustrates the state in which the installed applications D and E are performed.

Concretely, the application package D includes the programs D1 and D2, dependency information 618, and configuration information 619. The dependency information 618 indicates that the application D uses the accelerometer sensor 602. The configuration information 619 indicates that the application package D includes the programs D1 and D2.

Furthermore, the application package E includes the programs E1 and E2, dependency information 620, and configuration information 621. The dependency information 620 indicates that the application E uses the sound device 603. The configuration information 621 indicates that the application package E includes the programs E1 and E2.

When the application D installed in the smartphone 600 is started, the process D1 is generated by concretely executing the program D1, and the process D2 is generated by executing the program D2. In the example in FIG. 6, the PID of the process D1 is 1001, and the PID of the process D2 is 1011.

When the application D is a foreground application, the process D1 operates in the foreground. That is, the process of transmitting an instruction about a window display of the application D to the process of the window system 615 is the process D1.

On the other hand, the process D2 is a background process. As indicated by the dependency information 618, the application D uses the accelerometer sensor 602. In the example in FIG. 6, the access from the application D to the accelerometer sensor 602 is concretely realized by the process D2 performing an operation such as an opening operation, a reading operation, a closing operation, etc. on the resource file 610 corresponding to the accelerometer sensor 602.

When the application E installed in the smartphone 600 is started, the process E1 is concretely generated by performing the program E1, and the process E2 is generated by executing the program E2. In the example in FIG. 6, the PID of the process E1 is 1002, and the PID of the process E2 is 1012.

Furthermore, when the application E is a foreground application, the process E1 operates in the foreground. That is, the process of transmitting an instruction about window display of the application E to the process of the window system 615 is the process E1.

On the other hand, the process E2 is a background process. As indicated by the dependency information 620, the application E uses the sound device 603. in the example in FIG. 6, the process E2 concretely performs the processing for using the sound device 603. However, in the example in FIG. 6, the access to the sound device 603 as a particular resource is occupied by the process of the sound daemon 614 as a particular process.

Therefore, the process E2 concretely transmits an instruction for outputting sound to the sound device 603 to the process of the sound daemon 614. Then, the process of the sound daemon 614 accesses the sound device 603 at an instruction from the process E (to be more concrete, for example, invokes a "write" system call). As a result, the sound device 603 outputs sound.

FIGS. 7A and 7B illustrate an explanatory view of concrete examples of various types of data. The examples of various types of data in FIGS. 7A and 7B correspond to the examples in FIG. 6.

A concrete example of the process group member table 502 illustrated in FIG. 5 is exemplified in FIG. 7B. Concrete examples of the resource/file correspondence table 504, the resource dependency table 505, and the package information DB 506, which are illustrated in FIG. 5, are exemplified in FIG. 7A. Concrete examples of the list 507 of processes, and the list 518 of resource files to be monitored are exemplified in FIG. 7B. FIG. 7B further exemplifies concrete examples of the resource/process name correspondence table 520, the table 529 of time at which an application is used, and the list 530 of processes to be excluded from the forced termination. Because the tables 520 and 529 and the list 530 are used in a modified embodiment described later, the explanation of them is omitted here.

Each entry in the process group member table 502a exemplified in FIG. 7B associates an application name with the PID list using as an element the PID of each member of the process group relating to the application identified by the application name.

The first entry indicates that the process group of the application D includes the process having the PID 1001 (that is, the process D1 in FIG. 6) and the process having the PID 1011 (that is, the process D2 in FIG. 6).

The second entry indicates that the process group of the application E includes the process having the PID 1002 (that is, the process E1 in FIG. 6) and the process having the PID 1012 (that is, the process E2 in FIG. 6). The process group of the application E further includes the process having the PID 10 (that is, the process of the sound daemon 614 in FIG. 6) because the sound device 603 used by the application E is a particular resource, and the particular process corresponding to the sound device 603 is the process of the sound daemon 614.

Each entry in the resource/file correspondence table 504a exemplified in FIG. 7A corresponds to each resource available in the smartphone 500. The resource in the second embodiment is concretely the physical device 515, but a certain file stored in a database provided for the smartphone 500 but not illustrated in the attached drawings, or the smartphone 500 may be used as a resource.

Each entry of the resource/file correspondence table 504a includes a flag, an external resource name, and a resource file name.

The flag indicates whether or not a resource corresponding to the entry is a particular resource. In the example in FIG. 7A, an entry having the value of the flag of 1 corresponds to a particular resource, and the entry having the value of the flag of 0 corresponds to a resource other than the particular resource.

The external resource name is identification information for logical identification of the resource corresponding to the entry, and is concretely a name used for logical identification of a resource in the dependency information about an application package.

The resource file name is a full path file name of the resource file 516 as an interface to the resource corresponding to the entry.

For example, according to the first entry, the full path file name of the resource file 609 corresponding to the resource logically identified by the name "GPS" (that is, the GPS receiver 601 in FIG. 6) is "/dev/tty1". Since the access to the resource is not limited to the access from a particular process, the value of the flag is 0.

According to the second entry, the full path filename of the resource file 610 corresponding to the resource logically identified by the name "accelerometer sensor" (that is, the accelerometer sensor 602 in FIG. 6) is "/dev/tty2". Since the access to the resource is not limited to the access from the particular process, the value of the flag is 0.

According to the third entry, the full path file name of the resource file 611 corresponding to the resource logically identified by the name "sound" (that is, the sound device 603 in FIG. 6) is "/dev/snd". Since the access to the resource is limited to the access from a particular process (that is, the process of the sound daemon 614 in FIG. 6), the value of the flag is 1.

Each entry of the resource dependency table 505a exemplified in FIG. 7A associates a resource file name with the PID of the process to which the resource corresponding to the resource file name is currently allocated.

For example, according to the first entry, the resource for which an interface is provided by the resource file whose full path file name is "/dev/tty1" is currently opened by the process whose PID is 5, and is currently allocated to the process whose PID is 5. That is, the first entry indicates the state illustrated in FIG. 6 that "the GPS receiver 601 is currently allocated to the process of the location manager 613."

According to the second entry, the resource for which an interface is provided by the resource file whose full path file name is "/dev/tty2" is currently opened by the process whose PID is 1011, and is currently allocated to the process whose PID is 1011. That is, the second entry indicates the state illustrated in FIG. 6 that "the accelerometer sensor 602 is currently allocated to the process D2."

According to the third entry, the resource for which an interface is provided by the resource file whose full path filename is "/dev/snd" is currently opened by the process whose PID is 10, and is currently allocated to the process whose PID is 10. That is, the third entry indicates the state illustrated in FIG. 6 that "the sound device 603 is currently allocated to the process of the sound daemon 614."

Furthermore, each entry of the package information DB 506a exemplified in FIG. 7A corresponds to an application. Each entry includes an application name, a program name list, and a list of names of external resources to be used. This list hereafter may be referred to as a "used external resource name list". The application name is the name of the application corresponding to the entry. The program name list is a list of the names of the binary programs included in the application package identified by the application name. The used external resource name list is a list of pieces of identification information for logically identifying a resource which may be accessed from the application package identified by the application name. That is, the used external resource name list is a list of pieces of identification information for logically identifying a resource to which access is permitted by a user when the application package is installed.

For example, according to the first entry, the application D includes the programs D1 and D2, and a resource logically identified by the name "accelerometer sensor" may be accessed from the application D. That is, the first entry is generated according to the dependency information 618 and the configuration information 619 when the application package D in FIG. 6 is installed.

According to the second entry, the application E includes the programs E1 and E2, and a resource logically identified by the name "sound" may be accessed from the application E. That is, the second entry is generated according to the dependency information 620 and the configuration information 621 when the application package E in FIG. 6 is installed.

Each entry of the list 507a of processes exemplified in FIG. 7B corresponds to a process being operated, and includes the PID and the process name of the process. The list 507a of processes in FIG. 7B includes entries corresponding to the 9 processes exemplified in FIG. 6, and a entry corresponding to the "init" process, which always exists while the smartphone is running. As illustrated in FIG. 7B, the PID of the "init" process is 1.

The list 518a of resource files to be monitored, which is exemplified in FIG. 7B, is a list for definition of a monitoring target of the probe 509, and is concretely a list of full path filenames of the resource files 516 to be monitored.

According to the example in FIG. 6, the smartphone 600 includes the resources, that is, the GPS receiver 601, the accelerometer sensor 602, the sound device 603, and the display 604. However, it is assumed that the display 604 is not to be monitored in the description below. Therefore, the list 518a of resource files to be monitored is a list of the full path file names of the resource file 609 corresponding to the GPS receiver 601, the resource file 610 corresponding to the accelerometer sensor 602, and the resource file 611 corresponding to the sound device 603.

Next, the operation of each unit of the smartphone 500 illustrated in FIG. 5 is described below with reference to concrete examples illustrated in FIGS. 6 to 7B, and also with reference to the flowcharts illustrated in FIGS. 8 through 14.

Figure 8:
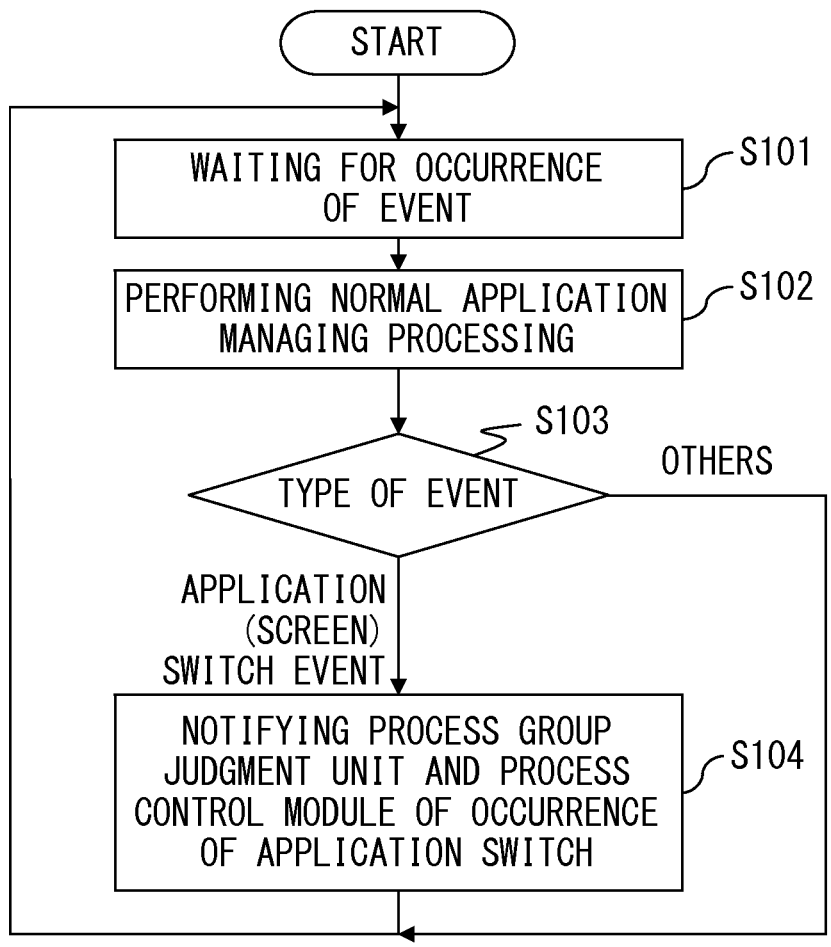
FIG. 8 is a flowchart of processing performed by a switch event notification unit according to the second embodiment.

FIG. 8 is a flowchart of the processing performed by the application manager 511 including the switch event notification unit 512 according to the second embodiment. The processing in FIG. 8 starts when the smartphone 500 is started.

In step S101, the application manager 511 waits for the generation of an event relating to the management of an application. When an event occurs, control proceeds to step S102. An event occurs, for example, when the input unit 510 receives the input from a user.

In step S102, the application manager 511 performs a normal application managing processing depending on the event detected in step S101. That is, depending on the type of event, the application manager 511 performs one or more processing in, for example, (12a) through (12g) below.

(12a) Starting a new application.
(12b) Terminating an application which has been running in the foreground.
(12c) Bringing an application which has been running in the foreground to the background.
(12d) Suspending an application which has been running in the foreground.

(12e) Bringing an application which has been running in the background to the foreground.

(12f) Resuming an application which has been suspended.

(12g) Instructing the window system to switch the direction in which the window is displayed.

After the execution in step S102, control proceeds to step S103. Then, in step S103, the switch event notification unit 512 judges the type of the event which has occurred. If the event which has occurred is an event of switching applications (that is, an event including switching the screen), control proceeds to step S104.

For example, if an event of starting a new application occurs when no application is started, then control proceeds to step S104. Simultaneously, if an event of switching the application in the foreground occurs by starting an application when another application is being started, then control also proceeds to step S104. Also when an explicit terminate instruction is input to the application being executed in the foreground, a type of application switch occurs, thereby passing control to step S104.

On the other hand, if an event which has occurred is another type of event, then control is returned to step S101. For example, when a user changes the direction of the smartphone 500 from vertical format to horizontal format, an event of switching the direction of display the window occurs. However, in this case, the contents displayed in the window stay unchanged, and obviously no application switching occurs. Therefore, control is returned from step S104 to step S101.

In step S104, the switch event notification unit 512 notifies the process group judgment unit 501 and the process control module 503 of an occurrence of application switching. Then, control is returned to step S101.

The details of the operation of the process group judgment unit 501 which receives the notification in step S104 are described later with reference to FIGS. 11A and 11B. The details of the operation of the process control module 503 which receives the notification in step S104 are described later with reference to FIGS. 12 through 14.

Figure 9:
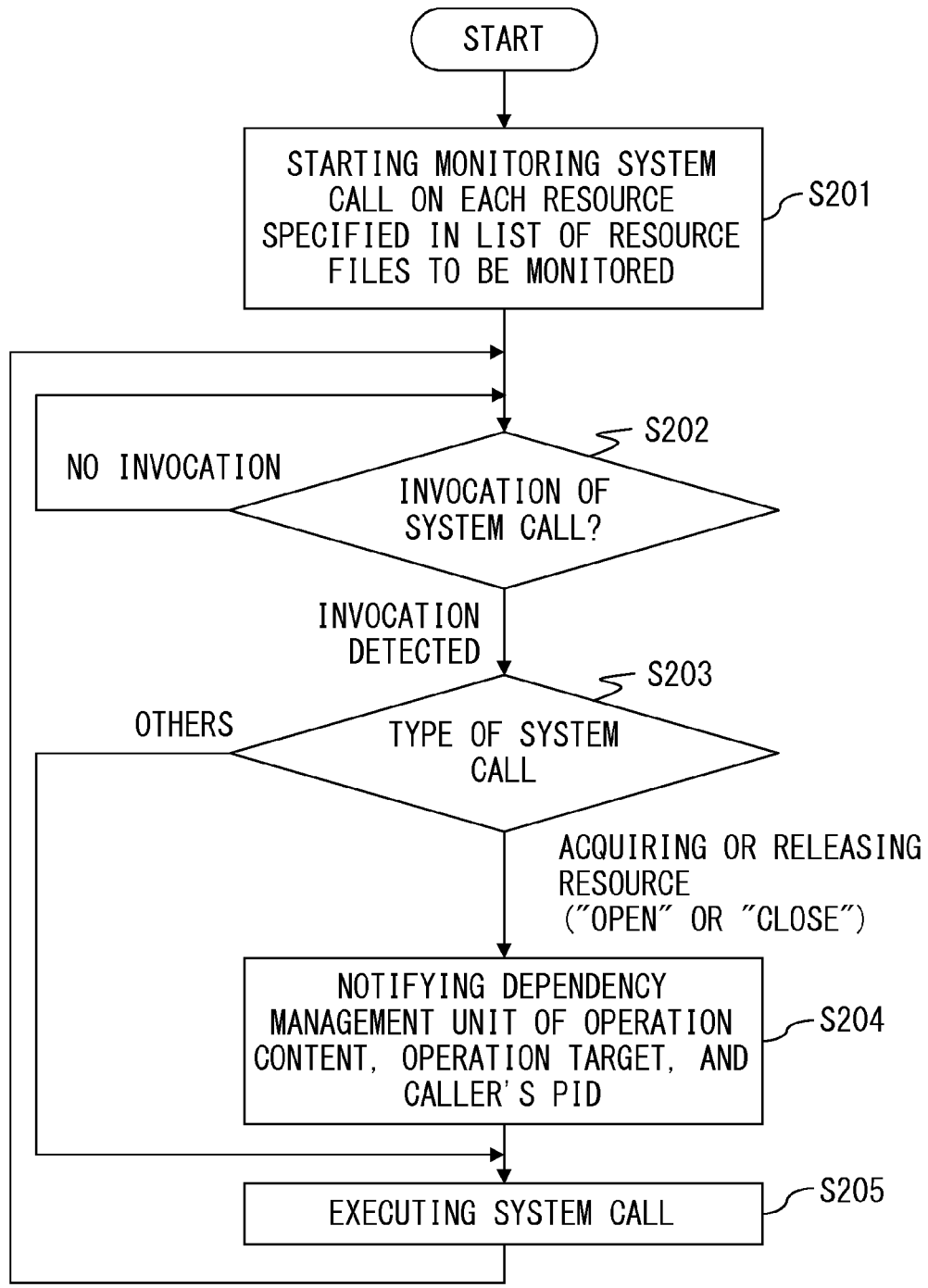
FIG. 9 is a flowchart of the processing performed by a probe according to the second embodiment.

Next, the processing performed by the probe 509 according to the second embodiment is described with reference to the flowchart in FIG. 9. The processing illustrated in FIG. 9 is started when the smartphone 500 is started.

In step S201, the probe 509 reads the list 518 of resource files to be monitored, and thereby recognizes the resource file 516 corresponding to the resource to be monitored. Then, the probe 509 starts monitoring a system call to each resource specified by the list 518 of resource files to be monitored (that is, the probe 509 starts monitoring a system call to each physical device 515 corresponding to the resource file 516 whose file name is included in the list 518 of resource files to be monitored). In the examples in FIGS. 6 to 7B, the resources to be monitored are the GPS receiver 601, the accelerometer sensor 602, and the sound device 603, which correspond to the resource files 609 through 611 respectively.

In the next step S202, the probe 509 waits for the invocation of the system call to the resource file 516 corresponding to the resource to be monitored. When a system call is invoked, control proceeds to step S203.

In step S203, the probe 509 judges the type of the system call. If the type of the system call is "open" for acquisition of a resource, or "close" for release of a resource, control proceeds to step S204. In the case of other types of system calls (for example, "read", "write", etc.), control is proceeds step S205.

In step S204, the probe 509 notifies the dependency management unit 508 of the operation content, the operation target, and the caller's PID (i.e., the PID of the process which invokes the system call). The operation content is the type of system call, and the operation target is expressed by the file name of the resource file 516.

For example, assume that the "open" system call to open the resource file 610 is invoked from the process D2, whose PID is 1011. According to the list 518a of resource files to be monitored in FIG. 7B, the resource file 610 in FIG. 6 is a monitoring target. Therefore, in this case, the probe 509 notifies the dependency management unit 508 that the operation content is "open", the operation target is "/dev/tty2", and the caller's PID is 1011, in step S204.

After the notification in step S204, control is passed to step S205. Then, in step S205, the probe 509 invokes the system call detected in step S202. As a result, the system call is executed. Then, control is returned to step S202.

For example, when the "open" system call from the process D2 to the resource file 610 is detected in step S202, the "open" system call to the resource file 610 is executed in step S205. That is, the resource file 610 is opened by the kernel 513.

The kernel 513 may return to the probe 509 a return value indicating that the "open" operation on the resource file 610 has been succeeded. The probe 509 may further return the return value from the kernel 513 to the caller process, which has originally invoked the system call, in step S205. Otherwise, the kernel 513 may return the return value directly to the caller process.

In the processing in FIG. 9 described above, each time the "open" or "close" system call to open or close one of the resource files 516 having the file name in the list 518 of resource files to be monitored is invoked, a notification is issued from the probe 509 to the dependency management unit 508. It is obvious that the kernel 513 performs the appropriate processing in response to the system call to the resource (such as the display 604 in the examples in FIGS. 6 to 7B) not to be monitored by the probe 509.

FIG. 10 is a flowchart of the processing performed by the dependency management unit 508 according to the second embodiment. The processing in FIG. 10 is also started when the smartphone 500 is started.

In step S301, the dependency management unit 508 waits for a notification from the probe 509. When the dependency management unit 508 receives a notification from the probe 509, control is passed to step S302.

In step S302, the dependency management unit 508 judges the type of event notified from the probe 509 (that is, the type of system call detected by the probe 509). As described above with reference to FIG. 9, the probe 509 notifies the dependency management unit 508 only the "open" or "close" system call made to the resource file 516 to be monitored.

When the type of event notified from the probe 509 is the acquisition of a resource (that is, the notified operation content is "open"), control proceeds to step S303. On the other hand, when the type of event notified from the probe 509 is the release of a resource (that is, the notified operation content is "close"), control proceeds to step S304.

In step S303, the dependency management unit 508 writes the PID, in association with the opened resource file 516, in the resource dependency table 505. After the write, control is returned to step S301.

For example, assume that the caller's PID notified from the probe 509 is 5, and the operation target notified from the probe 509 is "/dev/tty1". In this case, in step S303, the dependency management unit 508 searches the resource dependency table 505 for an entry having the resource file name "/dev/tty1", and writes the PID of 5, which is notified from the probe 509, to the PID field of the found entry.

In step S304, the dependency management unit 508 deletes the PID corresponding to the closed resource file 516 from the resource dependency table 505. After the deletion, control is returned to step S301.

For example, assume that the caller's PID notified from the probe 509 is 1011, and the operation target notified from the probe 509 is "/dev/tty2". In this case, in step S304, the dependency management unit 508 searches the resource dependency table 505 for the entry having the resource file name "/dev/tty2", and clears the PID field of the found entry.

By the above-mentioned processing in FIGS. 9 and 10, each time any resource file 516 specified in the list 518 of resource files to be monitored is opened or closed, the resource dependency table 505 is dynamically rewritten.

Although omitted in the description above, the resource dependency table 505 is initialized according to the list 518 of resource files to be monitored. For example, when the smartphone 500 is started, the dependency management unit 508 may refer to the list 518 of resource files to be monitored and initialize the resource dependency table 505.

The initialized resource dependency table 505 has an entry corresponding to each resource file name included in the list 518 of resource files to be monitored, and the PID field of each entry is cleared. For example, since the list 518a of resource files to be monitored in FIG. 7B includes three resource file names "/dev/tty1", "/dev/tty2", and "/dev/snd", the resource dependency table 505 is initialized to have three entries corresponding to these three resource file names, and the PID field of each entry is cleared.

Figure 11A:
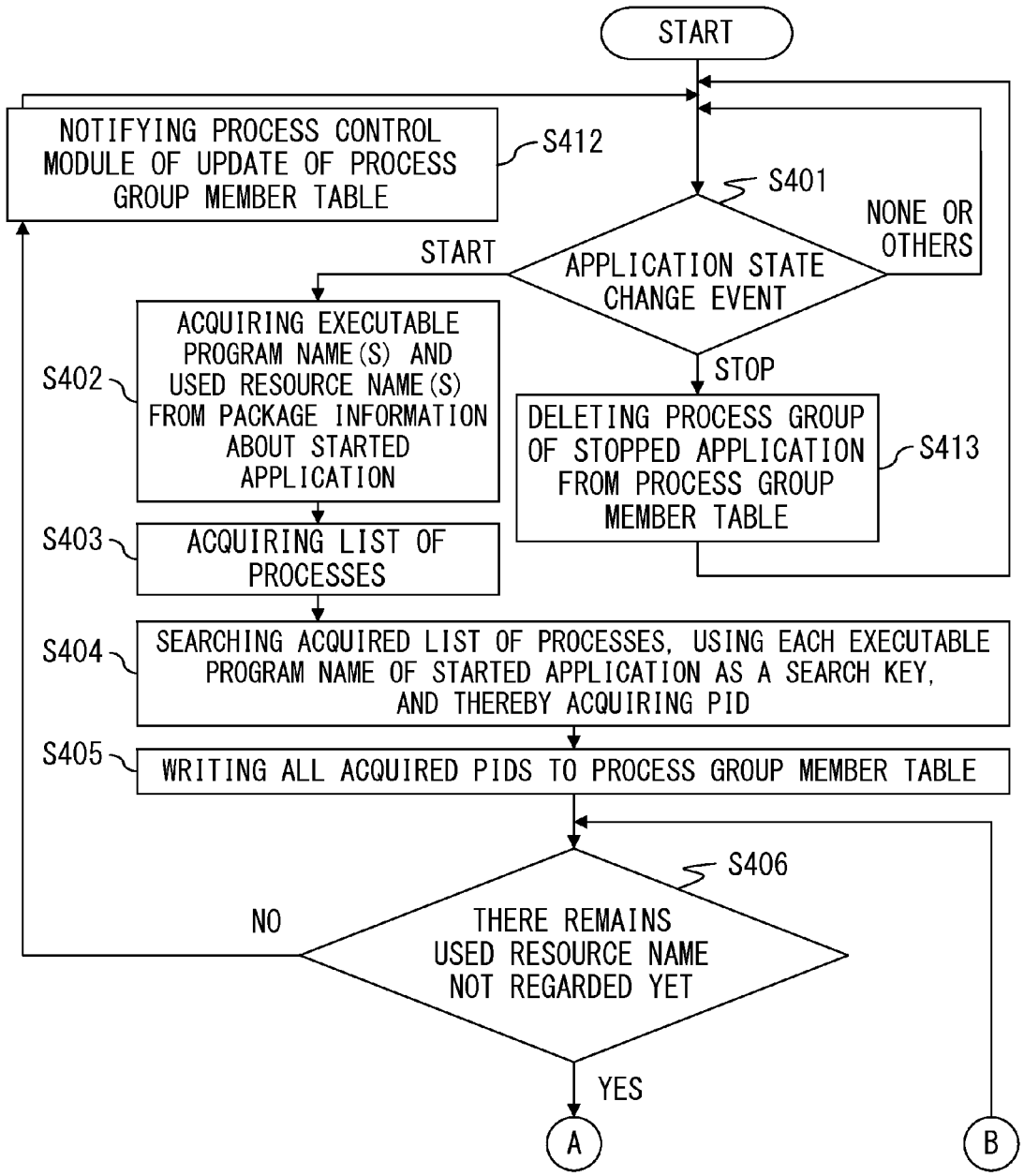

FIGS. 11A and 11B illustrate a flowchart of the processing performed by the process group judgment unit 501 according to the second embodiment. The processing illustrated in FIGS. 11A and 11B is also started when the smartphone 500 is started.

In step S401, the process group judgment unit 501 waits for the notification of a state change event of an application from the switch event notification unit 512. That is, the process group judgment unit 501 waits in step S401 until the switch event notification unit 512 issues a notification in step S104 illustrated in FIG. 8.

When an event of newly starting an application is notified, control proceeds to step S402. On the other hand, when an event of suspending an application is notified, control proceeds to step S413.

When an event not related to start or suspend is notified, the process group judgment unit 501 continues waiting in step S401. For example, if an application being executed in the background is switched to a foreground, the process group of the application is not changed. Therefore, the process group judgment unit 501 is not to perform any process. Accordingly, the process group judgment unit 501 continues waiting in step S401.

In step S402, the process group judgment unit 501 acquires an executable program name and a used resource name from the package information about the started application. The number of acquired executable program names is one or more, and the number of acquired used resource names is zero or more.

For example, assume that the switch event notification unit 512 notifies the process group judgment unit 501 that the application E has been started. In this case, in step S402, the process group judgment unit 501 searches the package information DB 506a using as a search key the application name of "E", which has been notified from the switch event notification unit 512.

Then, the process group judgment unit 501 acquires "E1" and "E2", as the executable program names of the application E, from the program name list of the found entry. In addition, the process group judgment unit 501 acquires a logical name of "sound", as the used resource name of the application E, from the used external resource name list of the found entry.

Next, in step S403, the process group judgment unit 501 acquires the list 507 of processes using, for example, the "ps" command. As exemplified in FIG. 7B, the list 507 of processes includes at least the process name of each process and the PID of each process.

Then, in the next step S404, the process group judgment unit 501 performs the following processing on each executable program name acquired in step S402. That is, the process group judgment unit 501 searches the list 507 of processes acquired in step S403 using the acquired executable program name as a search key, and thereby acquires the PID of the process generated by executing the program, from the search result.

For example, assume that the executable program names of "E1" and "E2" are acquired in step S402, and the list 507a of processes in FIG. 7B is acquired in step S403. In this case, in step S404, the process group judgment unit 501 acquires the PID of 1002 using the name "E1" as a search key, and acquires the PID of 1012 using the name "E2" as a search key.

Furthermore, in the next step S405, the process group judgment unit 501 writes all PIDs acquired in step S404 to the process group member table 502.

In more detail, the process group judgment unit 501 adds a new entry to the process group member table 502. Furthermore, the process group judgment unit 501 writes the name of the started application in the "application name" field of the added entry. The process group judgment unit 501 is able to recognize the name of the started application by the notification from the switch event notification unit 512. Then, the process group judgment unit 501 writes all PIDs acquired in step S404 in the "PID list" field of the added entry.

For example, when the PIDs of 1002 and 1012 are acquired as in the example above in step S404, the process group judgment unit 501 generates an entry corresponding to the started application E in step S405. Then, the process group judgment unit 501 records the PIDs of 1002 and 1012, in association with the application name "E", in the process group member table 502.

Then, in step S406, the process group judgment unit 501 judges whether or not there still remains the used resource name not regarded (i.e., focused on) as a target of the processing in and after step S407 in the used resource names acquired in step S402. If the number of used resource names acquired in step S402 is 0, or all acquired used resource names have been already regarded, then control proceeds to step S412. On the other hand, when there still remains a used resource name which has not been regarded yet in the used resource names acquired in step S402, control proceeds to step S407.

In step S407, the process group judgment unit 501 regards (i.e., focuses on) the next used resource name, and acquires a physical resource file name from a logical used resource name by using the resource/file correspondence table 504. That is, the process group judgment unit 501 searches the resource/file correspondence table 504 using the regarded used resource name as a search key, and reads a resource file name from the found entry.

For example, assume that the process group judgment unit 501 regards the used resource name "sound" in step S407, and the resource/file correspondence table 504 is identical to the resource/file correspondence table 504a in FIG. 7A. In this case, in step S407, the process group judgment unit 501 acquires the resource file name "/dev/snd" from the name "sound".

Then, in the next step S408, the process group judgment unit 501 reads, from the resource dependency table 505, the PID of the process to which the resource to be used by the started application is allocated. That is, the process group judgment unit 501 searches the resource dependency table 505 using as a search key the resource file name acquired in step S407, and reads the PID from the found entry.

For example, it is assumed that the file name "/dev/snd" is acquired in step S407, and that the resource dependency table 505 is identical to the resource dependency table 505a in FIG. 7A. In this case, in step S408, the process group judgment unit 501 acquires the PID of 10 from the file name "dev/snd".

As described above relating to step S304 in FIG. 10, when the resource is released, the PID of the resource dependency table 505 is cleared. Therefore, when there is no process to which a resource currently regarded by the process group judgment unit 501 is currently allocated, a valid PID value is not acquired in step S408. Depending on the embodiment, the operation of clearing a PID may be an operation of overwriting a NULL value, or may be an operation of overwriting a particular value such as −1, which is not used as a PID. Therefore, the process group judgment unit 501 is able to judge that "the PID has been cleared" if the value acquired in step S408 is NULL or −1.

Then, in the next step S409, the process group judgment unit 501 judges whether or not there is a valid PID in the resource dependency table 505 corresponding to the currently regarded resource file name. That is, the process group judgment unit 501 judges whether or not a valid PID has been acquired in step S408.

When a valid PID is acquired in step S408, control proceeds to step S410 to judge whether or not the acquired PID is to be added to the process group. On the other hand, if the PID has been cleared, there is no PID to be added to the process group relating to the resource currently regarded by the process group judgment unit 501, thereby returning control to step S406.

In step S410, the process group judgment unit 501 judges whether the type of the process of the PID read in step S408 is a system service which occupies the resource to provide access to the resource or an application. That is, the process group judgment unit 501 judges whether or not the process of the PID read in step S408 is a particular process.

For example, when the resource/file correspondence table 504 has a "flag" field as in the resource/file correspondence table 504a in FIG. 7A, the process group judgment unit 501 makes a judgment in step S410 as follows. The process group judgment unit 501 refers to the flag of the found entry by the search in step S407. If the value of the flag is 1, the process group judgment unit 501 judges that "the type of the process is a system service." On the other hand, if the value of the flag is 0, the process group judgment unit 501 judges that "the type of the process is an application."

Depending on the embodiments, the process group judgment unit 501 may make a judgment in step S410 according to another type of information. The smartphone 500 may hold a list of names of system services which occupy resources to provide access to the resources, and the process group judgment unit 501 may make a judgment in step S410 by referring to the list.

The process group judgment unit 501 may acquire the process name corresponding to the PID read in step S408 from a list 507 of process acquired in step S403. Therefore, the process group judgment unit 501 may judge whether or not the acquired process name is included in the list of the names of system services, performing a judgment in step S410.

If the type of the process of the PID read in step S408 refers to the system service which occupies resources to provide access to the resources, control proceeds to step S411. That is, if the resource currently regarded by the process group judgment unit 501 is a particular resource occupied by a particular process, control proceeds to step S411.

On the other hand, if the type of the process of the PID read in step S408 refers to an application, control is returned to step S406. That is, when the resource currently regarded by the process group judgment unit 501 refers to a normal resource other than a particular resource (that is, a resource which may be directly accessed from any application process), control is returned to step S406.

The reason is that the started application is independent of another application even if the resource currently regarded by the process group judgment unit 501 is currently opened by a process of another application incidentally. Including processes of two independent applications in the same process group does not satisfy the purpose of "the recognition of a process group for appropriate process management on an application-by-application basis." Therefore, if the type of the process whose PID has been read in step S408 indicates an application, control is returned to step S406.

In step S411, the process group judgment unit 501 adds the PID read in step S408 to the PID list of the entry added in step S405 in the process group member table 502. After the addition, control is returned to step S406.

For example, as in the example above, assume that the process group judgment unit 501 records the PIDs 1002 and 1012 in association with the application name "E" in step S405 in the process group member table 502, and acquires the PID of 10 in step S408. In this case, the process group judgment unit 501 further adds the PID of 10 in step S411. As a result, as the second entry in the process group member table 502a in FIG. 7B, the process group including the processes having the PIDs of 10, 1002, and 1012 is registered in the process group member table 502 as a process group of the application E.

The processing in step S412 is performed after all PIDs belonging to the process group relating to the started application have been registered in the process group member table 502. Then, in step S412, the process group judgment unit 501 notifies the process control module 503 of the update of the process group member table 502. The process control module 503 waits for the notification from the process group judgment unit 501 in step S412, thereby referring to the process group member table 502 after the update certainly. After the notification in step S412, control is returned to step S401.

In step S413, the process group judgment unit 501 deletes the process group of the suspended application from the process group member table 502. That is, the process group judgment unit 501 deletes the entry corresponding to the suspended application from the process group member table 502. Then, control is returned to step S401.

For example, assume that the switch event notification unit 512 notifies the process group judgment unit 501 that the application D has been suspended. In this case, in step S413, the process group judgment unit 501 searches the process group member table 502 using as a search key the application name of "D", and deletes the found entry from the process group member table 502.

When the process group judgment unit 501 makes a judgment in step S410 using the flag of the resource/file correspondence table 504*a*, the processing in FIGS. 11A and 11B above may be modified as follows. That is, the process group judgment unit 501 acquires the value of the flag with the resource file name in step S407. If the value of the flag is 0, steps S408 through S411 may be omitted and control may be returned to step S406. When the value of the flag acquired in step S407 is 1, the process group judgment unit 501 may perform the processing in steps S408 and S411.

Although omitted in FIG. 11A, step S402 may include the following error handling.

The application manager 511 may be configured to detect the start of a program other than a user application. In this case, when a service such as the sound daemon 614 etc. is restarted for any reason, a notification may be issued from the switch event notification unit 512 to the process group judgment unit 501.

Although error handling is omitted in FIG. 11A, the process group judgment unit 501 may immediately terminate the processing in FIGS. 11A and 11B if an entry is not found in the search of the package information DB 506 in step S402.

According to the above-mentioned error handling, even if the start of a service causes the transition from step S401 to step S402, an entry relating to the started service will not be erroneously generated in the process group member table 502. Furthermore, when the application manager 511 is able to discriminate a user application from another program (for example, a server etc.), the switch event notification unit 512 may define only a state change event of the user application as a notification target. Then, even if error handling is not performed in step S402 as described above, an entry related to a service is not erroneously generated in the process group member table 502.

Figure 12:
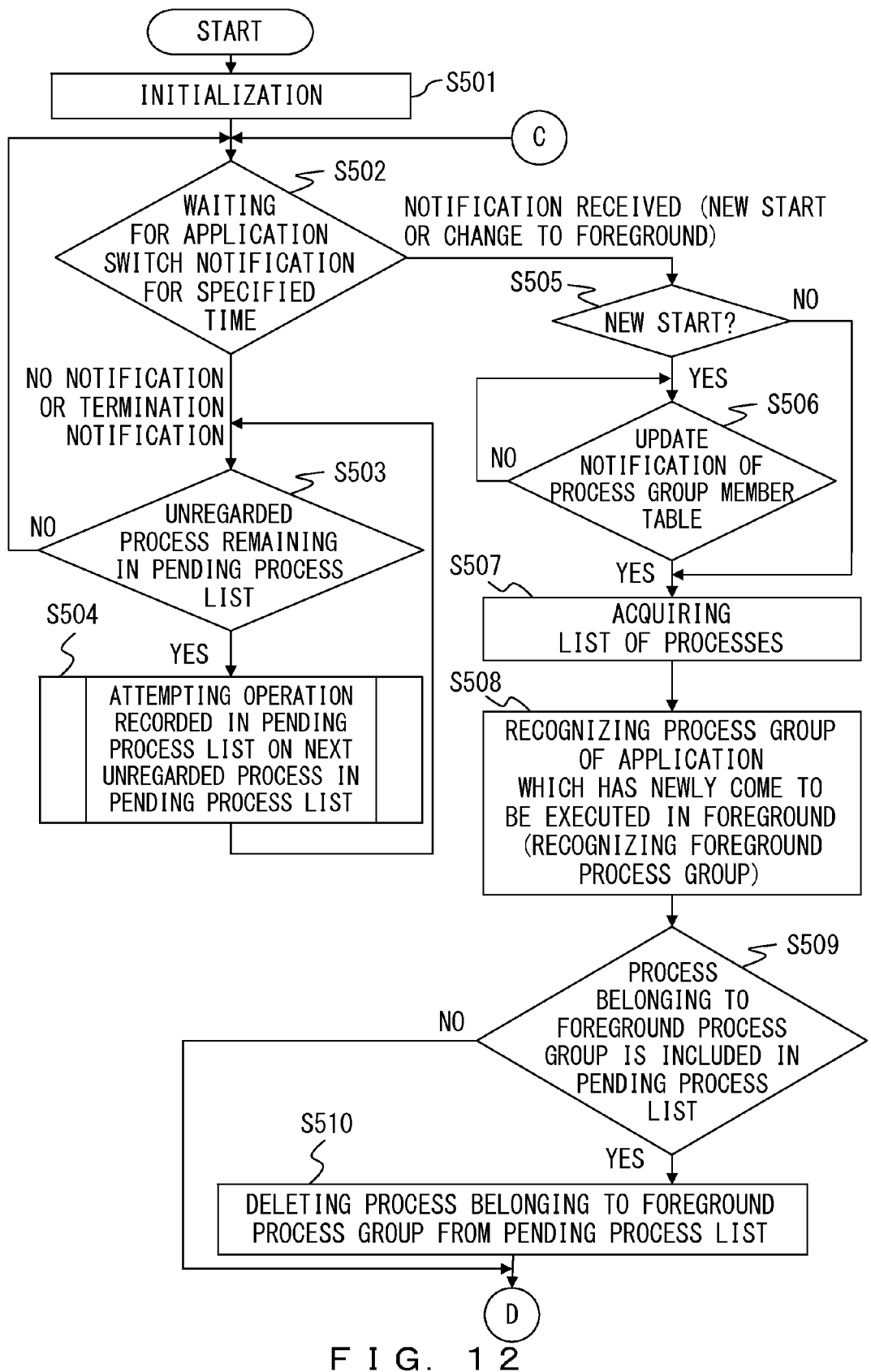
FIG. 12 is a flowchart (No. 1) of the processing performed by a process control module according to the second embodiment.
Figure 13:
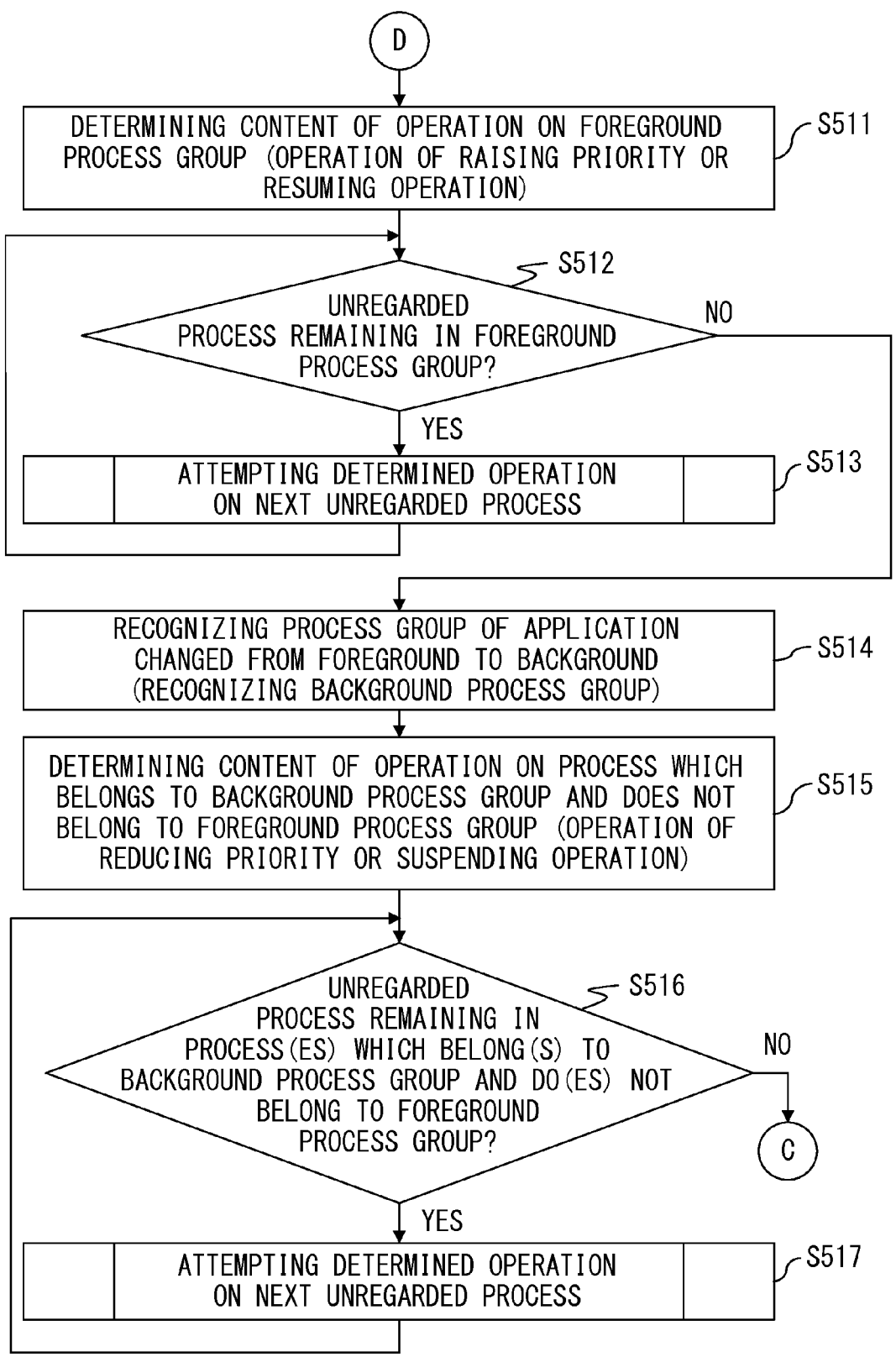
FIG. 13 is a flowchart (No. 2) of the processing performed by the process control module according to the second embodiment.
Figure 14:
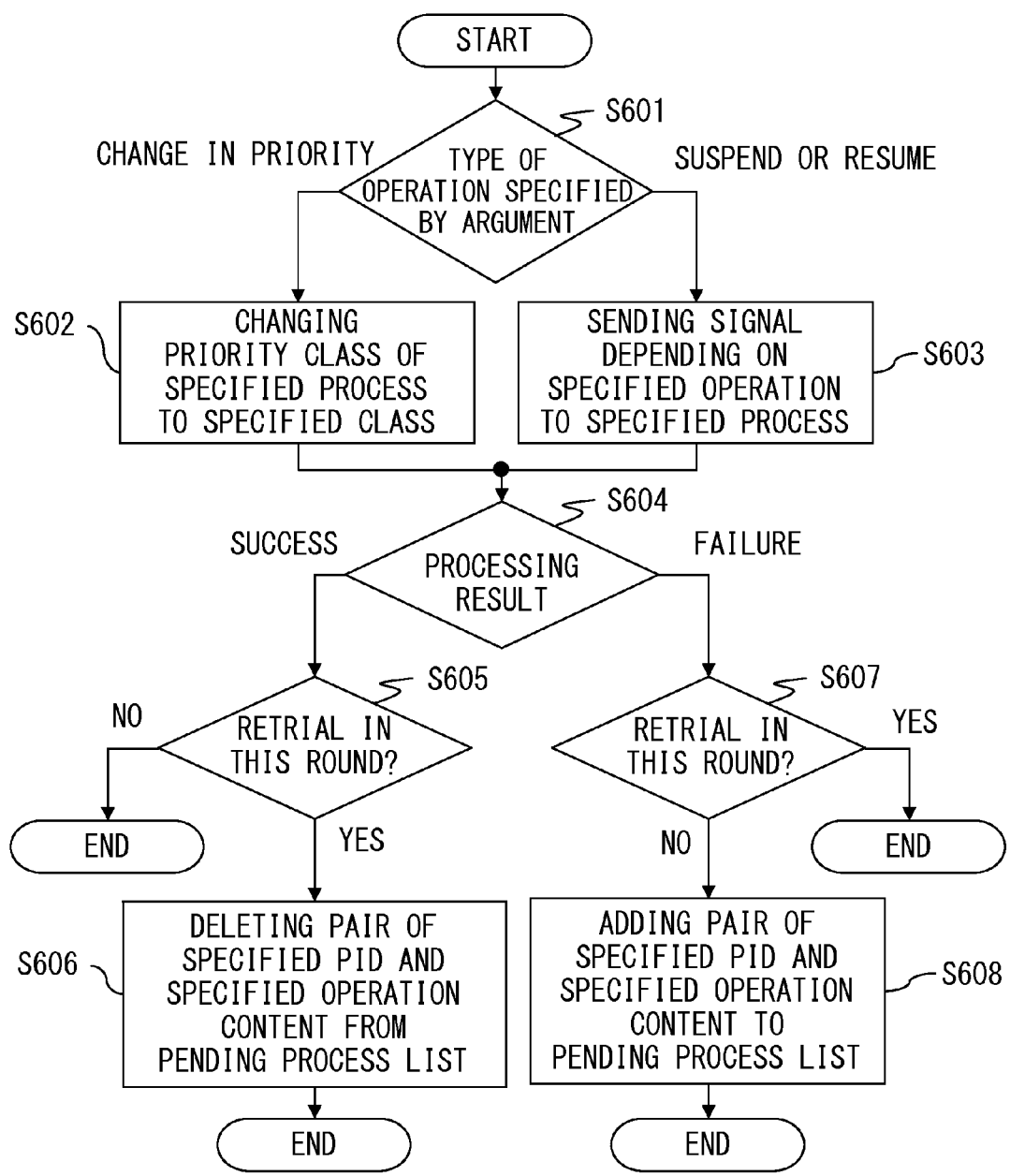
FIG. 14 is a flowchart of a subroutine called from the processing in FIGS. 12 and 13.

FIGS. 12 and 13 illustrate a flowchart of the processing performed by the process control module 503 according to the second embodiment. The processing in FIGS. 12 and 13 are started when the smartphone 500 is started. FIG. 14 is a flowchart of a subroutine invoked from FIGS. 12 and 13.

In step S501, the process control module 503 performs appropriate initialization as appropriate. For example, the process control module 503 initializes internal data. In addition, as the modified embodiment described later, when the process group judgment unit 501 uses any information defined in advance (for example, the resource/file correspondence table 504), the process group judgment unit 501 may read the information defined in advance in step S501.

In the next step S502, the process control module 503 waits for a switch notification of an application from the switch event notification unit 512 for a certain time. The notification from the switch event notification unit 512 to the process control module 503 is described with reference to step S104 in FIG. 8.

When no notification is received from the switch event notification unit 512 within the certain time, control proceeds to step S503. Also when the switch event notification unit 512 notifies the process group judgment unit 501 that the application which has been executed in the foreground has simply terminated without switching to another application, control proceeds to step S503.

When the process group judgment unit 501 receives a notification from the switch event notification unit 512 that a new application has been started or that an application which has already been started has been brought to the foreground, control proceeds to step S505. For example, when an application running in the background or an application being suspended is selected for execution in the foreground, control proceeds from step S502 to step S505.

In step S503, the process control module 503 refers to a pending process list which is stored as internal data of the process control module 503. As described in detail later, the pending process list is used for memorizing a process(es) to be handled and the content of control over the process(es) for future retrial to be performed after the process control module 503 attempts some kind of control on the process and fails.

For example, as indicated by the arrow from the process control module 503 to the kernel 513 and the arrow from the kernel 513 to the process 517 in FIG. 5, the process control module 503 may control the process using a system call. Each element of the pending process list may be, for example, a system call which includes the PID of a process as an argument. Otherwise, each element of the pending process list may be a pair of the PID of a process and a signal to be sent to the process.

The process control module 503 refers to the pending process list in step S503, and judges whether or not a process which has not been regarded is left in the pending process list. If the pending process list is empty, or if all processes in the pending process list have been regarded and the processing in step S504 is terminated, then control is returned to step S502. On the other hand, if the pending process list is not empty and one or more processes which have not been regarded as a processing target in step S504 are left in the pending process list, then control proceeds to step S504.

Then, in step S504, the process control module 503 the process control module 503 tries to perform an operation recorded in the pending process list on the next process which has not been regarded in the pending process list.

For example, assume that the process control module 503 tries to suspend the process having the PID of 1200, and fails in the suspension for any reason. In this case, the pending process list stores the PID of 1200 and the operation content of suspension. Then, in step S504, the process control module 503 tries again to suspend the process having the PID of 1200.

Step S504 is described later in detail with reference to FIG. 14. The subroutine illustrated in FIG. 14 concretely includes, as its arguments, the PID of the process, the operation content, and the retrial flag. The retrial flag indicates whether the operation on the process is the retrial based on the pending process list or is the first trial. In the subroutine call in step S504, the process control module 503 sets the retrial flag to a value indicating a retrial (for example, 1). After the execution in step S504, control is returned to step S503.

The process control module 503 thus performs retry processing as appropriate in spare time (that is, in a time period during which it is unnecessary to perform processing in and after step S505 because no application switch occurs) as in steps S502 through S504.

In step S505, the process control module 503 judges whether or not the event notified from the switch event notification unit 512 refers to the start of a new application.

If a new application is started, the process group member table 502 referred to by the process control module 503 is just being rewritten by the process group judgment unit 501. Then, control proceeds to step S506 to wait for the completion of the rewrite of the process group member table 502 by the process group judgment unit 501.

On the other hand, when a new application is not started, the process group of the application which is newly switched to the foreground has already been registered in the process group member table 502. For example, when an application which has been brought to the background after once started, and has been just executed in the background is now brought to the foreground, the process group has already been registered in the process group member table 502. Furthermore, when an application which has been suspended after once started is now resumed and executed in the foreground, the process group has already been registered in the process group member table 502. Therefore, when a new application is not started, control proceeds to step S507.

In step S506, the process control module 503 waits for a notification from the process group judgment unit 501 that "the update of the process group member table 502 has been completed." The notification received by the process control module 503 in step S506 is issued by the process group judgment unit 501 in step S412 illustrated in FIG. 11A. When the process control module 503 receives the notification, control proceeds to step S507.

In step S507, the process control module 503 acquires the list 507 of processes.

For example, when the application E is newly started, the execution of the programs E1 and E2 of the application E has already been started at the arrival of the notification detected in step S506 at the process control module 503. Therefore, the list 507 of processes acquired in step S507 lists the processes E1 and E2.

In the next step S508, the process control module 503 recognizes a process group of the application which has newly come to be executed in the foreground. For convenience of explanation below, the process group recognized in step S508 is referred to as a "foreground process group".

For example, assume that in step S502, the process control module 503 has received the notification that "the application E has been started" from the switch event notification unit 512. In this case, the process control module 503 searches the process group member table 502 using the application name "E" as a search key, and recognizes a process group associated with the application E in step S508. When the process group member table 502 is identical to the process group member table 502a illustrated in FIG. 7B, the process control module 503 recognizes the process group including the processes having the PIDs of 10, 1002, and 1012 in step S508.

Then, in the next step S509, the process control module 503 judges whether or not the pending process list includes a process belonging to the foreground process group. If the process belonging to the foreground process group is included in the pending process list, control proceeds to step S510. On the other hand, when a process belonging to the foreground process group is not included in the pending process list, control proceeds to step S511 in FIG. 13.

In step S510, the process control module 503 deletes any process belonging to the foreground process group from the pending process list.

For example, assume that the pending process list records a suspending operation on the process having the PID of 1200. Also assume that the process having the PID of 1200 belongs to the foreground process group.

The process belonging to the foreground process group is the process which the process control module 503 is just going to control as described below in steps S511 through S513. Concretely, the process control module 503 determines content of an operation on the process belonging to the foreground process group in step S511.

If the process having the PID of 1200 is not deleted from the pending process list, the process having the PID of 1200 will be appropriately controlled in steps S511 through S513, but then will be suspended in step S504 which is to be executed again in the future. That is, when the type of the operation determined by the process control module 503 as appropriate control on the process having the PID of 1200 is changed, a new operation is overwritten by an old operation.

Thus, to prevent the inconvenience that "the new operation is overwritten by the old operation," the process control module 503 deletes the process belonging to the foreground process group from the pending process list in step S510. Then, control proceeds to step S511 in FIG. 13.

In step S511, the process control module 503 determines the content of the operation on the foreground process group. Concretely, the process control module 503 determines to perform an operation for raising the priority or a resuming operation on each process belonging to the foreground process group.

Depending on the embodiment, the process control module 503 may constantly determine in step S511 the operation for raising the priority as an operation to be performed on the foreground process group. Otherwise, the process control module 503 may constantly determine in step S511 the resuming operation as the operation to be performed on the foreground process group. The process control module 503 may also determine in step S511 the operation content depending on the status of the load etc. of the smartphone 500.

In the next step S512, the process control module 503 judges whether or not there is a process not regarded yet in the foreground process group. If there is a process which has not been regarded yet by the process control module 503 in the foreground process group as a processing to be performed in step S513, then control proceeds to step S513. On the other hand, if the process control module 503 has already completed the processing in step S513 on all processes in the foreground process group, then control proceeds to step S514.

In step S513, the process control module 503 tries to perform the operation determined in step S511 on the process to be next regarded in the foreground process group. Then, control is returned to step S512.

The details of step S513 are described later with reference to FIG. 14, but in step S513, the above-mentioned retrial flag is set to the value indicating the first trial (for example, 0).

In step S514, the process control module 503 recognizes the process group of the application which has switched from the foreground to the background. For convenience of explanation below, the process group recognized in step S514 is referred to as a "background process group".

For example, assume that the event notified from the switch event notification unit 512 in step S502 is that "the application E has been started and the application D which has been executed in the foreground is switched to the background." In this case, the background process group is associated with the application D and recorded in the process group member table 502.

Otherwise, assume that the event notified from the switch event notification unit 512 in step S502 is that "the application E has been started from the state in which no application is performed." In this case, there is no application which is switched from the foreground to the background. Therefore, the process control module 503 recognizes that "the background process group is empty" in step S514.

In the next step S515, the process control module 503 determines the content of the operation on the process which belongs to the background process group, and does not belong to the foreground process group. The content of the operation determined in step S515 is concretely an operation of reducing the priority or a suspending operation.

Depending on the embodiments, the process control module 503 may constantly select the operation of reducing the priority in step S515. Otherwise, the process control module 503 may constantly select the suspending operation in step S515. In another case, the process control module 503 may determine the content of the operation in step S515 depending on the situation of the load etc. of the smartphone 500.

Then, in the next step S516, the process control module 503 judges whether or not there is a process which has not been regarded in the processes which belong to the background process group, but do not belong to the foreground process group.

If there is a process which the process control module 503 has not regarded as a processing target in step S517, then control proceeds to step S517.

On the other hand, if the process control module 503 has completely performed the processing in step S517 on all processes which belong to the background process group, but do not belong to the foreground process group, control is returned to step S502 in FIG. 12. Similarly in the case in which there is no process which belongs to the background process group, but does not belong to the foreground process group, control is returned to step S502.

In step S517, the process control module 503 tries to perform the operation determined in step S515 on the next process which has not been regarded yet, belongs to the background process group, but does not belong to the foreground process group. Then, control is returned to step S516.

The details of step S517 is described later with reference to FIG. 14, but in step S517, the above-mentioned retrial flag is set to the value indicating the first trial (for example, 0).

From the processing target in step S517, the reason for the removal of the process which belongs to the foreground process group is described below.

When the first and second applications use the same particular resource, the same particular process is included in the process group of the first application, and in the process group of the second application. For example, assume that the first and second applications use the sound device 603. In this case, the process of the sound daemon 614 which occupies the sound device 603 and provides access to the sound device 603 is also included in the process group of the first application, and in the process group of the second application.

Then, when the foreground application is switched from the first application to the second application, it is not appropriate to perform the process in step S517 on all processes belonging to the background process group. If the priority is reduced only because the process of the sound daemon 614 belongs to the background process group, then the performance of the second application which uses the sound device 603 is inconveniently affected. Therefore, in the processes which belong to the background process group, it is appropriate that the process which also belongs to the foreground process group is removed from among the processing targets in step S517.

As it is clear from the explanation relating to FIGS. 12 and 13, a process which does not belong to a process group of any application is not controlled by the process control module 503.

For example, no entry which associates the display 604 with the resource file 612 is registered in the resource/file correspondence table 504a in FIG. 7A. Therefore, the window system 615 which accesses the resource file 612 naturally does not belong to a process group of any application. Therefore, the process of the window system 615 is not controlled by the process control module 503.

Most applications use the window system 615. Therefore, it is inappropriate that the process control module 503 reduces the priority of the process of the window system 615 or suspends the process of the window system 615. However, as described above, since the process of the window system 615 is not controlled by the process control module 503, the inappropriate control does not occur naturally.

Furthermore, as described above, the entry associated with a process other than an application (for example, a process such as a service etc.) is not included in the process group member table 502. Therefore, a particular process such as the "init" process is not controlled by the process control module 503. That is, the control by the process control module 503 does not inconveniently affect a particular process not related to an application.

Next, the details of the subroutine invoked from the above-mentioned steps S504, S513, and S517 are described with reference to FIG. 14. The arguments of the subroutine in FIG. 14 concretely include the PID for specifying the process to be operated (i.e., to be handled), the type of operation, and a retrial flag.

In step S601, the process control module 503 judges the type of the operation specified by the argument. When the type of the specified operation indicates a change of priority, control proceeds to step S602. When the type of the specified operation indicates suspension or resumption, control proceeds to step S603.

In step S602, the process control module 503 changes the priority class of the process whose PID is specified by the argument into a class specified by the argument. The priority of a process is managed by a different method depending on the OS. For example, in the second embodiment, the priority of a process is specified to be any of a plurality of priority classes.

For example, there may be two priority classes defined by the OS, that is, a "high priority class" and a "low priority class". In this case, the operation of raising the priority is setting the priority class as the high priority class, and the operation of reducing the priority is setting the priority class as the low priority class.

Obviously, three or more priority classes may be defined. In this case, the process control module 503 may determine in step S511 which higher priority class is to be attained, and may determine in step S515 which lower priority class is to be attained.

The lowest priority class may be a special class in which the assignment of the CPU time is fixed to 0. In this case, a temporarily suspending operation may substantially be realized by a priority reducing operation.

In step S603, the process control module 503 sends a signal depending on the operation specified by the argument to a process whose PID is specified by the argument. The argument indicating the content of an operation may be just the value of the signal to be sent.

For example, if the specified operation indicates temporary suspension, the process control module 503 sends a signal for temporary suspension (for example, SIGSTOP). If the specified operation indicates resumption, the process control module 503 sends a signal for resumption (for example, SIGCONT). When the signal for resumption is sent to a process not being suspended (that is, sent to a process that is running), the signal is simply ignored, thereby causing no harmful side effect.

After the execution of step S602 or S603, control proceeds to step S604. In step S604, the process control module 503 judges whether "the operation in step S602 or S603 has succeeded or failed."

For example, the processing in step S602 and S603 may be realized by a system call, and a return value indicating whether the system call has succeeded or failed may be returned from the kernel 513 to the process control module 503. Then, the process control module 503 is able to make a judgment in step S604 based on the return value.

Otherwise, in step S604, the process control module 503 may refer to the priority class of the process to be controlled, and judge whether or not the priority class has correctly been set as specified by the argument. Similarly, in step S604, the process control module 503 may refer to the state of the process to be controlled and judge whether or not the process has been correctly suspended or resumed.

When the operation in step S602 or S603 succeeds, control proceeds to step S605. On the other hand, when the operation in step S602 or S603 fails, control proceeds to step S607. The case in which the operation in step S602 or S603 fails may be, for example, the case in which the process to be handled is currently executing some system call, or the case in which the process to be handled has opened a certain resource and the resource is currently allocated to the process.

In step S605, the process control module 503 refers to the value of the retrial flag specified as the argument, and judges whether or not the subroutine call in this round refers to a retrial. If the subroutine call in this round refers to a retrial, then control proceeds to step S606. If the subroutine call in this round refers to the first trial, the processing in FIG. 14 terminates.

Then, in step S606, the process control module 503 deletes a pair of a PID specified by the argument and content of an operation specified by the argument from the pending process list. That is, since it is unnecessary to further retry the operation which has succeeded by the retrial, an element is deleted from the pending process list in step S606. Then, the processing in FIG. 14 terminates.

In step S607, the process control module 503 refers to the value of the retrial flag specified as the argument, and judges whether or not the subroutine call in this round refers to a retrial.

If the subroutine call in this round refers to a retrial, the process control module 503 terminates the processing in FIG. 14 without updating the pending process list. This is because, when the process control module 503 fails again the operation which the process control module 503 failed previously, the operation still remains a retrial target.

On the other hand, if the subroutine call in this round is the first trial, control proceeds to step S608. Then, in step S608, the process control module 503 adds a pair of the PID specified by the argument and content of an operation specified by the argument to the pending process list. Then, the processing in FIG. 14 terminates.

As described above, according to the second embodiment, an appropriate process group is realized based on the resource used by an application. Then, appropriate control is performed on the process group of the application executed in the foreground and the process group of the application switched from the foreground to the background. Therefore, even if the hardware of the smartphone 500 is poor, the hardware is assigned dominantly to the process group of the foreground application. As a result, the performance experienced by the user who uses the foreground application is kept in a good condition.

For example, even if the clock frequency of the CPU 201 of the smartphone 500 is not very high, the CPU time is dominantly assigned to the process(es) which belong(s) to the process group of the foreground application according to the second embodiment. Therefore, for example, a relatively short response time is realized. As a result, the user may comfortably use the foreground application, and feel the high performance.

The second embodiment described above may be modified from the viewpoints of (13a) through (13h) below, and the modified embodiments of (13a) through (13h) may be arbitrarily combined so far as the combination is consistent.

(13a) Depending on the mechanism of priority control performed by the OS, the method of the priority control performed by the process control module 503 may be appropriately modified.

(13b) To reduce the load of the probe 509, the resource which is clearly not used may be excluded from the target to be monitored by the probe 509.

(13c) To reduce the load of the probe 509, a particular resource, which is always accessed from a particular process, may be excluded from the target to be monitored by the probe 509.

(13d) When a descendant process may be dynamically generated, the parent-child relationship between processes may be referred to in order to achieve recognition of a more appropriate process group.

(13e) When the process control module 503 performs suspending control, exception handling may be performed in order to avoid a side effect due to the suspension.

(13f) To solve the shortage of memory, forcible termination control may be performed using a process group.

(13g) It is unnecessary for the probe 509 to be implemented within the kernel 513.

(13h) The control performed by using a pending process list may be appropriately modified.

In the description below, modified embodiments of (13a) through (13h) are described.

The mechanism of the priority control depends on the OS. A certain type of OS has only one priority class. A certain type of OS having only one priority class manages the priority of a process by a dynamically varying value. Then, a process scheduler in the OS schedules a process depending on the dynamically varying value. The modified embodiment of (13a) above is a concrete example in which the subroutine in FIG. 14 is modified into what is illustrated in FIG. 15 when there is only one priority class.

With the OS having only one priority class, the priority of a process is dynamically controlled based on the "niceness" set for the process by, for example, the "nice" command. For example, when the process takes the longer CPU time, the dynamic value indicating the priority of the process is rewritten into a value indicating the lower priority. Therefore, the dynamic value indicating the priority of a process tends to indicate a lower priority with the lapse of time.

In the modified embodiment of (13a), the subroutine in FIG. 14 is replaced with the subroutine in FIG. 15. The process control module 503 holds a list of targets for priority handling, as its internal data for setting again the priority, which tends to be dynamically reduced. Hereinafter, this list may be referred to as a "priority handling target list". Each element of the priority handling target list is a pair of a PID and a niceness.

Although omitted in the attached drawings, in the modified embodiment of (13a), the processing in FIGS. 12 and 13 by the process control module 503 is modified as follows. That is, the process control module 503 is modified as follows. That is, the process control module 503 clears the priority handling target list before step S512 (for example, immediately after step S511).

The processing in FIG. 15 is described below. In step S701, the process control module 503 judges the type of operation specified by the argument. When the type of the specified operation indicates a change of priority, control proceeds to step S702. If the type of the specified operation indicates suspension or resumption, control proceeds to step S704.

In step S702, the process control module 503 changes the niceness indicating the static priority of the process whose PID is specified by the argument into a value specified by the argument. The processing in step S702 may concretely be realized by the execution of the "nice" command.

In the next step S703, the process control module 503 adds a pair of the PID specified by the argument and the value specified by the argument to the priority handling target list. Then, control proceeds to step S705.

In step S704, the process control module 503 sends a signal depending on the operation specified by the argument to the process whose PID is specified by the argument. Step S704 is identical to step S603. After the execution of step S704, control proceeds to step S705.

Steps S705 through S709 are identical to steps S604 through S608 in FIG. 14.

In the modified embodiment (13a), the process control module 503 further performs the following processing periodically. That is, for each element of the priority handling target list (that is, a pair of a PID and niceness), the process control module 503 sets the niceness recorded for the pair in the process identified by the PID of the pair.

As described above, a dynamic value indicating the priority of a process tends to indicate a lower priority with the lapse of time. However, the dynamic value is reset when the niceness is set.

Therefore, the process control module 503 sets again the niceness of each process periodically registered in the priority handling target list as described above, thereby somewhat suppressing the reduction of the dynamic priority of each process registered in the priority handling target list. That is, in step S511 in FIG. 13, when a foreground process group is determined as a target for the improvement of a priority, the niceness is periodically set again to keep a high dynamic priority of each process which belongs to the foreground process group.

Described next are modified embodiments of (13b) through (13f). In the modified embodiments of (13b) through (13f), a processing module is further added to the smartphone 500 in FIG. 5, and the smartphone 500 further holds other data. The processing module and the data added in the modified embodiments of (13b) through (13f) are described below with reference to FIG. 16.

Figure 16:
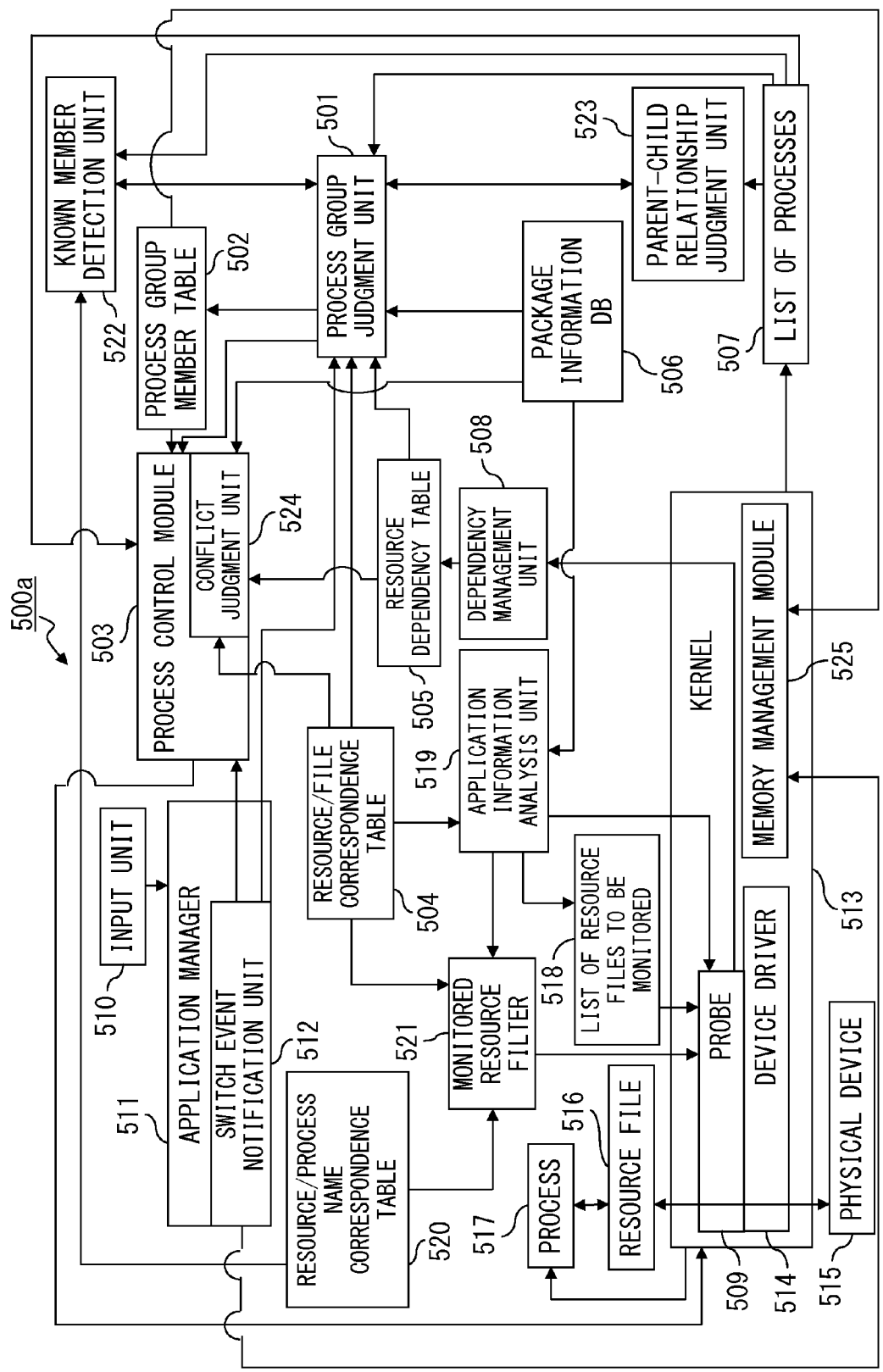
FIG. 16 is a block diagram of a smartphone according to a modification of the second embodiment.

FIG. 16 is a block diagram of the smartphone 500a when the modified embodiments of (13b) through (13f) are combined. The smartphone 500a in FIG. 16 includes various processing modules similar to those of the smartphone 500 in FIG. 5, and holds various types of data similar to those of the smartphone 500.

Furthermore, the smartphone 500a further includes an application information analysis unit 519 used in the modified embodiment (13b). In addition, the smartphone 500a includes a resource/process name correspondence table 520, a monitored resource filter 521, and a known member detection unit 522 used in the modified embodiment (13c). The smartphone 500a also includes a parent-child relationship judgment unit 523 used in the modified embodiment (13d).

Furthermore, the process control module 503 of the smartphone 500a includes a conflict judgment unit 524 used in the modified embodiment (13e). The kernel 513 of the smartphone 500a includes a memory management module 525 used in the modified embodiment (13f). The details of the memory management module 525 are described later with reference to FIG. 28.

The details of the above-mentioned processing module and data added to the smartphone 500a in FIG. 16 are described later with the detailed descriptions of the modified embodiments (13b) through (13f).

For convenience of illustration below, FIG. 16 exemplifies the smartphone 500a obtained by combining the modifications (13b) through (13f). However, it is obvious that each of the modifications (13b) through (13f) may be singly applied to the second embodiment. For example, only the modification (13f) is applied to the second embodiment, only the memory management module 525 in FIG. 16 may be added to the kernel 513 of the smartphone 500 in FIG. 5. Similarly, each of the modifications (13b) through (13e) may be singly applied to the second embodiment.

Described next is the modified embodiment (13b) in which the processing load of the probe 509 is reduced by removing the resource which is clearly not used from the monitoring target of the probe 509.

The list 518 of resource files to be monitored in the second embodiment is static information set in advance depending on the hardware configuration of the smartphone 500. However, for example, there may be the physical device 515 which is not accessed from any user application installed in the smartphone 500 in a plurality of physical devices 515 in the smartphone 500. Then, it is unnecessary for the probe 509 to monitor the access to the physical device 515 not accessed from any user application.

For example, the smartphone 500a in FIG. 16 may include the GPS receiver 601 in FIG. 6 as one of the physical devices 515. However, there may be no application which uses the GPS receiver 601 in the smartphone 500a.

Then, to recognize a process group related to an application, it is unnecessary to monitor access to the GPS receiver 601. Therefore, it is possible to remove an unnecessary load on the probe 509 by excluding the GPS receiver 601 from a monitoring target of the probe 509.

Even if there is no application which uses the GPS receiver 601, the location manager 613 provided by the OS may use the GPS receiver 601. Nevertheless, note that each process group which the process group judgment unit 501 is to recognize corresponds to an application, not to a module provided by the OS. Therefore, it is unnecessary for the probe 509 to monitor the access, which is irrelevant to any application, of the location manager 613 to the GPS receiver 601.

Then, in the modified embodiment (13b), a resource which is clearly not used by an application is removed from the monitoring target of the probe 509.

Concretely, in the modified embodiment of (13b), the list 518 of resource files to be monitored is rewritten depending on the application actually installed in the smartphone 500a. To rewrite the list 518 of resource files to be monitored, the smartphone 500a includes the application information analysis unit 519. The probe 509 changes the monitoring target depending on the change of the list 518 of resource files to be monitored. The further details of the modified embodiment (13b) are described below with reference to FIGS. 17 and 18.

FIG. 17 is a flowchart of the processing performed by the application information analysis unit 519 in the modified embodiment (13b). The processing in FIG. 17 is started when the smartphone 500a is started.

In step S801, the application information analysis unit 519 monitors the operation of the installer 617. When the application information analysis unit 519 detects that addition (that is, installation) or deletion (that is, uninstallation) of an application is started by the installer 617, control proceeds to step S802. When other processing operations are performed by the installer 617, or when the installer 617 performs nothing, the application information analysis unit 519 keeps waiting in step S801.

In step S802, the application information analysis unit 519 generates a list of resources used by the application to be added or deleted. Concretely, the application information analysis unit 519 extracts a used external resource name list from the package information DB 506.

The application information analysis unit 519 may recognize the name of the application to be added or deleted from a monitoring result of the installer 617. Furthermore, the application information analysis unit 519 may recognize from a monitoring result of the installer 617 which is to be performed, the addition or the deletion of an application.

When an application is added, the application information analysis unit 519 waits until storage of the package information included in the application package into the package information DB 506 is completed. Then, the application information analysis unit 519 searches the package information DB 506 using the application name as a search key, and extracts the used external resource name list from the entry found as a result of the search.

When an application is deleted, the application information analysis unit 519 searches the package information DB 506 using the application name as a search key. This search is performed before an entry is deleted from the package information DB 506 along with the deletion of the application. Then, the application information analysis unit 519 extracts the used external resource name list from the entry found as a result of the search.

As described above, in step S802, the application information analysis unit 519 extracts the used external resource name list of the application to be added or deleted. However, in the extracted used external resource name list, each resource is expressed by logical identification information as exemplified in FIG. 7A.

In the next step S803, the application information analysis unit 519 generates a list of physical monitoring targets using the resource/file correspondence table 504. Concretely, the application information analysis unit 519 acquires from the resource/file correspondence table 504 the resource file name corresponding to each piece of logical identification information included in the list generated in step S802, and generates a list of acquired resource file names.

For example, assume that an application which uses the GPS receiver 601 and the sound device 603 has been added or deleted. In this case, the used external resource name list extracted in step S802 includes the logical identification information expressed by the character string "GPS" and the logical identification information expressed by the character string "sound". The application information analysis unit 519 refers to the resource/file correspondence table 504, and acquires the resource file names "/dev/tty1" and "/dev/snd" respective corresponding to the GPS receiver 601 and the sound device 603. Then, the application information analysis unit 519 generates a list of acquired resource file names.

Next in step S804, the application information analysis unit 519 judges whether or not the list 518 of resource files to be monitored is affected by the addition or deletion of an application. If the list 518 is affected, control proceeds to step S805. If the list 518 is not affected, control is returned to step S801.

Concretely, the application information analysis unit 519 judges as follows in step S804.

When the addition of an application is detected in step S801, the application information analysis unit 519 judges whether or not the resource file name not included in the current list 518 of resource files to be monitored is stored in the list generated in step S803.

If a resource file name not included in the current list 518 of resource files to be monitored is stored in the list generated in step S803, then the application information analysis unit 519 judges that "the list 518 of resource files to be monitored has been affected." On the other hand, if all resource file names included in the list generated in step S803 are listed in the list 518 of resource files to be monitored, the application information analysis unit 519 judges that "the list 518 of resource files to be monitored has not been affected."

When the deletion of an application is detected in step S801, the application information analysis unit 519 performs the following processing on each resource name included in the list generated in step S802. That is, the application information analysis unit 519 refers to the package information DB 506, and confirms whether or not there is another application which uses the resource identified by the resource name.

If one or more resources which are not used by any application other than the application to be deleted are detected, then the application information analysis unit 519 judges that "the list 518 of resource files to be monitored has been affected." On the other hand, if it is judged that all resources used by the application to be deleted are used by any other application, then the application information analysis unit 519 judges that "the list 518 of resource files to be monitored has not been affected."

In step S805, the application information analysis unit 519 updates the list 518 of resource files to be monitored.

Concretely, when the addition of an application is detected in step S801, the application information analysis unit 519 adds all resource file names which satisfy the conditions of the following (14a) and (14b) to the list 518 of resource files to be monitored.

(14a) Not included in the current list 518 of resource files to be monitored.

(14b) Included in the list generated in step S803.

When the deletion of an application is detected in step S801, the application information analysis unit 519 deletes from the list 518 of resource files to be monitored the resource file name of the resource not used by any application other than the application to be deleted.

Then, in the next step S806, the application information analysis unit 519 adds or deletes an entry of the resource dependency table 505. The meaning and the details of step S806 are described as follows.

In the second embodiment, the list 518 of resource files to be monitored is static data. As explained with reference to FIG. 10, the resource dependency table 505 is initialized into the state in which "the resource dependency table 505 includes an entry corresponding to each resource file name included in the list 518 of resource files to be monitored, and the PID field of each entry has been cleared."

On the other hand, in the modified embodiment (13b), the list 518 of resource files to be monitored may be dynamically changed depending on the addition or deletion of an application. The processing in step S806 is performed to update the resource dependency table 505 according to a change of the list 518 of resource files to be monitored.

Therefore, concretely when the addition of an application is detected in step S801, the application information analysis unit 519 performs the following processing on each resource file name added to the list 518 of resource files to be monitored in step S805. That is, the application information analysis unit 519 adds to the resource dependency table 505 a new entry including the resource file name added to the list 518 of resource files to be monitored, and clears the PID field of the added entry.

If the deletion of an application is detected in step S801, the application information analysis unit 519 deletes from the resource dependency table 505 the entry corresponding to each resource file name deleted from the list 518 of resource files to be monitored in step S805.

By the addition or deletion of an entry in step S806 as described above, the application information analysis unit 519 holds the consistency between the resource dependency table 505 and the list 518 of resource files to be monitored.

Then, in the next step S807, the application information analysis unit 519 notifies the probe 509 of the addition or deletion of a monitoring target. Then, control is returned to step S801. The operation of the probe 509 upon receipt of the notification in step S807 is described later with reference to FIG. 18.

To reduce the load in making a judgment in step S804 when an application is deleted, the data format of the list 518 of resource files to be monitored may be modified. That is, the list 518 of resource files to be monitored may be modified to be a table (referred to as a "table of resource files to be monitored" for convenience of explanation below) having an entry which associates a resource file name with the number of applications which use the resource corresponding to the resource file name.

When the addition of an application is detected in step S801, the application information analysis unit 519 increases by 1 the number of applications in each entry of the table of resource files to be monitored that corresponds to each resource file included in the list generated in step S803. On the other hand, when the deletion of an application is detected in step S801, the application information analysis unit 519 decreases by 1 the number of applications.

When the deletion of an application is detected in step S801, the application information analysis unit 519 only has to judge, in step S804, whether or not there is an entry in which the number of applications is 0 in the table of resource files to be monitored. That is, even if a large number of applications are installed in the smartphone 500, it is unnecessary for the application information analysis unit 519 to refer to a large number of entries of the package information DB 506.

Figure 18:
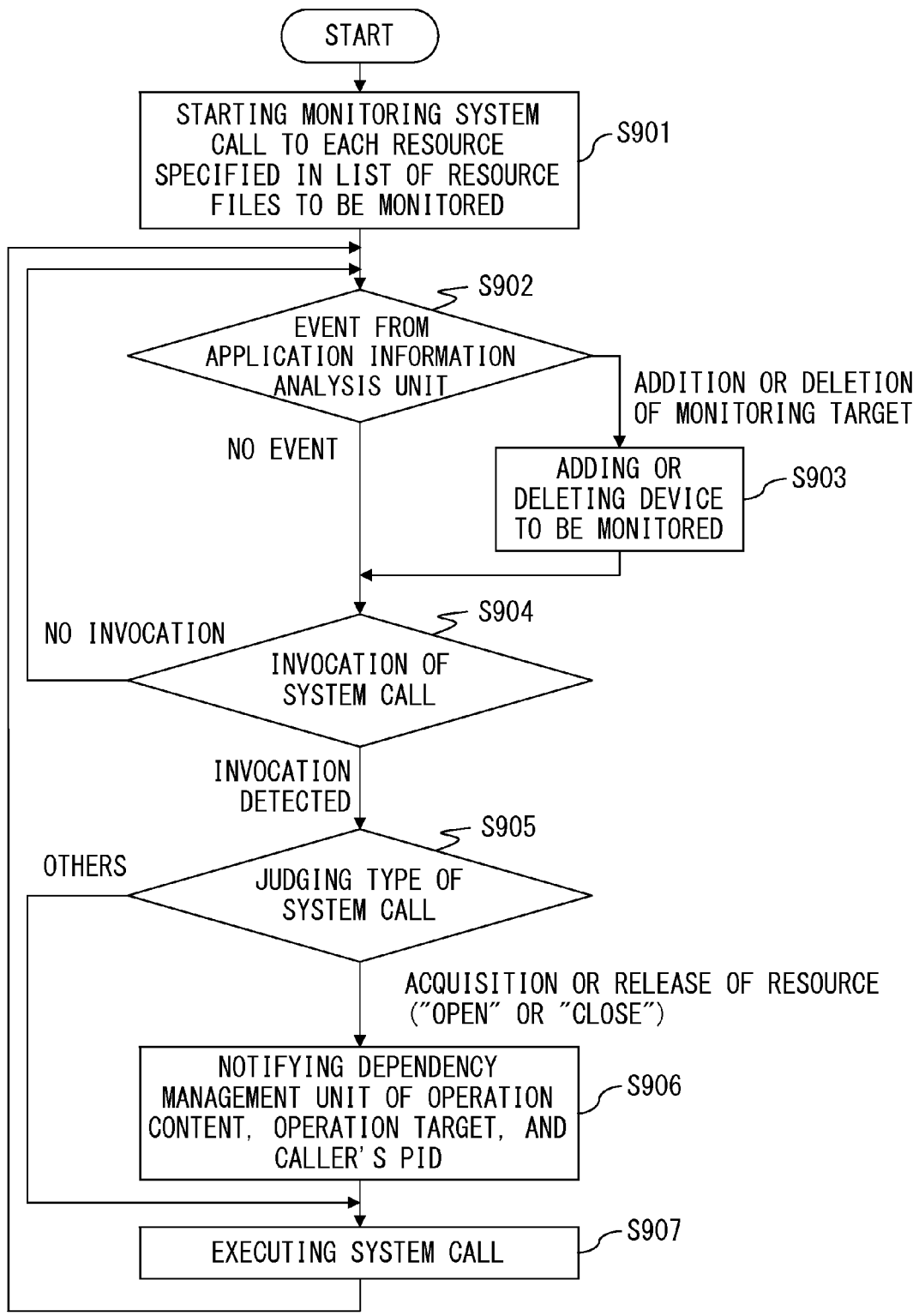
FIG. 18 is a flowchart of the processing performed by the probe according to a modification of the second embodiment.

FIG. 18 is a flowchart of the processing performed by the probe 509 in the modified embodiment (13b). The processing in FIG. 18 is started when the smartphone 500*a* is started In step S901, the probe 509 reads the list 518 of resource files to be monitored, and recognizes the resource file 516 corresponding to the resource to be monitored. Then, the probe 509 starts monitoring the system call for each resource specified in the list 518 of resource files to be monitored. Although step S901 is similar to step S201 in FIG. 9, steps S201 and S901 are different in state of the list 518 of resource files to be monitored, that is, whether the list 518 is static or dynamic.

In the next step S902, the probe 509 confirms whether or not there is an event notified from the application information analysis unit 519. When an event of the addition or deletion to be monitored is notified from the application information analysis unit 519, control proceeds to step S903. On the other hand, no event is notified from the application information analysis unit 519, control proceeds to step S904.

In step S903, the probe 509 refers to the list 518 of resource files to be monitored updated by the application information analysis unit 519. According to the updated list 518 of resource files to be monitored, the probe 509 adds or deletes a device to be monitored. The processing in step S903 is concretely, for example, changing the value of the internal variable of the probe 509 indicating the device to be monitored depending on the change of the list 518 of resource files to be monitored. After the execution in step S903, control proceeds to step S904.

In step S904, the probe 509 waits for the invocation of a system call to the resource file 516 corresponding to a resource to be monitored, for a certain time. If a system call is invoked within the certain time, control proceeds to step S905. On the other hand, if a system call to the resource file 516 corresponding to the resource to be monitored is not invoked within the certain time, control is returned to step S902.

In step S905, the probe 509 judges the type of the system call. When the type of the system call is "open" for acquisition of a resource or "close" for release of a resource, control proceeds to step S906. When the type of the system call is another one, control proceeds to step S907.

In step S906, the probe 509 notifies the dependency management unit 508 of content of an operation, an operation target, and a caller's PID (i.e., the PID of the process which invokes the system call), as in step S204 in FIG. 9. Then, control proceeds to step S907.

In step S907, the system call is executed as in step S205 in FIG. 9. Then, control is returned to step S902.

In the modified embodiment (13b) described above, the operation of the application manager 511 including the process group judgment unit 501, the process control module 503, the dependency management unit 508, and the switch event notification unit 512 is identical to the operation in the second embodiment.

Described next is the modified embodiment (13c) in which the load of the probe 509 is reduced from a point of view different from the modified embodiment (13b) above. Concretely, in the modified embodiment (13c), a particular resource accessed always from a particular process is excluded from a dynamic monitoring target of the probe 509, thereby reducing the load of the probe 509. In the modified embodiment (13c), using static information, a particular process is added to the application process group which uses a particular resource by the access through the particular process. In addition, the operations of the probe 509 and the process group judgment unit 501 are different from those in the second embodiment.

As described above with reference to FIG. 16, the resource/process name correspondence table 520, the monitored resource filter 521, and the known member detection unit 522 are added in the modified embodiment (13c).

The resource/process name correspondence table 520 statically associates a particular resource with a particular process. The monitored resource filter 521 discriminates the resource file 516 to be excluded from among the monitoring targets according to the resource/process name correspondence table 520 and the resource/file correspondence table 504, and notifies the probe 509 of the resource file 516 to be excluded from among the monitoring targets. Then, the known member detection unit 522 refers to the resource/process name correspondence table 520 and the list 507 of processes at a request from the process group judgment unit 501, and returns a list of the PIDs of particular processes to the process group judgment unit 501. Then, the process group judgment unit 501 adds a particular process to the process group based on the list acquired from the known member detection unit 522.

The resource/process name correspondence table 520*a* as a concrete example of the resource/process name correspondence table 520 is described below with reference to FIG. 7B. The resource/process name correspondence table 520*a* in FIG. 7B associates the external resource name as logical identification information about a particular resource with a process name of a particular process. In the example in FIG. 7B, the resource/process name correspondence table 520*a* has only one entry, but the number of entries is optional.

In the entry exemplified in FIG. 7B, the character string "sound" for logical identification of the sound device 603 is associated with a name "sound daemon" as a process name of the sound daemon 614 (that is, the program name of the sound daemon 614). The entry indicates the following (15a) and (15b).

(15a) The sound device 603 as a particular resource is occupied by a particular process which is a process of the sound daemon 614 as a particular program.

(15b) The access to the sound device 603, which is a particular resource, from another process is performed through a process of the sound daemon 614 as a particular process. That is, a particular process provides an interface to a particular resource for other processes.

The reason why a process name not a PID is used in the resource/process name correspondence table 520*a* is that the resource/process name correspondence table 520*a* is information statically set in advance. For example, the association between the sound device 603 as a particular resource and the sound daemon 614 as a particular program is statically determined based on the design of the OS of the smartphone 500*a*. However, the PID assigned to the process of the sound daemon 614 may be different each time the smartphone 500*a* is started. Then, the process name which is information for identification of the process of the sound daemon 614, and also is static information is used in the resource/process name correspondence table 520*a*.

For a particular resource, the logical identification information is registered in the "external resource name" field of any entry of the resource/process name correspondence table 520*a*. On the other hand, for a resource other than a particular resource, the logical identification information is not registered in any entry of the resource/process name correspondence table 520*a*. Therefore, the distinction between a particular resource and another resource may be judged from the resource/process name correspondence table 520*a*.

On the other hand, the "flag" field of the resource/file correspondence table 504*a* in FIG. 7A is the information for distinction between a particular resource and another resource. Therefore, when the resource/process name correspondence table 520*a* is used, the "flag" field of the resource/file correspondence table 504*a* may be omitted.

Figure 19:
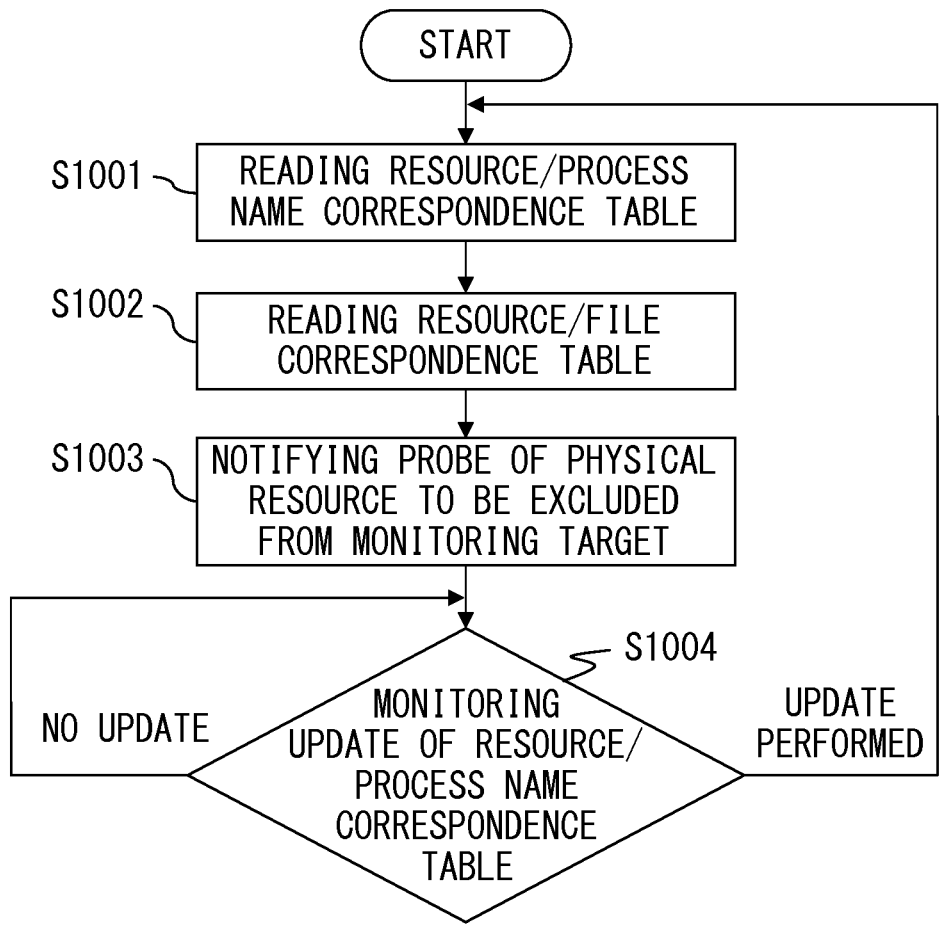
FIG. 19 is a flowchart of the processing performed by a monitored resource filter according to a modification of the second embodiment.

The processing performed by the monitored resource filter 521 in the modified embodiment (13c) is described below with reference to FIG. 19. The processing in FIG. 19 is also started when the smartphone 500*a* is started.

In step S1001, the monitored resource filter 521 reads the resource/process name correspondence table 520. In the next step S1002, the monitored resource filter 521 reads the resource/file correspondence table 504.

In the next step S1003, the monitored resource filter 521 identifies the physical resource to be excluded from among the monitoring targets of the probe 509, and notifies the probe 509 of the identified physical resource. Concretely, for each entry of the resource/process name correspondence table 520, the monitored resource filter 521 searches the resource/file correspondence table 504, using the external resource name of the entry as a search key, and thereby acquires a resource file name corresponding to the external resource name. Then, the monitored resource filter 521 notifies the probe 509 of the list of acquired resource file names.

For example, assume that the resource/process name correspondence table 520 is identical to the resource/process name correspondence table 520*a* in FIG. 7B, and the resource/file correspondence table 504 is identical to the resource/file correspondence table 504*a* in FIG. 7A. Then, in step S1003, the monitored resource filter 521 searches the resource/file correspondence table 504*a* using the external resource name "sound" of the entry of the resource/process name correspondence table 520*a* as a search key, and thereby acquires the resource file name "/dev/snd". Then, the monitored resource filter 521 notifies the probe 509 of the resource file name "/dev/snd".

After the notification in step S1003, control proceeds to step S1004. Then, in step S1004, the monitored resource filter 521 monitors the update of the resource/process name correspondence table 520. Unless the resource/process name correspondence table 520 is updated, the monitored resource filter 521 waits in step S1004. On the other hand, if the resource/process name correspondence table 520 is updated, control is returned to step S1001.

The resource/process name correspondence table 520 is updated when a service is newly added or deleted with the addition of a service by a third party or with the upgrade of the OS, or when the specification of a service is changed, for example.

The modifications of (13b) and (13c) are common in the purpose of reducing the load of the probe 509. Therefore, to reduce the load of the probe 509, it is preferable to combine the modifications of (13b) and (13c). The processing performed by the probe 509 when the modifications (13b) and (13c) are combined is described below with reference to FIG. 20.

Figure 20:
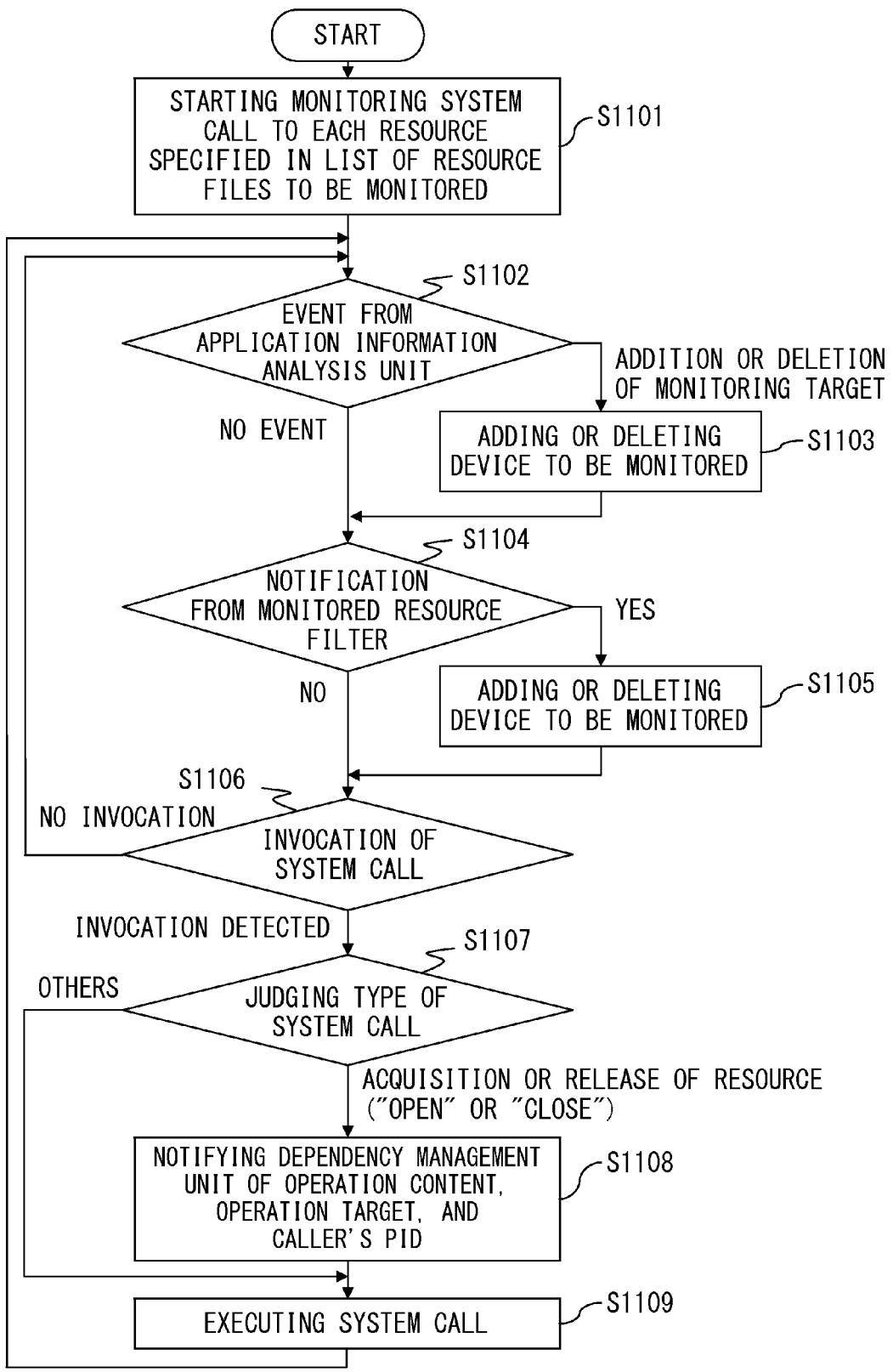
FIG. 20 is a flowchart of the processing performed by the probe according to a modification of the second embodiment.

When only the modification (13c) is adopted, steps S1102 through S1103 in FIG. 20 are omitted. The processing in FIG. 20 is also started when the smartphone 500*a* is started.

In step S1101, the probe 509 reads the list 518 of resource files to be monitored, and thereby recognizes the resource file 516 corresponding to the resource to be monitored. Then, the probe 509 starts monitoring the system call to each resource specified by the list 518 of resource files to be monitored. Step S1101 is identical to step S901 in FIG. 18.

Then, in the next step S1102, the probe 509 confirms whether or not there is an event notified from the application information analysis unit 519. When an event of adding or deleting a monitoring target is notified from the application information analysis unit 519, control proceeds to step S1103. On the other hand, when no event is notified from the application information analysis unit 519, control proceeds to step S1104.

In step S1103, the probe 509 refers to the list 518 of resource files to be monitored which has been updated by the application information analysis unit 519. According to the updated list 518 of resource files to be monitored, the probe 509 adds or deletes the device to be monitored. The details of step S1103 are identical to those of step S903 in FIG. 18. After executing step S1103, control proceeds to step S1104.

In step S1104, the probe 509 confirms whether or not a notification (that is, the notification issued in step S1003 in FIG. 19) has been received from the monitored resource filter 521. When the notification from the monitored resource filter 521 is received, control proceeds to step S1105. On the other hand, when no notification is received from the monitored resource filter 521, control proceeds to step S1106.

In step S1105, the probe 509 adds or deletes the device to be monitored according to the notification from the monitored resource filter 521. For example, the process in step S1105 is concretely a processing of changing the value of an internal variable of the probe 509 indicating the device to be monitored depending on the contents notified from the monitored resource filter 521.

Concretely, if the physical device 515 which has been a monitoring target has become a non-target, then the probe 509 deletes the device to be monitored according to the notification from the monitored resource filter 521. That is, when the resource file name notified from the monitored resource filter 521 is currently recognized as a monitoring target, the probe 509 excludes the notified resource file name from among the monitoring targets.

On the other hand, if the physical device 515 which has not been a monitoring target newly becomes a monitoring target, then the probe 509 adds the device to be monitored according to the notification from the monitored resource filter 521. That is, if the resource file name which is not currently recognized as a monitoring target in the resource file names included in the list 518 of resource files to be monitored is not included in the notification from the monitored resource filter 521, then the probe 509 adds the resource file name as a monitoring target.

After the execution in step S1105, control proceeds to step S1106. Steps S1106 through S1109 in FIG. 20 are identical to steps S904 through S907 in FIG. 18.

Figure 21:
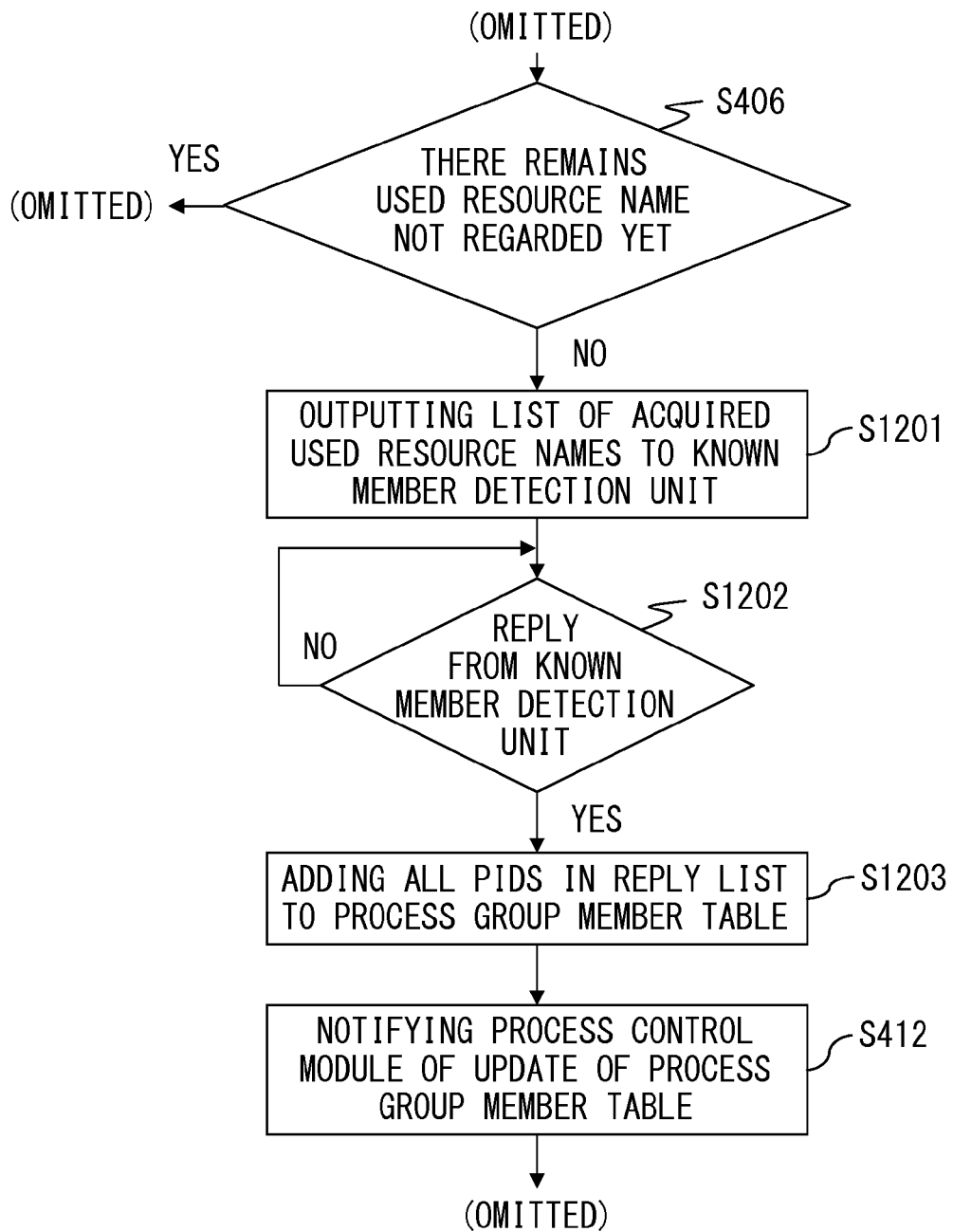
FIG. 21 is a flowchart of the processing performed by the process group judgment unit according to a modification of the second embodiment.

The operation of the process group judgment unit 501 in the modified embodiment (13c) is described below with reference to FIG. 21. In the modified embodiment (13c), when there is not a used resource name which has not been regarded in step S406 in FIG. 11A, the process group judgment unit 501 performs the processing in steps S1201 through S1203 in FIG. 21 before the notification in step S412.

That is, in step S1201, the process group judgment unit 501 requests the known member detection unit 522 to notify the process group judgment unit 501 of the PID of a particular process if there is a particular resource occupied by the particular process among the resources to be used by the started application. Concretely, in step S1201, the process group judgment unit 501 outputs, to the known member detection unit 522, the list of used resource names acquired in step S402, as a request argument. As described above, the number of used resource names acquired in step S402 is 0 or more.

Then, in the next step S1202, the process group judgment unit 501 waits for a reply from the known member detection unit 522. Upon receipt of the reply from the known member detection unit 522, control proceeds to step S1203.

Upon receipt of a request from the process group judgment unit 501 in step S1201, the known member detection unit 522 returns a list of 0 or more PIDs to the process group judgment unit 501. The details of the operation of the known member detection unit 522 are described later with reference to FIG. 22.

Then, in step S1203, the process group judgment unit 501 adds all PIDs in the reply list, which is obtained from the known member detection unit 522, to the PID list of the entry corresponding to the started application in the process group member table 502. Then, control proceeds to step S412.

For example, assume that the newly started application uses three physical devices 515, that is, the GPS receiver 601, the accelerometer sensor 602, and the sound device 603. In this case, in step S1201, the list of the resource names of these three physical devices 515 are output.

In addition, assume that the resource/process name correspondence table 520 is, for example, identical to the resource/process name correspondence table 520a in FIG. 7B. That is, in these three physical devices 515, only the sound device 603 is a particular resource. Therefore, the reply list, which the process group judgment unit 501 receives from the known member detection unit 522, includes only the PID of the process of the sound daemon 614, which occupies the sound device 603 and provides an interface to access the sound device 603.

Therefore, the process group judgment unit 501 adds the PID of the process of the sound daemon 614 to the PID list of the entry corresponding to the started application in the process group member table 502 in step S1203.

Figure 22:
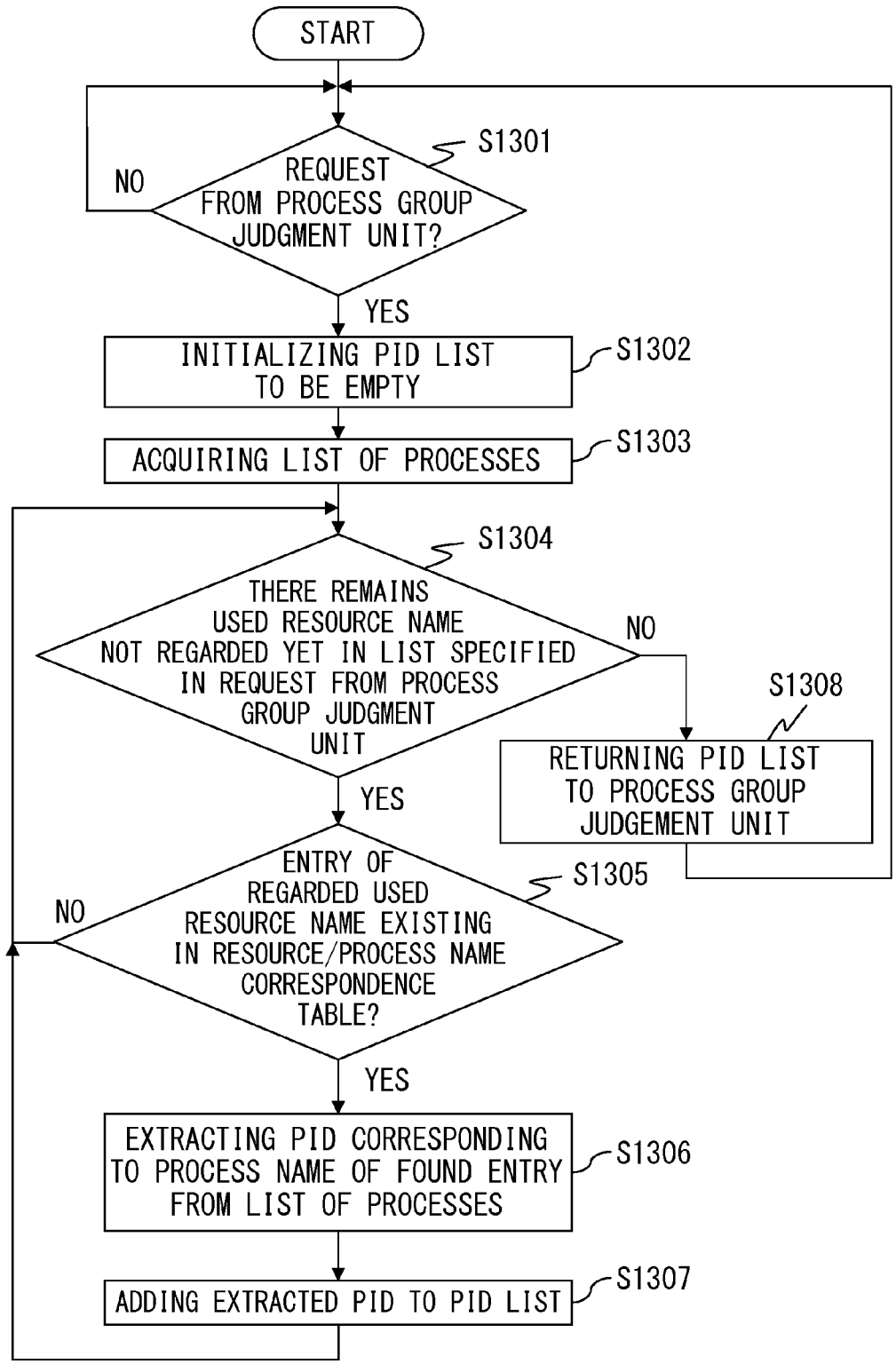
FIG. 22 is a flowchart of the processing performed by a known member detection unit according to a modification of the second embodiment.

The operation of the known member detection unit 522 in the modified embodiment (13c) is described below with reference to FIG. 22. The processing in FIG. 22 is started when the smartphone 500a is started.

In step S1301, the known member detection unit 522 waits until a request from the process group judgment unit 501 is received. That is, the known member detection unit 522 waits until the process group judgment unit 501 outputs a list of used resource names to the known member detection unit 522 in step S1201 in FIG. 21.

When the known member detection unit 522 receives a request from the process group judgment unit 501, control proceeds to step S1302. Then, in step S1302, the known member detection unit 522 initializes the PID list to be empty. The PID list is prepared to be returned to the process group judgment unit 501.

In the next step S1303, the known member detection unit 522 acquires the list 507 of processes.

Then, in the next step S1304, the known member detection unit 522 judges whether or not there remains a used resource name which has not been regarded yet in the list specified in the request from the process group judgment unit 501.

If there still remains a used resource name which has not been regarded by the known member detection unit 522 in the list as the argument of the request from the process group judgment unit 501, control proceeds to step S1305.

On the other hand, if the known member detection unit 522 has already regarded all used resource names in the list as the argument of the request from the process group judgment unit 501, then control proceeds to step S1308. Also when the list as the argument of the request from the process group judgment unit 501 is an empty list, control proceeds to step S1308.

In step S1305, the known member detection unit 522 judges whether or not there is an entry of a used resource name currently regarded by the known member detection unit 522 in the resource/process name correspondence table 520. For convenience of explanation below, the used resource name currently regarded (i.e., focused on) by the known member detection unit 522 is hereafter referred to as a "regarded resource name", and the resource identified by the regarded resource name as a "regarded resource".

If the entry of a regarded resource name is not found in the resource/process name correspondence table 520, the regarded resource is a resource other than a particular resource. Therefore, the fact that "a regarded resource is used by an application" does not affect the process group of the application. Therefore, control is returned to step S1304.

On the other hand, if the entry of the regarded resource name is found in the resource/process name correspondence table 520, the regarded resource is a particular resource. Therefore, the fact that "a regarded resource is used by an application" affects the process group of the application. Therefore, control proceeds to step S1306.

In step S1306, the known member detection unit 522 extracts the PID corresponding to the process name of the entry found in step S1305 (that is, the entry of the regarded resource name), from the list 507 of processes acquired in step S1303.

For example, assume that the regarded resource name is "sound", the resource/process name correspondence table 520 is identical to the resource/process name correspondence table 520a in FIG. 7B, and the list 507 of processes obtained in step S1303 is identical to the list 507a of processes in FIG. 7B. Then, in step S1305, an entry of the resource/process name correspondence table 520a corresponding to the regarded resource name "sound" is found. In addition, the process name of the found entry is "sound daemon". According to the list 507a of processes, the PID corresponding to the process name "sound daemon" is 10. Therefore, in step S1306, the PID of 10 is extracted.

Then, in the next step S1307, the known member detection unit 522 adds the PID extracted in step S1306 to the PID list. Then, control is returned to step S1304.

In step S1308, the known member detection unit 522 returns the PID list to the process group judgment unit 501. Then, control is returned to step S1301.

In the modified embodiment (13c) described above, the operation of the application manager 511 including the process control module 503, the dependency management unit 508, and the switch event notification unit 512 is identical to that according to the second embodiment.

Described next is the modified embodiment (13d) for recognition of a process group appropriate also when a descendant process is dynamically generated.

In the process, a child process may be generated during the execution. Therefore, when a process belonging to the process group relating to an application generates a child process, it is preferable that the process control module 503 controls a child process as well as a parent process to improve the performance experienced by a user. That is, it is preferable that the process group judgment unit 501 generates the data of the process group member table 502 so that the child process may be included in the same process group. Then, in the modified embodiment (13d), the parent-child relationship judgment unit 523 is added.

In the description below, the parent-child relationship between processes is described with reference to an example in FIG. 23 to support the understanding about modification (13d). Then, the operation of the process group judgment unit 501 is described with reference to FIG. 24, and the operation of the parent-child relationship judgment unit 523 is described with reference to FIG. 25. The operation of the switch event notification unit 512 including the process control module 503, the dependency management unit 508, the probe 509, and the switch event notification unit 512 is similar to that in the second embodiment.

Figure 23:
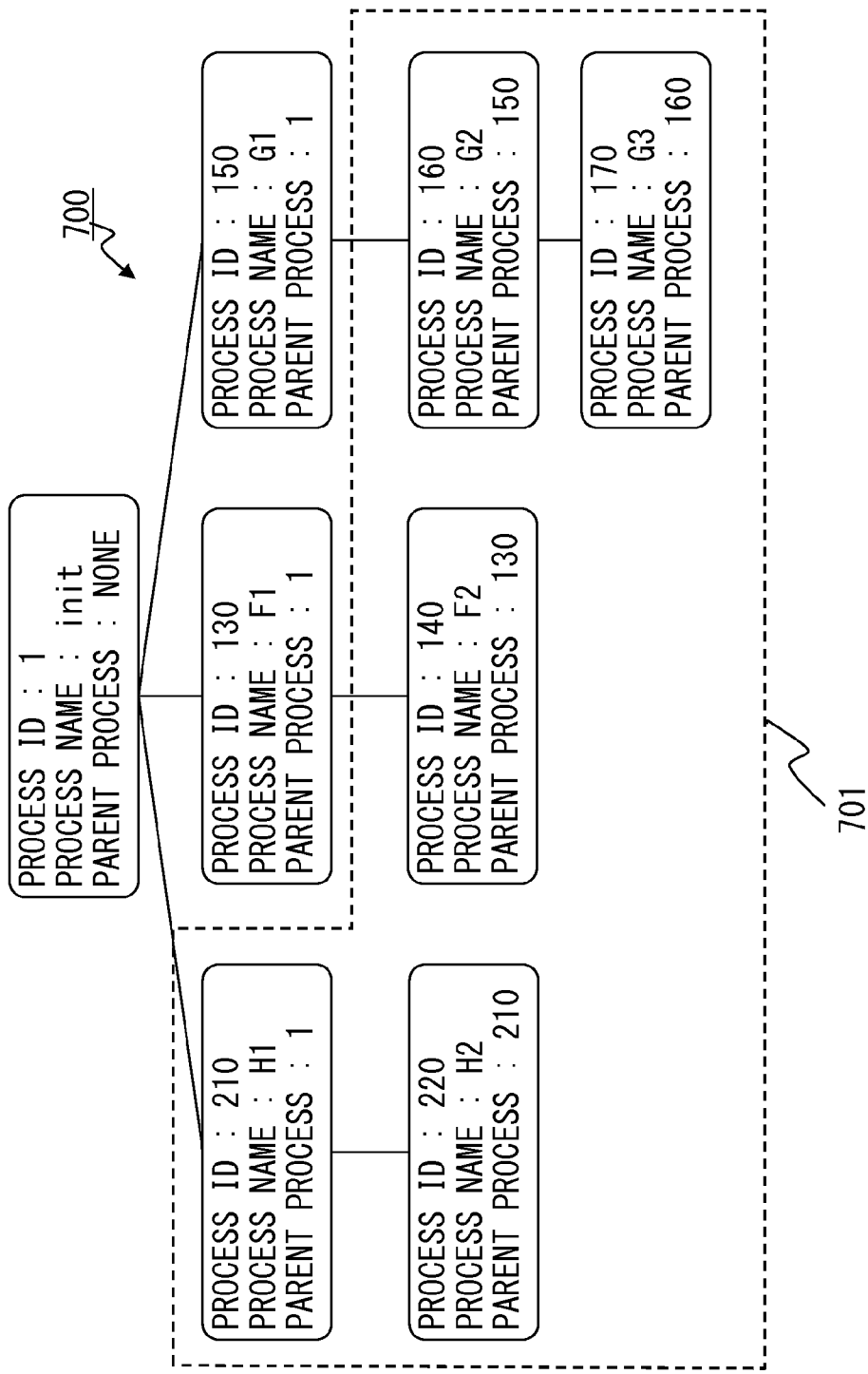
FIG. 23 is an example of a tree structure indicating the parent-child relationship between processes.

FIG. 23 is an example of the tree structure indicating the parent-child relationship between processes. Each node in a tree structure 700 in FIG. 23 indicates a process. In FIG. 23, a process ID (PID), a process name, and the PID of a parent process are indicated in each node.

According to the tree structure 700, the process name of the process corresponding to the root node is "init". Since the "init" process is first generated when the smartphone 500a is started (i.e., booted), the PID is 1, and no parent process exists. The "init" process is a special process which constantly and continuously exists while the smartphone 500a is active.

In the example in FIG. 23, the "init" process has three child processes. The first child process has the PID of 130, and the process name of "F1". The second child process has the PID of 150, and the process name of "G1". The third child process has the PID of 210, and the process name of "H1".

Furthermore, the process F1 has a child process having the PID of 140, and the process name of "F2".

The process G1 has a child process having the PID of 160, and the process name of "G2". Then, the process G2 has a child process having the PID of 170, and the process name of "G3".

The process H1 has a child process having the PID of 220, and the process name of "H2".

In the example in FIG. 23, it is assumed that the process F1 is a process of the program provided by the OS. Therefore, the child process F2 is also a process of the program provided by the OS. For example, the child process F2 may be a process which substantially provides a certain service. The process F1 may be a process of a service manager which monitors and manages the state of the process F2.

Similarly, the process G1 may be a process of a service manager, and the process G2 may be a process of a service. In addition, the function of part of the service may be provided by the child process G3 of the process G2.

Furthermore, assume that the number of binary programs included in an application package H is one, and the process H1 is a process generated by executing the one binary program. In addition, assume that the one binary program includes a code for generating a child process, and that the process H1 consequently generates a process H2.

Furthermore, assume that the application package H uses two or more resources including two particular resources. In addition, assume that the access to the first particular resource is provided by the service of the process F2, and that the access to the second particular resource is provided by the service of the process G2.

Then, when the process group judgment unit 501 recognizes the process group according to the flowchart in FIGS. 11A and 11B, the PID list registered in the process group member table 502 corresponding to the application H is expressed as a list (210, 140, 160).

However, part of the function of the application H is provided by the process H2. Therefore, it is not preferable that the process group judgment unit 501 judges that "the process H2 does not belong to the process group of the application H," and thereby consequently causes the process control module 503 to reduce the priority of the process H2 or to suspend the process H2. Similarly, since part of the function for using a particular resource from the application H is provided by the process G3, it is not preferable to judge that "the process G3 does not belong to the process group of the application H."

That is, to enhance the performance experienced by a user who uses the application H, it is preferable that the process group judgment unit 501 recognizes a process group 701 including the process H2 and process G3 as a process group of the application H. Then, in the modified embodiment (13d), the parent-child relationship judgment unit 523 is added, and the processing in FIGS. 11A and 11B by the process group judgment unit 501 is modified as illustrated in FIG. 24.

Figure 24:
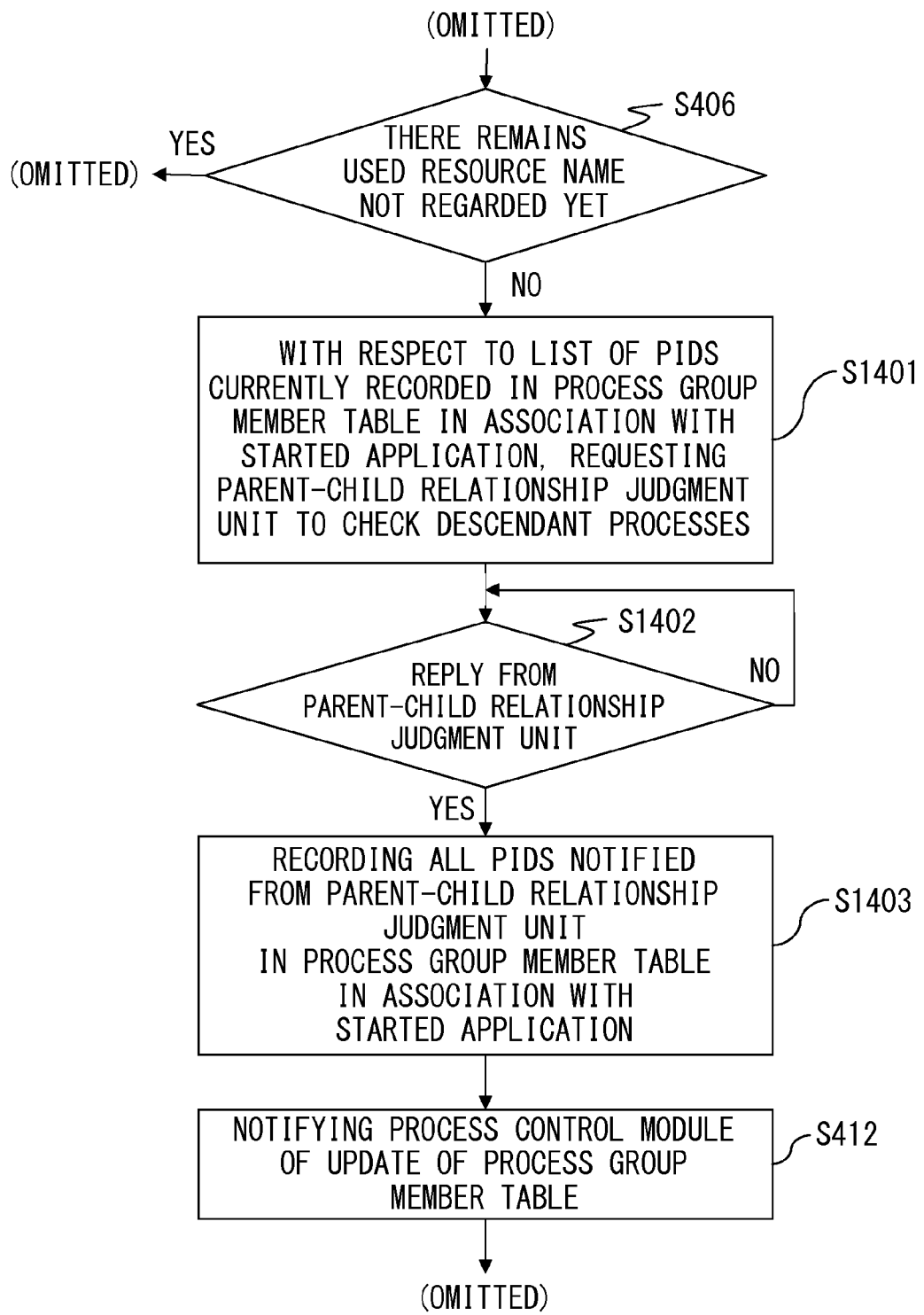
FIG. 24 is a flowchart of the processing performed by the process group judgment unit according to a modification of the second embodiment.

That is, in the modified embodiment (13d), when there is no used resource name which has not been regarded in step S406 in FIG. 11A, the process group judgment unit 501 performs the processing in steps S1401 through S1403 in FIG. 24 before the notification in step S412.

Concretely, in step S1401, the process group judgment unit 501 requests the parent-child relationship judgment unit 523 to check descendant processes with respect to the PID list currently recorded in the process group member table 502 in association with the started application.

For example, in the example in FIG. 23, when step S1401 is executed, the PID list of the entry corresponding to the application H includes three PIDs 210, 140, and 160 in the process group member table 502. Therefore, in step S1401, the process group judgment unit 501 requests the parent-child relationship judgment unit 523 to check the descendant processes with respect to the PID list (210, 140, 160).

In the next step S1402, the process group judgment unit 501 waits for a reply from the parent-child relationship judgment unit 523. When a reply from the parent-child relationship judgment unit 523 is acquired, control proceeds to step S1403.

Let P be a set of processes indicated by the PID list which is passed, as the argument, from the process group judgment unit 501 to the parent-child relationship judgment unit 523. The PID list expressing the set "(P∪descendant (P))" is returned (i.e., the PID list expressing the union of P and descendant(P) is returned) in step S1402.

In step S1403, the process group judgment unit 501 records all PIDs notified from the parent-child relationship judgment unit 523 in association with the started application in the process group member table 502. That is, the process group judgment unit 501 replaces the PID list of the entry of the process group member table 502 corresponding to the started application with a result notified from the parent-child relationship judgment unit 523.

For example, in the example in FIG. 23, the PID list (210, 220, 140, 160, 170) indicating the process group 701 is notified from the parent-child relationship judgment unit 523, and this PID list is then recorded in the entry corresponding to the application H in the process group member table 502. Then, control proceeds to step S412.

Although omitted in the attached drawings, the process group judgment unit 501 further performs the following processing in the modified embodiment (13d). The reason for the following processing is that a child process may be generated with arbitrary timing.

That is, the process group judgment unit 501 reads, periodically at appropriate intervals, a PID list from the entry of the process group member table 502 corresponding to the application currently running in the foreground. Then, the process group judgment unit 501 requests the parent-child relationship judgment unit 523 to check descendant processes as in step S1401 in FIG. 24 with respect to the read PID list.

Furthermore, the process group judgment unit 501 replaces the PID list of the entry of the process group member table 502 corresponding to the application currently running in the foreground with a result notified from the parent-child relationship judgment unit 523. Then, the process group judgment unit 501 notifies the process control module 503 of the update of the process group member table 502 as in step S412. The process control module 503 performs the processing in steps S507 through S513 in FIGS. 12 and 13 when a notification from the process group judgment unit 501 is received.

Figure 25:
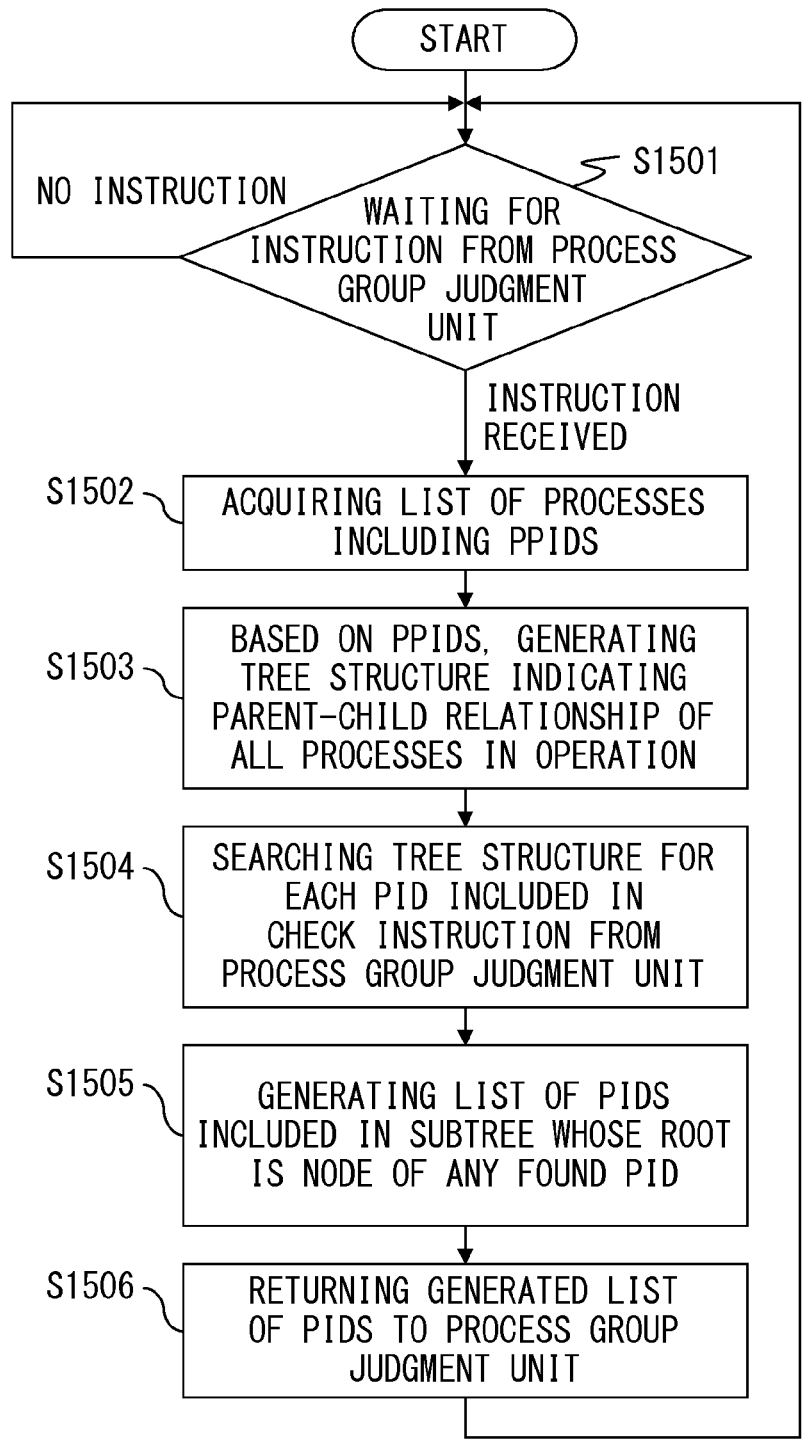
FIG. 25 is a flowchart of the processing performed by a parent-child relationship judgment unit according to a modification of the second embodiment.

FIG. 25 is a flowchart of the processing performed by the parent-child relationship judgment unit 523 in the modified embodiment (13d). The processing in FIG. 25 is started when the smartphone 500a is started.

In step S1501, the parent-child relationship judgment unit 523 waits for an instruction from the process group judgment unit 501. While no instruction is received, the parent-child relationship judgment unit 523 keeps waiting in step S1501. When the parent-child relationship judgment unit 523 receives an instruction from the process group judgment unit 501 (that is, an instruction in step S1401 in FIG. 24), control proceeds to step S1502.

In step S1502, the parent-child relationship judgment unit 523 acquires the list 507 of processes using, for example, the "ps" command. The list 507 of processes in the modified embodiment (13d) includes not only PIDs and process names, but also PPIDs (parent process identifiers). The PPID of a process is the PID of its parent process.

Then, in the next step S1503, the parent-child relationship judgment unit 523 generates a tree structure indicating the parent-child relationship of all processes in operation (that is, all processes included in the list 507 of processes), based on the PPIDs in the acquired list 507 of processes. In FIG. 23, for the aid in understanding, not only a PID but also a process name and a PPID are indicated in each node in the tree structure 700, but the tree structure generated by the parent-child relationship judgment unit 523 in step S1503 only has to include at least a PID in each node.

Furthermore, the data generated in step S1503 by the parent-child relationship judgment unit 523 may have concretely any data structure so far as the data indicates a tree structure. For example, data of a tree structure using pointers may be used, or an array may be used.

Furthermore, in the next step S1504, the parent-child relationship judgment unit 523 searches the tree structure for each PID included in the check instruction from the process group judgment unit 501

Then, in the next step S1505, the parent-child relationship judgment unit 523 generates a list of PIDs included in a subtree whose root is a node of any PID found as a result of the search in step S1504.

Next in step S1506, the parent-child relationship judgment unit 523 returns the list of the PIDs generated in step S1505 to the process group judgment unit 501. Then, control is returned to step S1501.

For example, assume that the tree structure generated in step S1503 is identical to the tree structure 700 in FIG. 23, and the check instruction from the process group judgment unit 501 includes three PIDs 210, 140, and 160. In this case, in step S1504, the parent-child relationship judgment unit 523 searches the tree structure 700 for the nodes of the processes having the PIDs 210, 140, and 160.

Then, in step S1505, the list generated by the parent-child relationship judgment unit 523 includes the PIDs of all nodes which satisfy the condition "to be included in any of subtrees (16a) through (16c) indicated below." That is, in step S1505, the parent-child relationship judgment unit 523 generates a list including five PIDs 210, 220, 140, 160, and 170.

(16a) A subtree whose root is a node of the process having the PID of 210. That is, a subtree including a node of the process H1, whose PID is 210, and a node of the process H2, whose PID is 220.

(16b) A subtree whose root is a node of a process having the PID of 140. That is, a subtree including only a node of the process F2, whose PID is 140.

(16c) A subtree whose root is a node of a process having the PID of 160. That is, a subtree including a node of the process G2, whose PID is 160, and a node of the process G3, whose PID is 170.

Described next of the modified embodiment (13e) for avoiding the side effect accompanying a suspending operation when the process control module 503 performs suspend control. In the modified embodiment (13e), the process control module 503 is modified so as to include the conflict judgment unit 524. However, the operation of the process group judgment unit 501, the dependency management unit 508, the probe 509, and the application manager 511 is identical to that in the second embodiment.

Figure 26:
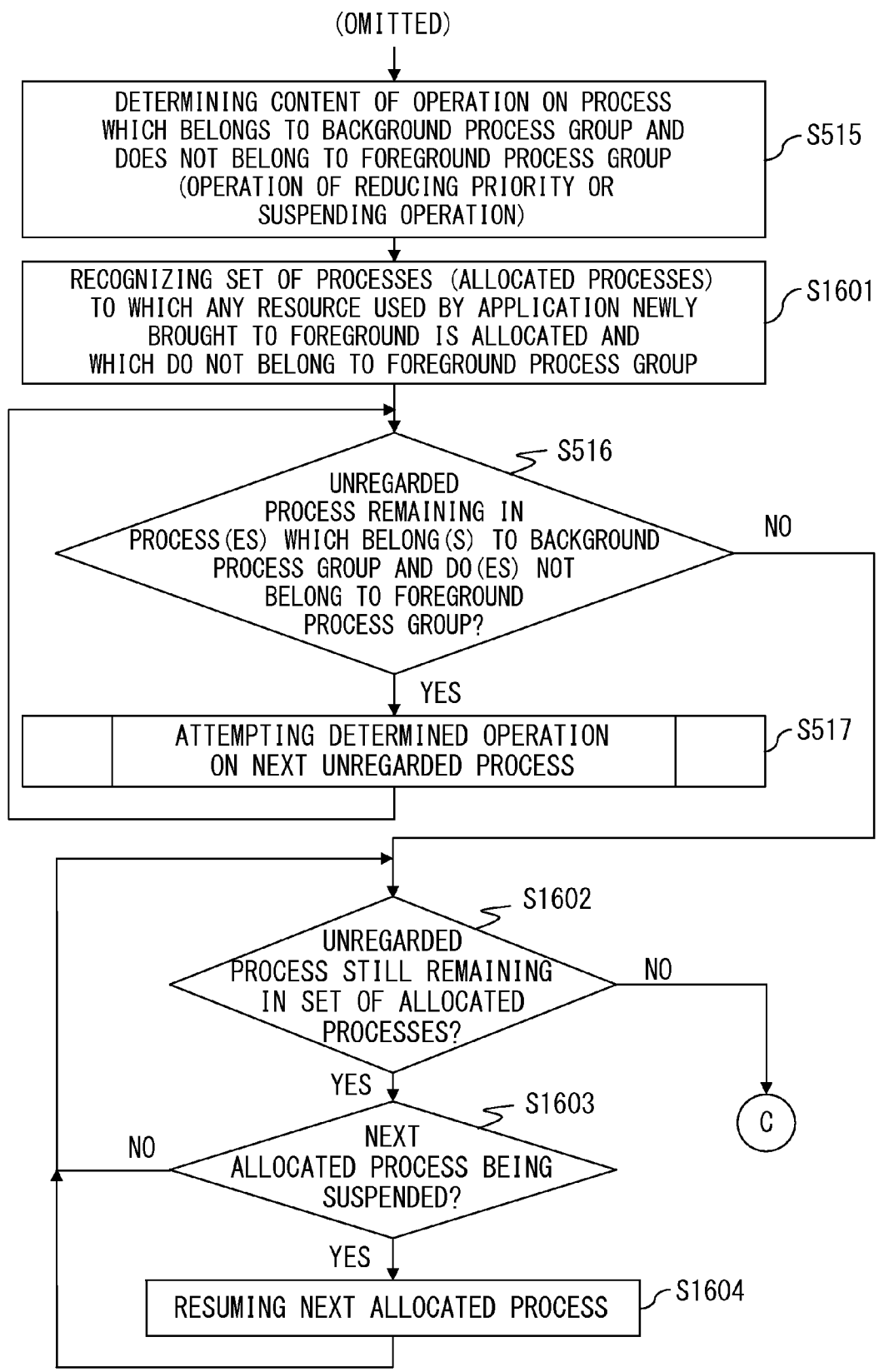
FIG. 26 is a flowchart of the processing performed by the process control module according to a modification of the second embodiment.

Concretely, in the modified embodiment (13e), the processing in FIGS. 12 and 13 by the process control module 503 are modified as illustrated in FIG. 26. That is, step S1601 in FIG. 26 is added between steps S515 and S516 in FIG. 13. In addition, when control is returned from step S516 to step S502 in FIG. 12, steps S1601 through S1604 in FIG. 26 are added between steps S516 and S502.

In step S1601, the conflict judgment unit 524 in the process control module 503 recognizes a set of processes which satisfy both of the following conditions (17a) and (17b) (hereafter these processes are referred to as "allocated processes"). The allocated process is a process of another application which causes a conflict with the application which has been newly brought to the foreground.

(17a) A resource to be used by an application which has been newly brought to the foreground is currently allocated to the process.

(17b) The process does not belong to the foreground process group.

Concretely, the conflict judgment unit 524 recognizes a resource(s) used by an application which has been newly brought to the foreground by referring to the package information DB 506. In addition, the conflict judgment unit 524 recognizes a resource file name corresponding to each recognized resource by referring to the resource/file correspondence table 504.

Then, the conflict judgment unit 524 recognizes whether or not there is a process which is currently opening a resource file identified by each recognized resource file name, by referring to the resource dependency table 505. If there is a process which is currently opening a resource file identified by the resource file name recognized by the conflict judgment unit 524, the conflict judgment unit 524 reads the PID of the process from the resource dependency table 505.

As described above, the conflict judgment unit 524 obtains a set of the PIDs of processes which satisfy the condition (17a). Meanwhile, the process control module 503 has already recognized the foreground process group in step S508, and thus, the conflict judgment unit 524, which is included in the process control module 503, is able to refer to a recognition result by the process control module 503. Therefore, in step S1601, the conflict judgment unit 524 is able to acquire a list of PIDs expressing a set of allocated processes.

For example, assume that the started application uses the GPS receiver 601. Also assume that the GPS receiver 601 is not a particular resource. That is, the GPS receiver 601 is a resource directly accessible from an application without the location manager 613. In addition, the location manager 613 does not exclusively occupy the GPS receiver 601.

Furthermore, assume that a process of another application (for example, an application which has been previously started, and is currently running in the background or is currently suspended) is currently opening the resource file 609 of the GPS receiver 601. Then, in step S1601, the PID of the process which is opening the resource file 609 is acquired as a PID of an allocated process.

Assume that the process control module 503 is allowed to refer to a set of allocated processes which have been recognized by the conflict judgment unit 524 as described above. After the execution in step S1601 by the conflict judgment unit 524, the process control module 503 performs repetitive loop processing in steps S516 through S517 as in FIG. 13. When the process control module 503 has completed regarding all processes which belong to the background process group and do not belong to the foreground process group, control proceeds to step S1602.

Then, in step S1602, the process control module 503 judges whether or not, in the set of allocated processes recognized in step S1601, there remains a process which has not been regarded (i.e., focused on) as a processing target in steps S1603 through S1604.

When there is any process which has not been regarded in the set of allocated processes, control proceeds to step S1603. On the other hand, if the process control module 503 has already regarded all processes, control is returned to step S502 in FIG. 12 as indicated by the character "C". Also when the set of allocated processes recognized in step S1601 is just empty, control is returned to step S502.

In step S1603, the process control module 503 regards the next allocated process, and judges whether the next allocated process, which is currently regarded, is being suspended or not. Although omitted in the example in the list 507a of processes in FIG. 7B, the list 507 of processes may include an item indicating the state of each process. Therefore, the process control module 503 is able to judge whether the allocated process which is regarded is being suspended or not by referring to the list 507 of processes.

When the allocated process which is regarded is being suspended, control proceeds to step S1604. On the other hand, if the allocated process which is regarded is not being suspended (that is, when it is running in the background), control is returned to step S1602.

Then, in step S1604, the process control module 503 resumes the allocated process which is regarded in step S1603. The processing in step S1604 may be realized by sending a signal as in step S603 in FIG. 14. After the execution in step S1604, control is returned to step S1602.

Figure 27:
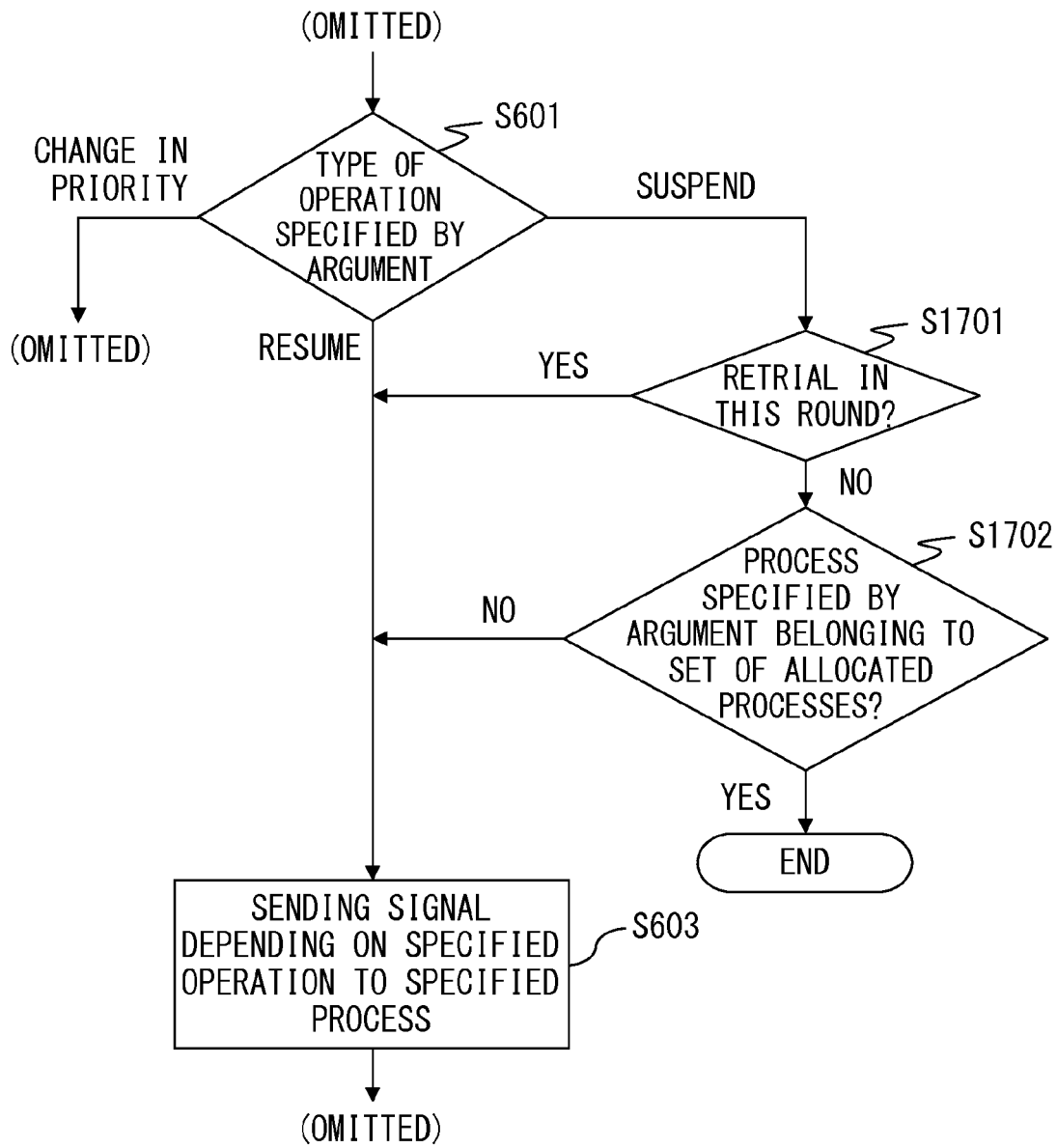
FIG. 27 is a flowchart of a subroutine executed by the process control module instead of the subroutine illustrated in FIG. 14 according to a modification of the second embodiment.

In the modified embodiment (13e), the processing in FIG. 14 by the process control module 503 is modified as illustrated in FIG. 27.

In step S601 in FIG. 14 according to the second embodiment, control proceeds to step S603 when the type of operation specified by the argument indicates suspension or resumption. On the other hand, in the modified embodiment (13e), control proceeds from step S601 to step S1701 in the case of suspension, and control proceeds from step S601 to step S603 as in FIG. 14 in the case of resumption.

Then, in step S1701, the process control module 503 judges whether or not the subroutine call in the current round is an invocation for a retrial, by referring to a retrial flag included in the arguments as in steps S605 and S607 in FIG. 14. In the case of the invocation for a retrial, it is enough for the process control module 503 to control the process simply as specified by the argument, and control proceeds to step S603. On the other hand, when this is the first trial, control proceeds to step S1702.

Then, in step S1702, the process control module 503 judges whether or not the process specified by the argument belongs to a set of allocated processes. The processing in step S1702 is performed only in the case of the subroutine call from step S517 in FIG. 26. Therefore, the conflict judgment unit 524 has already recognized the set of allocated processes, and the process control module 503 is able to refer to the set of allocated processes in step S1702.

When the process specified by the argument belongs to the set of allocated processes, the resource used by the application which has newly brought to the foreground is not released if the process control module 503 suspends the process specified by the argument. Thus, when the process specified by the argument belongs to the set of allocated processes, the process control module 503 does not actively perform suspending control on the process specified by the argument, thereby completing the processing in FIG. 27 to continue the execution of the process specified by the argument.

On the other hand, when the process specified by the argument does not belong to the set of allocated processes, control proceeds to step S603.

By the modification illustrated in FIGS. 26 and 27, the process control module 503 continues the execution of any allocated process currently being executed (namely, avoids suspending any allocated process currently being executed), and resumes any allocated process currently being suspended. As a result, any allocated process is executed. Therefore, with the lapse of time, it is expected that an allocated process will release the resource allocated thereto. As a result, the process of the application which has been newly brought to the foreground will be enabled to use the released resource.

According to the above-mentioned modified embodiment (13e), the side effect by the control of the process control module 503 is avoided even if there is an application in conflict for an available resource.

For example, assume that when the application I is running in the foreground, the process of the application I opens a resource (for example, the accelerometer sensor 602) and the opened resource is allocated to the process. In addition, assume that before the process of the application I releases the accelerometer sensor 602, the foreground application is switched from the application I to an application J which does not use the accelerometer sensor 602.

When the process control module 503 selects a suspending operation in step S515 in FIG. 26, the process of the application I is suspended with the switch.

Assume that the foreground application is then further switched from the application J to an application K which uses the accelerometer sensor 602. When the application K is started, the accelerometer sensor 602 is allocated to the suspended process of the application I.

However, according to the modified embodiment (13e) above, the process of the application I is recognized as an allocated process in step S1601, and resumed in step S1604. Therefore, the accelerometer sensor 602 is released eventually. That is, avoided is the situation that "since the process to which the accelerometer sensor 602 is allocated is suspended, the accelerometer sensor 602 is not released, and the application K is unable to use the accelerometer sensor 602."

Furthermore, when the foreground application is switched from the application I to the application K before the process of the application I releases the accelerometer sensor 602, a side effect is avoidable in the modified embodiment (13e) above because the process of the application I is not suspended based on the judgment in step S1702 in FIG. 27 even if the process control module 503 selects the suspending operation in step S515 in FIG. 26.

The modified embodiment (13e) may be further modified as follows.

The dependency management unit 508 may further notify the conflict judgment unit 524 of the pair of the PID of the process which has closed the resource file 516 and the name of the closed resource file 516 in step S304 in FIG. 10. The conflict judgment unit 524 may manage the allocated processes using a set of pairs of a PID and a resource file name instead of using a set of PIDs as described above. For convenience of explanation below, it is assumed that an "allocated process list" which is a list including, as its elements, pairs of a PID and a resource file name is used for management of allocated processes.

Upon receipt of the notification from the dependency management unit 508, the conflict judgment unit 524 judges whether the condition that "the notified pair is included in the allocated process list and no other pair including the same PID as the PID of the notified pair is included in the allocated process list" holds true or not. When the condition holds true, the conflict judgment unit 524 notifies the process control module 503 of the PID of the pair notified from the dependency management unit 508 as a target of suspending control. In addition, the conflict judgment unit 524 deletes the pair notified from the dependency management unit 508 from the allocated process list.

Upon receipt of the notification from the conflict judgment unit 524 as described above, the process control module 503 attempts suspend on the process having the PID notified from the conflict judgment unit 524 as illustrated in FIG. 14. The retrial flag is set to a value indicating the first trial.

By further modifying the modified embodiment (13e) as described above, the process which has been exceptionally free of a suspending operation with a view to preventing a side effect of suspending control is suspended when a resource is released. As a result, a longer CPU time and more memory may be available for the process belonging to the foreground process group. Therefore, it is expected that the performance experienced by a user is further enhanced.

Described next is the modified embodiment (13f) in which forcible termination control is performed using a process group to solve the problem of memory shortage. As described above with reference to FIG. 16, the memory management module 525 is added in the modified embodiment (13f).

FIG. 28 is a block diagram illustrating the details of the memory management module 525 in the modified embodiment (13f). FIG. 28 also illustrates some part of the smartphone 500a in FIG. 16.

The memory management module 525 is provided in the kernel 513 of the OS. The memory management module 525 includes a process selection unit 526 which selects the process 517 to be forcibly terminated, and a process forcible termination unit 527 which forcibly terminating the process 517 selected by the process selection unit 526. The memory management module 525 holds cache 528 of the process group member table 502, the table 529 of time at which an application is used, and the list 530 of processes to be excluded from the forced termination.

Since the process group member table 502 is the data generated by the process group judgment unit 501 outside the kernel 513, it resides in the user memory space. On the other hand, the cache 528 resides in the kernel memory space. The content of the data of the process group member table 502 and the cache 528 are identical.

Depending on the architecture of the OS, there may be a memory space accessible from both inside and outside of the kernel 513. When there is such a memory space, the cache 528 may be omitted.

In addition, upon receipt of a notification from the switch event notification unit 512 in the application manager 511 to the kernel 513, the table 529 of time at which an application is used is updated by the memory management module 525. In the table 529 of time at which an application is used, for each application having been started (and not yet terminated), information associating an application name with time is recorded.

A concrete example of the table 529 of time at which an application is used is the table 529a of time at which an application is used in FIG. 7B. Each entry of the table 529a of time at which an application is used corresponds to each application in the started state in the smartphone 500a. That is, each entry corresponds to an application which is currently running in the foreground or background, or is suspended.

The table 529*a* of time at which an application is used does not include an entry corresponding to an already terminated application.

Each entry of the table 529*a* of time at which an application is used includes an "application name" field which identifies an application and a "previous use time" field which indicates the time at which the application has been last brought to the foreground. The time at which an application is brought to the foreground refers to any of (18a) through (18c). Therefore, the previous use time of the table 529*a* of time at which an application is used is the latest time in (18a) through (18c).

(18a) The time at which an application is newly started (18b) The time at which the background application is brought to the foreground (18c) The time at which a suspended application is resumed and starts to run in the foreground The table 529*a* of time at which an application is used in FIG. 7B indicates items (19a) through (19c) below.

(19a) The time at which the application D has been last brought to the foreground is TD.

(19b) The time at which the application E has been last brought to the foreground is TE.

(19c) No other application is in action (i.e., there is no other application which has been started and not yet terminated) currently on the smartphone 500*a*.

In the modified embodiment (13f), the switch event notification unit 512 in the application manager 511 further notifies the memory management module 525 of the occurrence of switching applications in step S104 in FIG. 8. When receiving the notification, the memory management module 525 operates as follows.

When an application terminates, the memory management module 525 deletes the entry corresponding to this application from the table 529 of time at which an application is used.

On the other hand, an application is newly started, the memory management module 525 adds to the table 529 of time at which an application is used a new entry for association between the name of the newly started application and the current time.

When an application being executed in the background is changed into the execution in the foreground, or when an application being suspended is resumed and executed in the foreground, the memory management module 525 searches the table 529 of time at which an application is used, for an entry corresponding to the application, and then sets the current time to the previous use time field of the found entry.

The list 530 of processes to be excluded from the forced termination in FIG. 28 is the data statically determined in advance, and is a list of the names of the processes to be excluded from the forced termination. For example, the list 530 of processes to be excluded from the forced termination includes the names of services etc. provided by the OS as standard.

A concrete example of the list 530 of processes to be excluded from the forced termination is a list 530*a* of processes to be excluded from the forced termination in FIG. 7B. According to the list 530*a* of processes to be excluded from the forced termination, the "init" process is excluded from the forced termination. According to the list 530*a* of processes to be excluded from the forced termination, each of the processes of the sound daemon 614, the window system 615, and the application manager 616 in the services provided by the OS are also excluded from the forced termination. However, according to an example of the list 530*a* of processes to be excluded from the forced termination, the location manager 613 and the installer 617 in the services provided by the OS are not excluded from the forced termination, but may be forcibly terminated depending on the case.

In addition, another process not illustrated in FIG. 7B may be further included in the list 530 of processes to be excluded from the forced termination. For example, depending on the embodiments, the process names of the location manager 613 and the installer 617 may be further included in the list 530 of processes to be excluded from the forced termination.

Furthermore, in the services provided by the OS, there are services which are for use only by the OS, but are not open to any application. For example, a service which caches, on memory, data to be written to a disk device, thereby delaying an actual write to the disk device, and then actually writes the data to the disk device with appropriate timing is used only within the OS. The name of the service for use just by the OS as exemplified above is also included in the list 530 of processes to be excluded from the forced termination.

FIG. 29 is a flowchart of the processing performed by the memory management module 525 in the modified embodiment (13f). The processing in FIG. 29 is started when both conditions (20a) and (20b) below hold true.

(20a) A system call for memory allocation has been invoked from a process outside the kernel 513 through, for example, a standard library.

(20b) The capacity of memory allocatable within the user memory space is lower than the requested amount of memory.

After explaining the processing flow in FIG. 29, the details of each step in FIG. 29 is supplemented with reference to the concrete examples in FIG. 7B.

In step S1801, the process selection unit 526 reads the table 529 of time at which an application is used.

In the next step S1802, the process selection unit 526 judges whether the number of entries of the read table 529 of time at which an application is used is 0 or not. When the number of entries is 0, that is, there are no applications currently in action (i.e., there are no applications which have been started and not yet terminated), control proceeds to step S1803. On the other hand, when the number of entries is 1 or more, that is, when one or more applications are in action (i.e., one or more applications have been started and not yet terminated), control proceeds to step S1808.

In step S1803, the process selection unit 526 acquires the list 507 of processes (that is, a list of all processes in operation).

In the next step S1804, the process selection unit 526 reads the list 530 of processes to be excluded from the forced termination.

In the next step S1805, the process selection unit 526 judges whether or not there is a difference between the process set indicated by the list 507 of processes acquired in step S1803 and the process set indicated by the list 530 of processes to be excluded from the forced termination read in step S1804. The process set indicated by the list 530 of processes to be excluded from the forced termination is a subset of the process set indicated by the list 507 of processes.

When there is no difference between the two sets, control proceeds to step S1806. On the other hand, when there is a difference between the two sets, that is, when a process not included in the list 530 of processes to be excluded from the forced termination is included in the list 507 of processes, control proceeds to step S1807.

Step S1806 is performed in an exceptional case in which an unexpected error that "there is a shortage of memory although only the minimal processes included in the list 530 of processes to be excluded from the forced termination are in operation" has occurred. Therefore, in step S1806, the process selection unit 526 determines not to forcibly terminate a certain individual process, but to restart (i.e., reboot) the entire system of the smartphone 500a (that is, to restart the OS).

Then, the process selection unit 526 restarts (i.e., reboots) the OS. Otherwise, the process selection unit 526 may indirectly restart the OS by instructing another module which is included in the kernel 513 but not illustrated in the attached drawings, to restart the OS. After performing the appropriate processing for the restart, the processing in FIG. 29 terminates, and the OS is restarted.

Meanwhile, in step S1807, the process selection unit 526 selects at random one of the processes included in the difference judged in step S1805, and notifies the process forcible termination unit 527 of the PID of the selected process. Then, the process forcible termination unit 527 forcibly terminates the process of the notified PID. For example, the process forcible termination unit 527 forcibly terminates the process by sending a signal for forcible termination to the process of the notified PID. Then, control proceeds to step S1814.

Step S1808 is performed when one or more applications are running. Thus, the process selection unit 526 selects, from the content read in step S1801 from the table 529 of time at which an application is used, an application which has experienced the longest elapsed time after being last brought to the foreground. That is, the process selection unit 526 selects the application of the entry indicating the oldest "previous use time" in the entries in the table 529 of time at which an application is used.

Then, in the next step S1809, the process selection unit 526 reads the process group member table 502, and thereby recognizes the process group of the application selected in step S1808.

Furthermore, in the next step S1810, the process selection unit 526 reads the list 530 of processes to be excluded from the forced termination.

Then, in the next step S1811, the process selection unit 526 removes, from the process group recognized in step S1809, the processes belonging to the process set specified in the list 530 of processes to be excluded from the forced termination, and notifies the process forcible termination unit 527 of a result of the removal.

Next, in step S1812, the process forcible termination unit 527 forcibly terminates all remaining processes (that is, the processes notified from the process selection unit 526 in step S1811).

Then, in step S1813, the memory management module 525 deletes the entry of the forcibly terminated application (that is, the application selected in step S1808) from the table 529 of time at which an application is used. After deleting the entry, control proceeds to step S1814.

In step S1814, the memory management module 525 judges whether or not the available memory (to be more concrete, the capacity of memory newly allocatable in the user memory space) is equal to or exceeds a criterion. If the available memory is equal to or exceeds the criterion, the processing in FIG. 29 is terminated. On the other hand, if the available memory is less than the criterion, control is returned to step S1801. The criterion in step S1814 may be, for example, an appropriate combination of one or more criteria (6a) through (6d) described above with reference to the first embodiment.

The concrete examples of steps S1808 through S1813 described above are described below with reference to FIG. 7B.

In FIG. 7B, since the number of entries of the table 529a of time at which an application is used is 2, control proceeds from step S1802 to step S1808. For convenience of explanation below, assume that the time TE is older than time TD. Then, in step S1808, the process selection unit 526 selects the application E.

According to the process group member table 502a, the process group of the application E includes three processes, and the PIDs of these three processes are 10, 1002, and 1012. Therefore, in step S1809, the process selection unit 526 recognizes the process group including these three processes.

Then, the process selection unit 526 reads the list 530a of processes to be excluded from the forced termination in step S1810, and further acquires the list 507 of processes. Then, the process selection unit 526 recognizes the PID of each process whose process name is included in the list 530a of processes to be excluded from the forced termination, by referring to the list 507 of processes.

According to the example in FIG. 7B, the process selection unit 526 recognizes, in step S1810, the PIDs 1, 10, 20, and 30 as the PIDs of the processes to be excluded. As a result, the process selection unit 526 excludes, from the process group recognized in step S1809, the PID 10 to be excluded. Then, the process forcible termination unit 527 forcibly terminates the two processes having the remaining PIDs 1002 and 1012 in step S1812. Then, in step S1813, the memory management module 525 deletes the entry of the application E from the table 529a of time at which an application is used.

If a plurality of applications use the same particular resource (for example, the sound device 603), a particular process (for example, the process of the sound daemon 614) is included in all of the process groups of these plurality of applications. Thus, the particular process, which belongs to the process group of the application currently running in the foreground, may be included in the process group recognized in step S1809. However, it is not preferable to forcibly terminate the particular process.

Then, to prevent the forced termination of the particular process included in the process group of the application running in the foreground, for example, the following first or second method may be used.

The first method is to define in advance the list 530 of processes to be excluded from the forced termination so that the process name of a particular process, which provides access to a particular resource by exclusively occupying the particular resource, is surely included in the list 530 of processes to be excluded from the forced termination.

The second method is to allow the process selection unit 526 to operate as follows when the number of entries of the table 529 of time at which an application is used is 2 or more.

The process selection unit 526 further recognizes the application having the shortest elapsed time (that is, the application that is currently running in the foreground) in step S1808. Then, the process selection unit 526 further recognizes the process group of the application running in the foreground (for convenience of explanation below, this process group is referred to as a "foreground process group") in step S1809. In addition, the process selection unit 526 further excludes the processes belonging to the foreground process group from the forced termination in step S1811.

The first method is a method to uniformly exclude all particular processes from the forced termination when there are a plurality of particular processes, each of which provides access to a particular resource by exclusively occupying the particular resource. By contrast, when there are a plurality of particular processes, the second method makes it possible to forcibly terminate a particular process irrelevant to an application running in the foreground. Owing to the feature, available memory capacity may be increased more than the first method.

Described next is the modified embodiment (13g) of the implementation of the probe 509. In FIGS. 5 and 16, the probe 509 is a part of the kernel 513. The embodiment in which the kernel 513 includes the probe 509 has a merit of a smaller overhead for monitoring a system call by the probe 509.

However, it is not always requested that the kernel 513 includes the probe 509. The probe 509 may be implemented outside the kernel 513 so far as the probe 509 is able to detect the invocation of a system call.

For example, as a kernel interface for acquiring the performance information about a system, a hook of a system call may be prepared in advance. Using a hook makes it possible to invoke a program in the user space when the system call is invoked. Therefore, the program of the probe 509 may be a program in the user space.

Otherwise, a module of the probe 509 may be added in the standard library provided by the OS.

Described next is the modified embodiment (13h) of control using a pending process list performed by the process control module 503. In the modified embodiment (13h), a mechanism for preventing an occurrence of a repetitive failure in an operation which is performed on a process included in the pending process list is introduced.

The operation performed on the process by the process control module 503 as illustrated in FIG. 14, 15, or 27 may fail when, for example, the process to be handled is performing any system call. Then, a mechanism that suppresses a system call from the process to be handled and thereby prevents an occurrence of a repetitive failure in an operation performed by the process control module 503 may be introduced.

For example, an interface for specifying, from outside, a process for which the execution of a system call is suppressed may be added to the kernel 513 or a standard library. When adding a pair of the PID and operation content to the pending process list, the process control module 503 specifies the PID for the added interface.

Then, even if a process whose PID is included in the pending process list invokes a system call, the invocation is immediately refused by the kernel 513, and the system call is not executed. Therefore, the operation success rate is enhanced when the process control module 503 performs a retrying processing according to the pending process list.

Furthermore, the operation performed by the process control module 503 on the process may also fail when a certain resource is allocated to a process to be handled. Therefore, the process control module 503 may prevent an occurrence of a repetitive failure of an operation by forcing the process to release the resource.

For example, each element of the pending process list may be modified to include not only the PID and the operation content but also the frequency of retrials. Then, in order to succeed in the next retrial, the process control module 503 may force a process which still keeps a resource allocated thereto even after a specified number of retrials are repeated, to release the resource.

Described next is the comparison among the above-mentioned second embodiment, the modified embodiments (13a) through (13h), and the first embodiment in FIG. 1.

The used resource information 111 in FIG. 1 corresponds to, for example, the information extracted from the dependency information 618 in FIG. 6 and stored in the package information DB 606 (that is, the package information DB 506 in FIG. 5).

In addition, the association information 112 in FIG. 1 may include the information for direct association between a resource name and a process name like, for example, the resource/process name correspondence table 520*a* in FIG. 7B. The association information 112 may further include one or both of the information for association between the process name and the PID like the list 507*a* of processes, and the information for association a logical resource name and a physical resource file name like the resource/file correspondence table 504*a*.

Otherwise, the association information 112 in FIG. 1 may include the information for association between a flag which distinguishes a particular resource from other resources and a resource file name as the information for identification of a particular resource like the resource/file correspondence table 504*a* in FIG. 7A. Then, the association information 112 may further include the information for association between the resource file name and the PID like the resource dependency table 505*a*. Then, the particular resource and the PID of a particular process are associated in the association information 112 through the resource file name.

It is obvious that the resource dependency table 505*a* may be provided with a flag field in the resource dependency table 505*a* instead of the resource/file correspondence table 504*a*. Otherwise, the resource/file correspondence table 504*a* and the resource dependency table 505*a* may be provided in one table.

Furthermore, the configuration information 113 in FIG. 1 corresponds to, for example, the information extracted from the configuration information 619 in FIG. 6 and stored in the package information DB 606 (that is, the package information DB 506 in FIG. 5).

Then, the recognition result 114 by the recognition unit 103 in FIG. 1 corresponds to the process group member table 502. That is, the recognition unit 103 which recognizes a process group corresponds to the process group judgment unit 501.

Then, the control unit 105 which controls a process in FIG. 1 corresponds to the process control module 503, the memory management module 525, or a combination of them. The input unit 106 corresponds to the input unit 510, and the resource monitoring unit 107 corresponds to a combination of the probe 509 and the dependency management unit 508. The memory monitoring unit 108 corresponds to the memory management module 525.

The second embodiment and the modified embodiments (13a) through (13h) have various merits as follows.

As described above, the process group judged by the process group judgment unit 501 is appropriate as a unit of control by the process control module 503. Using an appropriate process group, the performance experienced by a user may be enhanced as described above.

Furthermore, when the process control module 503 performs suspending control, the second embodiment and the modified embodiments (13a) through (13h) have an effect of reducing power consumption.

In addition, as described above, a process group is recognized and a process is controlled based on the process group automatically. It is unnecessary to perform a tuning operation in advance by the OS of the smartphone 500, an application designer, etc.

For example, although the resource/file correspondence table 504 is information created in advance, it is unnecessary for a designer to tune the resource/file correspondence table 504. It is possible to define the resource/file correspondence table 504 simply from the hardware configuration of the smartphone 500 and the specification of the OS.

In addition, depending on the embodiments, the list 518 of resource files to be monitored may be created in advance. Even in this case, it is possible to define the list 518 of resource files to be monitored simply from the hardware configuration of the smartphone 500 and the specification of the OS. Similarly, depending on the embodiments, the list 530 of processes to be excluded from the forced termination may be created in advance. Even in this case, it is also possible to define, simply from the specification of the OS, the list 530 of processes to be excluded from the forced termination.

Furthermore, the package information DB 506 may be an existing DB automatically generated by the installer 617, or may be another DB obtained by extracting a part of information included in an existing DB. In any case, since each entry of the package information DB 506 is extracted from the existing information included in an application package, an application developer is not requested to spend time and effort for generating new data in order to prepare the package information DB 506.

In addition, in an environment in which only limited applications are installed, such as an environment of a computer for controlling an industrial robot etc., a process group may be managed according to a policy tuned based on the knowledge relating to the limited applications. However, in an environment in which any applications may be installed as with the smartphone 500, the tuning operation is not practical and is difficult.

For example, a normal user has no sufficient knowledge about a tuning operation. Furthermore, even a developer of an application as a specialist has not always sufficient knowledge about a large number of other applications which may be installed in the same smartphone 500.

According to the second embodiment and its modified embodiments, control based on an appropriate process group is automatically performed without the tuning operation. Such automatic control is realized by using a configuration file which is able to be defined simply from the hardware configuration of the smartphone 500 and the specification of the OS. It is a considerable merit not to performing tuning for management of a process group. In addition, since an application developer is not to perform tuning for which other applications are taken into account, it is expected that the freedom in developing an application is enhanced.

Furthermore, according to the second embodiment and its modified embodiments, the information used in recognizing a process group is predetermined or acquired when a particular event occurs. That is, an appropriate process group is recognized according to the second embodiment and its modified embodiments without a system of tracing all behavior of a process in real time. A load of real time tracing operation is very heavy, and may be a factor of reducing the performance experienced by a user. Therefore, it is a considerable merit not to perform the tracing operation in real time.

For example, the probe 509 monitors a system call, but the load of the probe 509 is much smaller than tracing all behavior of processes. In addition, since a monitoring target of the probe 509 is limited, the load is smaller by the limitation. Furthermore, (13b), (13c), and a combination of them further reduce the load of the probe 509.

With a certain type of OS, the conflict for a resource between processes may be detected by referring to a queue for acquisition of the resource. For example, a first process is registered in the queue and waits until the resource is released if a second process is using the resource when the first process requests acquisition of the resource.

However, there is no queue for a normal OS of a smartphone, a tablet terminal, a PC, etc. Therefore, if the second process is using the resource when the first process requests acquisition of the resource, then a result of "acquisition failed" is immediately returned to the request. Therefore, the conflict for a resource is not detected based on a queue on the normal OS of a smartphone, a tablet terminal, a PC, etc.

However, according to the second embodiment and its modified embodiments, which process is currently opening which resource file is clearly indicated by the resource dependency table 505, which is rewritten by the dependency management unit 508 according to a notification from the probe 509. Furthermore, which resource may possibly be used by a process of which application is also clearly indicated by the package information DB 506. Therefore, even in an environment in which an OS not provided with a queue for acquisition of a resource is used, the conflict for a resource is detectable, and appropriate control depending on a detection result is feasible.

Particularly, according to a modified embodiment (13e), in which the process control module 503 includes the conflict judgment unit 524, the side effect, which may be caused due to a process of another application when this process is suspended while this process is keeping a resource allocated thereto, is avoidable.

Furthermore, the criterion based on which the process selection unit 526 selects the process to be forcibly terminated when memory becomes short in the modified embodiment (13f) excels in an aspect that the criterion enables a user to feel the smallest possible inconvenience.

For example, there may be considered a first comparison example which adopts a policy to forcibly terminate processes in the order simply from the process of the application of the lowest usage frequency. However, the usage frequency of an application immediately after the installation is low. Therefore, according to the first comparison example, there may occur considerable inconvenience if memory shortage occurs when a user uses, in the foreground, an application which has just been installed. This is because the application being currently used by the user may be forcibly terminated, thereby causing undesired inconvenience.

Furthermore, there may be considered a second comparison example which adopts a policy to use the usage frequency per unit time in order to overcome the demerit of the first comparison example. However, the second comparison example has another demerit that it needs the cost of calculating the usage frequency per unit time. A longer unit time reduces the calculation cost, but a very long unit time marks the usage frequency of zero for an application installed within a period shorter than the unit time, thereby causing the same problem as the first comparison example. On the other hand, a shorter unit time increases the cost of calculation performed for each elapse of the unit time.

Furthermore, there may be considered a third comparison example which adopts a policy to forcibly terminate a process at random. However, a process belonging to a process group of an application which is currently running in the foreground may be incidentally terminated forcibly.

Furthermore, there may be considered a fourth comparison example which adopts a policy to forcibly terminate processes in an order prefixed in advance. However, in an environment in which any application may be installed, it is not practical to fixedly define the order in advance.

As compared with the above-mentioned first through fourth comparison examples, the selection criterion of the process selection unit 526 in the modified embodiment (13f) excels.

The first reason is that since the table 529 of time at which an application is used, the process belonging to the process group of the application currently running in the foreground is not forcibly terminated before the processes of other applications. That is, even if the application currently running in the foreground is an application which has been installed lately, this application is still free from the inconvenience of "being forcibly terminated before other applications are terminated because the time elapsed from the installation of this application is still short".

The second reason is that the cost of registering the point in time into the table 529 of time at which an application is used is much lower than the cost of calculating, at every lapse of a unit time, the usage frequency per unit time.

The third reason is that it is unnecessary to fixedly define in advance the order of forcibly terminating processes.

The fourth reason is that the process selection unit 526 focuses on an application and selects one or more processes collectively instead of separately and independently selecting an individual process. When only one process is forcibly terminated in a multi-process application, there may occur the case in which "memory is wasted because the other processes of the application have not been terminated although the application itself stops its operation." Since the case is avoidable according to the process selection unit 526, a wasteful use of memory is avoidable.

When the memory management module 525 is included in the kernel 513 as illustrated in FIG. 28, it is possible to avoid such an unreasonable situation that, when memory in the user memory space is short, the memory in the user memory space is further consumed in order to select a process to be forcibly terminated. The reason why this unreasonable situation is avoidable is that the working area of the processing performed by the process selection unit 526 of the memory management module 525 for selecting a process resides in the kernel memory space.

The present invention is not limited to the above-mentioned embodiments and their modifications, but may be variously modified.

For example, when there may be a process performed in multi-threads, the recognition unit 103 or the process group judgment unit 501 may recognize a thread group, not a process group. The process group and the thread group are only different in granularity, and are identical in method for recognizing a group.

For example, a list of threads may be obtained by the "ps" command. Therefore, the recognition unit 103 or the process group judgment unit 501 may recognize a thread group relating to an application using an output of the "ps" command as in recognizing a process group.

Furthermore, in FIG. 4, the name of the program for a main task included in the package of the application having the name "C" is "C1", but the name of the program for the main task may be "C" which is the same as the name of the application.

The name of the program is also the name of the process. However, when the name of the process is very long, only a part of the name of the process may be included in an output result of the "ps" command. In this case, the processing of obtaining the PID from the process name by referring to the list 507 of processes includes the processing of performing a partial coincidence search instead of a complete coincidence search of a character string with respect to the process name.

Furthermore, in the explanation above, the data structure of a list, a table, etc. is exemplified, but it is obvious that other appropriate data structures may be used. In addition, for example, a list of PIDs may be used to indicate a process set, but a process set indicated by a list is the same independent of the order of PIDs in the list.

Although various flowcharts are exemplified, the order of the steps in the flowcharts is provided only for illustrative purposes, and the order of the steps may be appropriately changed so far as inconsistency is avoided.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal device comprising:
   first storage configured to store used resource information which indicates a set of resources to be used by an application installed in the terminal device;
   second storage configured to store association information which associates each particular resource for which access is provided by a particular process, with the particular process; and
   a processor configured to recognize a process group which is related to the application, and includes a set of particular processes each of which is associated by the association information with a resource included in the set of resources indicated by the used resource information,
   wherein the processor further recognizes a process generated by execution of the application as an element of the process group,
   wherein the processor continues execution of a process which is included in the process group and suspends a process which is not included in the process group, when the application is started, resumed from a suspended state, changed from a running state in a background to a running state in a foreground, or running in the foreground, and
   wherein when an allocated process to which a resource included in the set of resources indicated by the used resource information is allocated is not included in the process group, the processor
   resumes the allocated process when the allocated process is suspended, and
   continues execution of the allocated process when the allocated process is running.

2. The terminal device according to claim 1, further comprising
   third storage configured to store configuration information including program identification information for identifying each of one or more programs included in a package of the application, wherein
   the processor recognizes the process generated by the execution of the application, by referring to the configuration information.

3. The terminal device according to claim 2, wherein:
   the package includes first resource identification information for identifying each resource to be used by the application; and
   the used resource information indicates the set of resources to be used by the application, by using the first resource identification information extracted from the package, or by using second resource identification information which is defined, in association with the first resource identification information, to identify each resource available to the terminal device.

4. The terminal device according to claim 1, wherein the processor further recognizes as an element of the process group a descendant process of a process which belongs to the recognized process group.

5. The terminal device according to claim 1, wherein the processor sets a priority of the process included in the process group higher than a priority of the process not included in the process group.

6. The terminal device according to claim 1, wherein:
the processor monitors an opening operation and a closing operation on at least a resource which is not associated with the particular process by the association information and which is included in the set of resources indicated by the used resource information; and
the processor identifies the allocated process according to a monitoring result.

7. The terminal device according to claim 1, wherein the processor continues execution of the process included in the process group, and forcibly terminates at least one process that is not included in the process group.

8. The terminal device according to claim 7, wherein
the processor monitors whether an available capacity of memory provided in the terminal device is equal to or exceeds a criterion; and
when the processor detects that the available capacity of the memory is less than the criterion, the processor forcibly terminates at least one process that is not included in the process group.

9. The terminal device according to claim 8, wherein part of the memory is used as one or both of the first storage and the second storage.

10. The terminal device according to claim 1, further comprising
an input unit configured to receive an input of an instruction to execute the application in the foreground, wherein
the processor differentially controls the process included in the process group and the process not included in the process group, when the input unit receives the input of the instruction.

11. The terminal device according to claim 1, wherein:
the processor monitors an opening operation and a closing operation on at least one of a plurality of resources available to the terminal device;
when the processor detects the opening operation, the processor associates a resource opened by the detected opening operation with a process which has invoked the detected opening operation;
when the processor detects the closing operation, the processor dissolves association between a resource closed by the detected closing operation and a process which has invoked the detected closing operation; and
at least part of the association information stored in the second storage is information which has been generated by the processor by associating a certain particular resource with a certain particular process upon detection of an opening operation on the certain particular resource invoked from the certain particular process.

12. The terminal device according to claim 1, wherein the association information associates the particular resource with the particular process by using:
one or both of first distinction information for distinguishing the particular resource from a resource other than the particular resource, and second distinction information for distinguishing the particular process from a process other than the particular process;
one or both of a file name indicating the particular resource, and logical resource identification information for logically identifying the particular resource independent of the file name; and
one or both of a process identifier which is unique to the particular process and is dynamically assigned to the particular process when the particular process is generated by execution of a particular program, and program identification information for identifying the particular program.

13. The terminal device according to claim 1, wherein each resource available to the terminal device is:
a physical device built in or connected to the terminal device; or
a database or a certain file which is stored in the terminal device.

14. A process management method executed by a computer, the process management method comprising:
acquiring, by the computer, used resource information which indicates a set of resources to be used by an application installed in the computer;
acquiring, by the computer, association information which associates each particular resource for which access is provided by a particular process, with the particular process;
recognizing, by the computer, a process group which is related to the application, and includes a set of particular processes each of which is associated by the association information with a resource included in the set of resources indicated by the used resource information;
recognizing a process generated by execution of the application as an element of the process group;
continuing execution of a process which is included in the process group and suspending a process which is not included in the process group, when the application is started, resumed from a suspended state, changed from a running state in a background to a running state in a foreground, or running in the foreground; and
when an allocated process to which a resource included in the set of resources indicated by the used resource information is allocated is not included in the process group, resuming the allocated process when the allocated process is suspended and continuing execution of the allocated process when the allocated process is running.

15. A non-transitory computer-readable recording medium having stored therein a process management program for causing a computer to execute process management comprising:
acquiring used resource information which indicates a set of resources to be used by an application installed in the computer;
acquiring association information which associates each particular resource for which access is provided by a particular process, with the particular process; and
recognizing a process group which is related to the application, and includes a set of particular processes each of which is associated by the association information with a resource included in the set of resources indicated by the used resource information;
recognizing a process generated by execution of the application as an element of the process group;
continuing execution of a process which is included in the process group and suspending a process which is not included in the process group, when the application is started, resumed from a suspended state, changed from a running state in a background to a running state in a foreground, or running in the foreground; and when an allocated process to which a resource included in the set of resources indicated by the used resource information is allocated is not included in the process group, resuming the allocated process when the allocated process is suspended and continuing execution of the allocated process when the allocated process is running.

* * * * *